(12) United States Patent
Wabnegger et al.

(10) Patent No.: US 10,367,337 B2
(45) Date of Patent: Jul. 30, 2019

(54) CONDUCTOR AS A TOOL

(71) Applicant: Quanta Associates, L.P., Houston, TX (US)

(72) Inventors: David Karl Wabnegger, Langley (CA); Daniel Neil O'Connell, Oliver (CA); Robert Wayne Palmer, Houston, TX (US); Jody Milton Greer, Houston, TX (US)

(73) Assignee: Quanta Associates, L.P., Houston, TX (US)

( * ) Notice: Subject to any disclaimer, the term of this patent is extended or adjusted under 35 U.S.C. 154(b) by 314 days.

(21) Appl. No.: 15/094,922

(22) Filed: Apr. 8, 2016

(65) Prior Publication Data

US 2016/0365710 A1    Dec. 15, 2016

Related U.S. Application Data

(60) Provisional application No. 62/145,354, filed on Apr. 9, 2015.

(51) Int. Cl.
*H02G 1/14* (2006.01)
*H02G 1/04* (2006.01)
*H02G 7/20* (2006.01)

(52) U.S. Cl.
CPC ............... *H02G 1/14* (2013.01); *H02G 1/04* (2013.01); *H02G 7/20* (2013.01)

(58) Field of Classification Search
CPC .. H02G 1/00; H02G 1/02; H02G 1/04; H02G 7/00; H02G 7/06; H02G 1/14; H02G 7/20
See application file for complete search history.

(56) References Cited

U.S. PATENT DOCUMENTS 6,060,972 A * 5/2000 Van Den Brink .... H01F 17/062
324/127
7,535,132 B2 * 5/2009 Devine .................... H02G 1/04
174/68.2

(Continued)

FOREIGN PATENT DOCUMENTS

| CN | 201789232 U | 4/2011 |
| WO | WO2006034539 A1 | 4/2006 |
| WO | WO2012015160 A1 | 2/2012 |

OTHER PUBLICATIONS

Blaine R. Copenheaver, PCT International Search Report, dated Jul. 8, 2016, 2 pages, ISA/US, Alexandria, Virginia, United States.

(Continued)

*Primary Examiner* — Carl Arbes
(74) *Attorney, Agent, or Firm* — Oathout Law Firm; Mark A. Oathout; Antony C. Edwards

(57) ABSTRACT

A method of using a temporary conductor as a re-usable tool in maintaining, repairing or re-conductoring at least one energized phase, includes stringing the temporary conductor between support structures at either end of a first section, then energizing the said temporary conductor by bringing the temporary conductor to the voltage potential of the phase and electrically paralleling the temporary conductor with the energized phase, de-energizing and then maintaining, repairing or reconductoring the de-energized energized phase, re-energizing and electrically paralleling said energized phase, de-energizing and removing the temporary conductor for later re-use as the re-usable tool in a second section of the energized phase.

6 Claims, 100 Drawing Sheets

(56) References Cited

U.S. PATENT DOCUMENTS

| | | |
|---|---|---|
| 8,471,416 B2 * | 6/2013 | Barthold .................. H02G 1/04 |
| | | 307/147 |
| 2003/0069657 A1 | 4/2003 | Verdecchio et al. |
| 2005/0133244 A1 * | 6/2005 | Devine .................... H02G 1/02 |
| | | 174/68.2 |
| 2008/0246010 A1 | 10/2008 | Barthold |
| 2009/0095522 A1 | 4/2009 | Barthold |
| 2010/0133490 A1 | 6/2010 | Devine et al. |

OTHER PUBLICATIONS

Blaine R. Copenheaver, PCT Written Opinion of the International Searching Authority, dated Jul. 8, 2016, 6 pages, ISA/US, Alexandria, Virginia, United States.

* cited by examiner

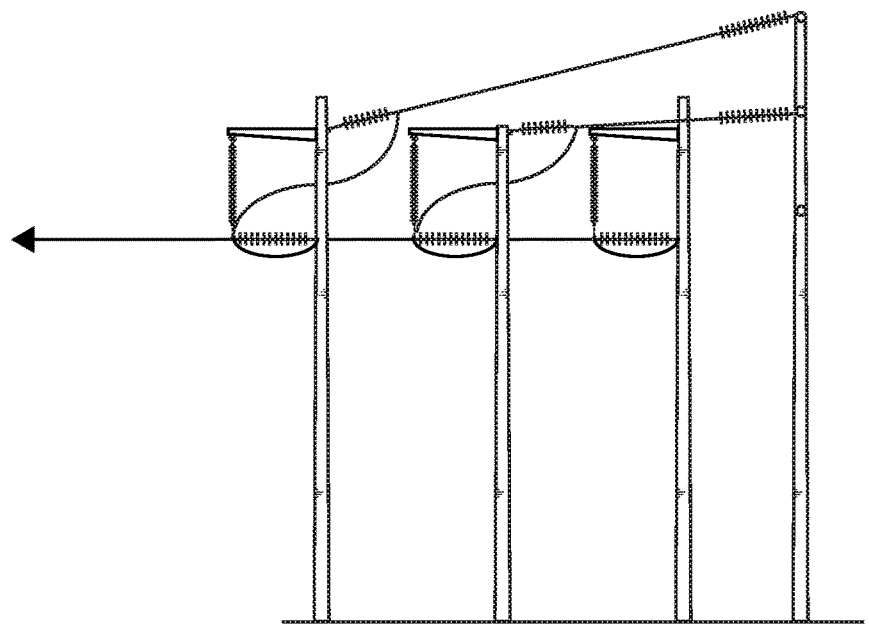
FIG. 8A
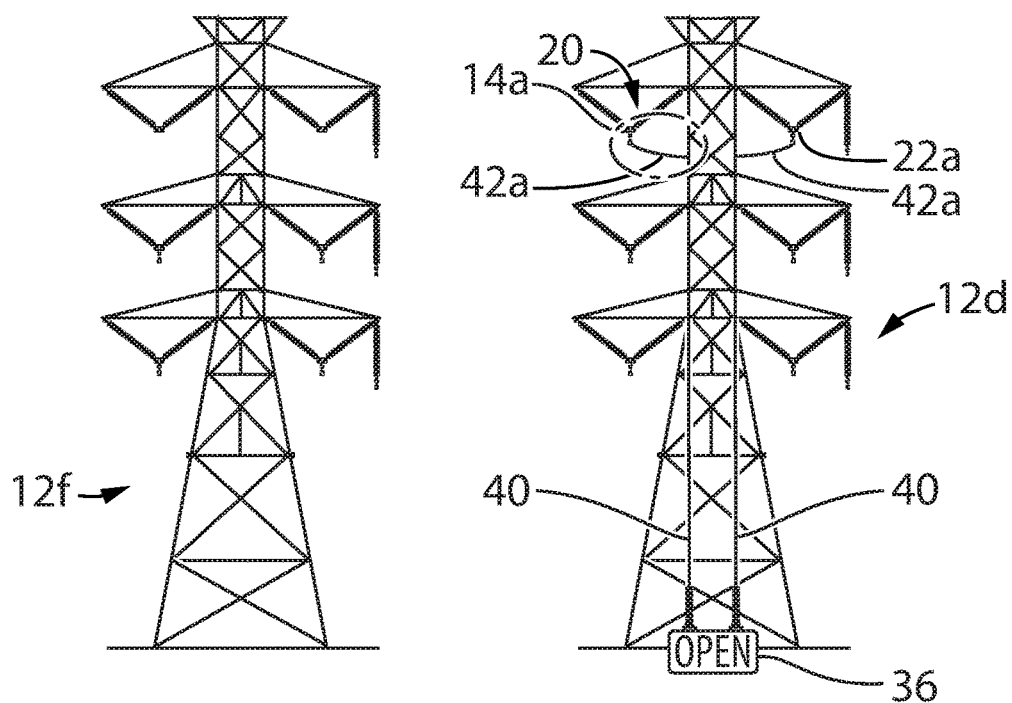
FIG. 8B     FIG. 8C

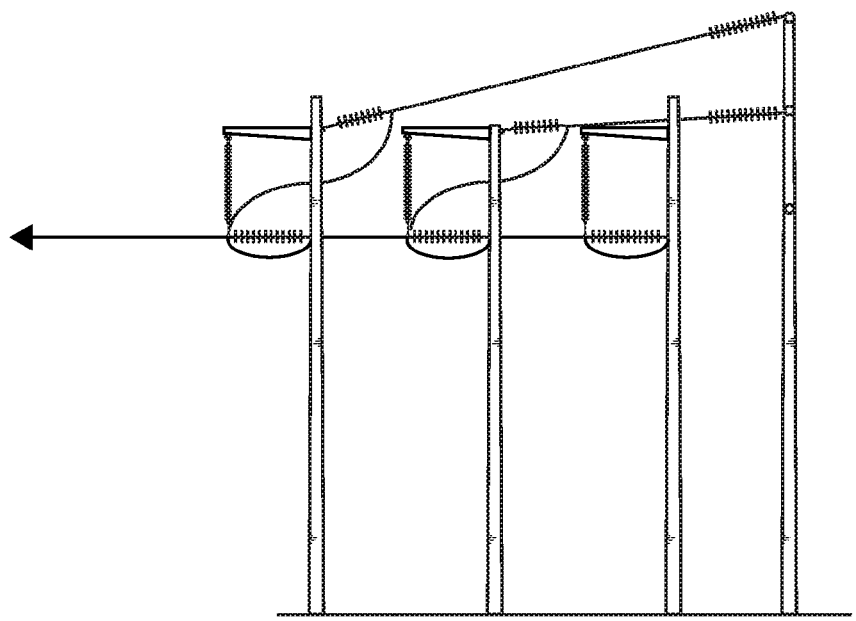
FIG. 9A
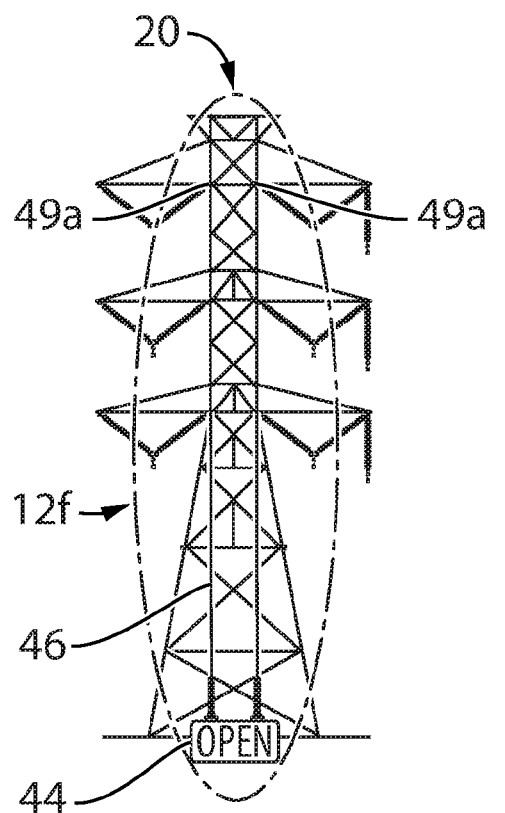 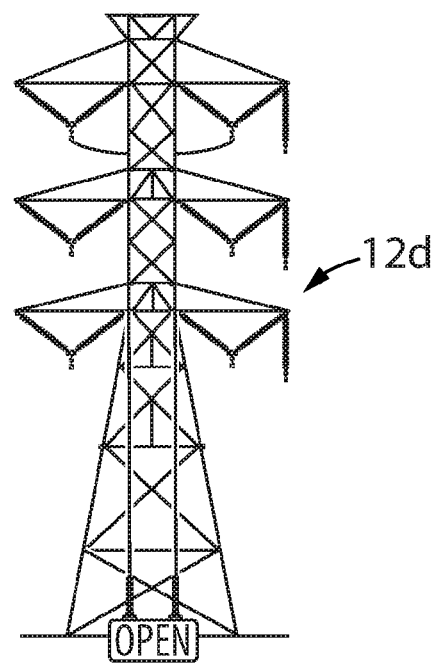
FIG. 9B        FIG. 9C

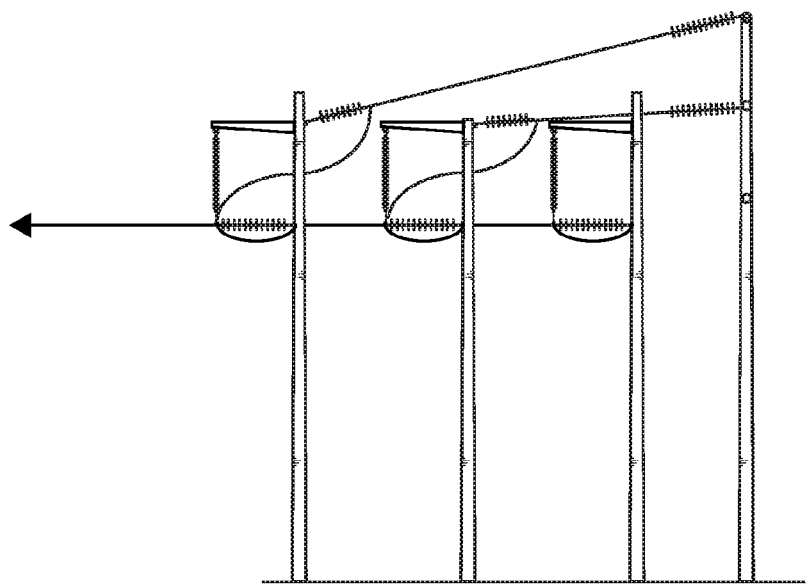
FIG. 10A
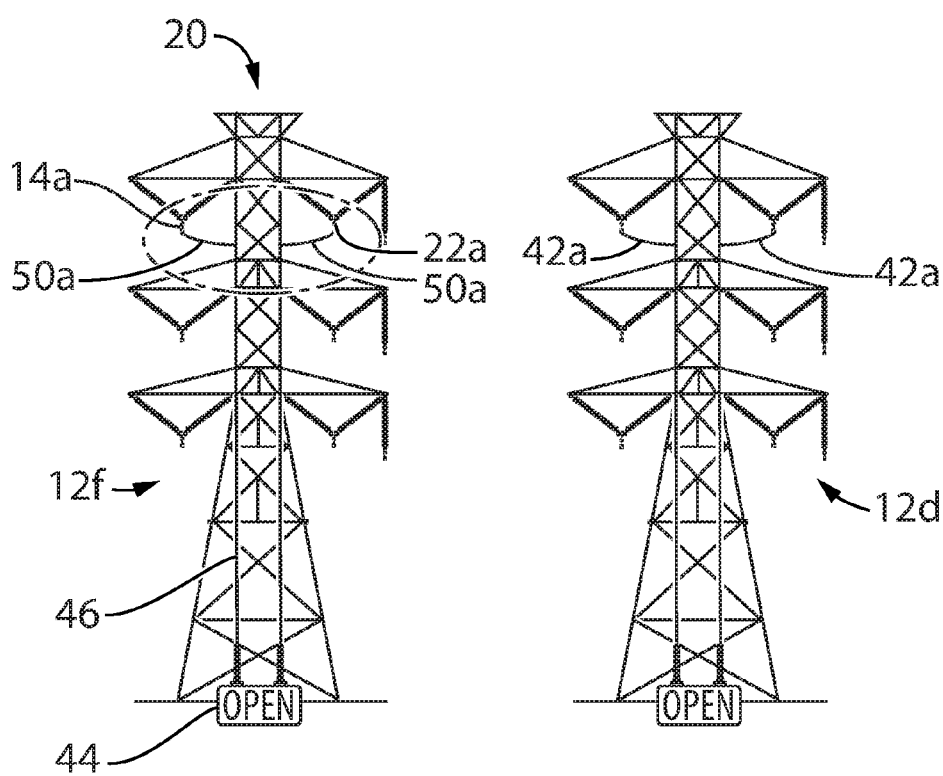
FIG. 10B  FIG. 10C

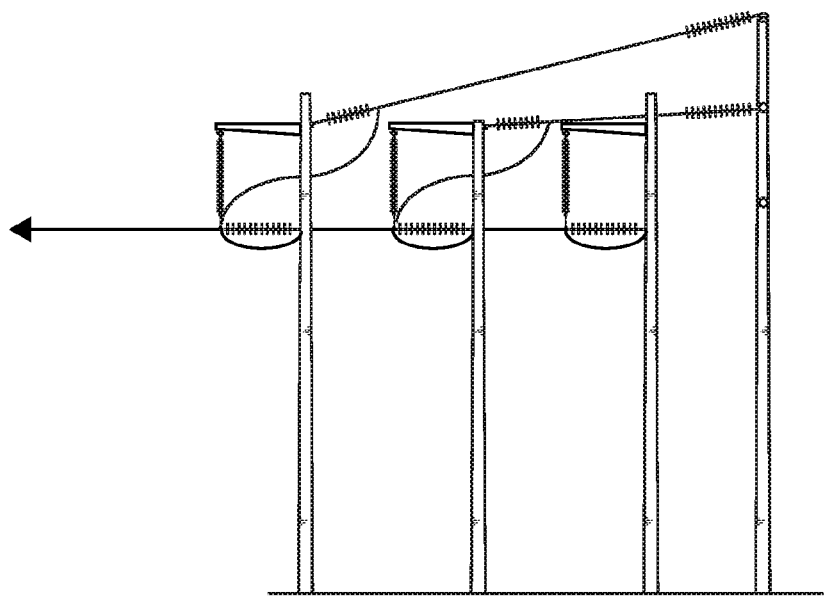
FIG. 11A
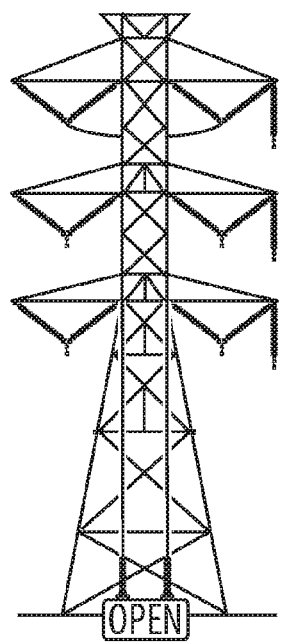 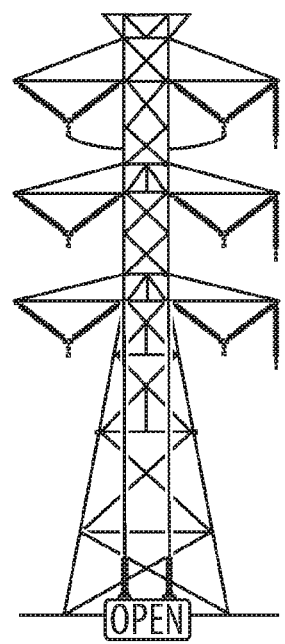
FIG. 11B     FIG. 11C

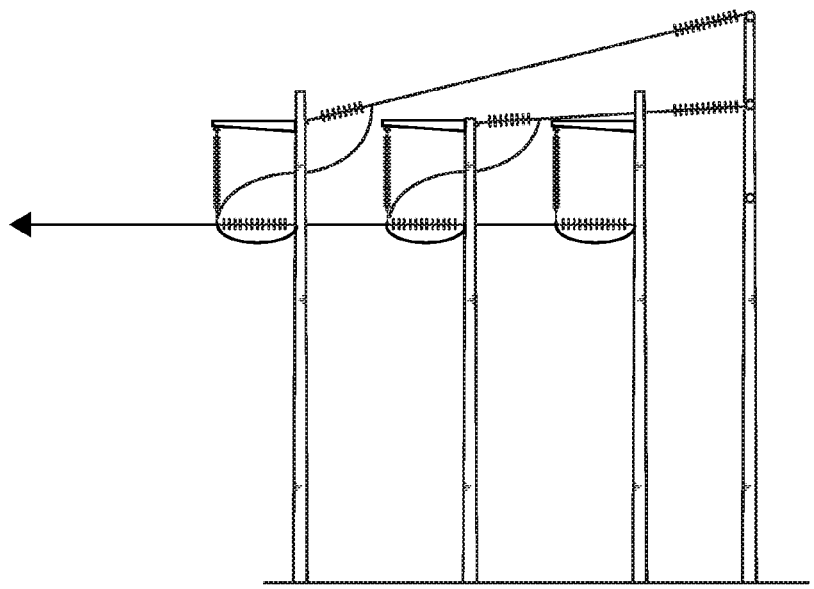
FIG. 13A
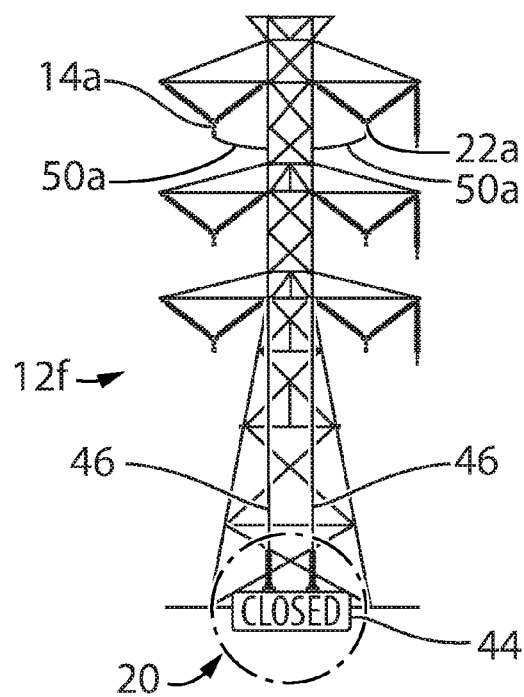 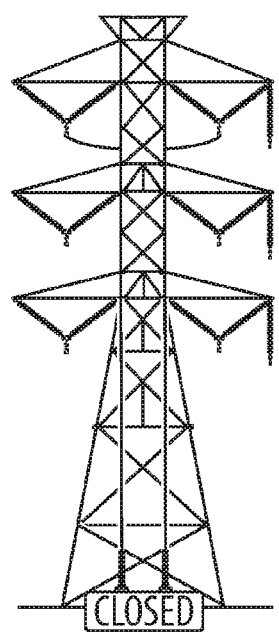
FIG. 13B  FIG. 13C

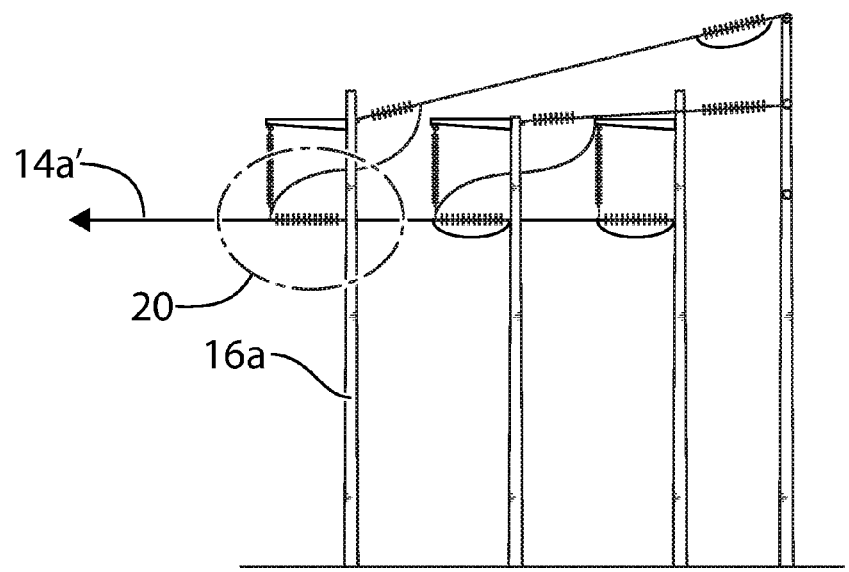
FIG. 15A
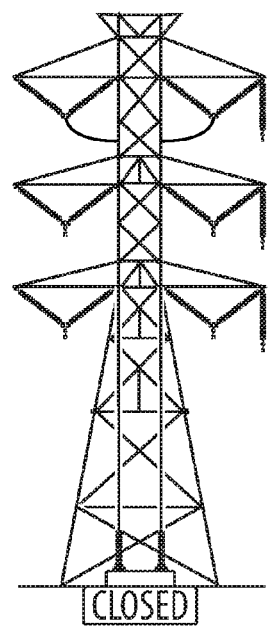 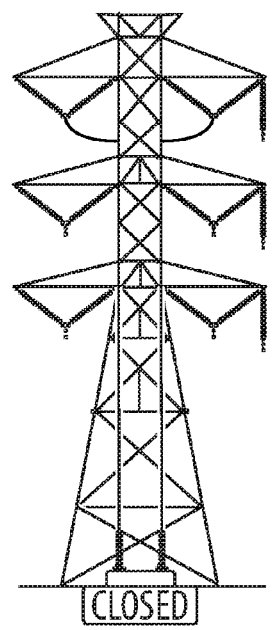
FIG. 15B        FIG. 15C

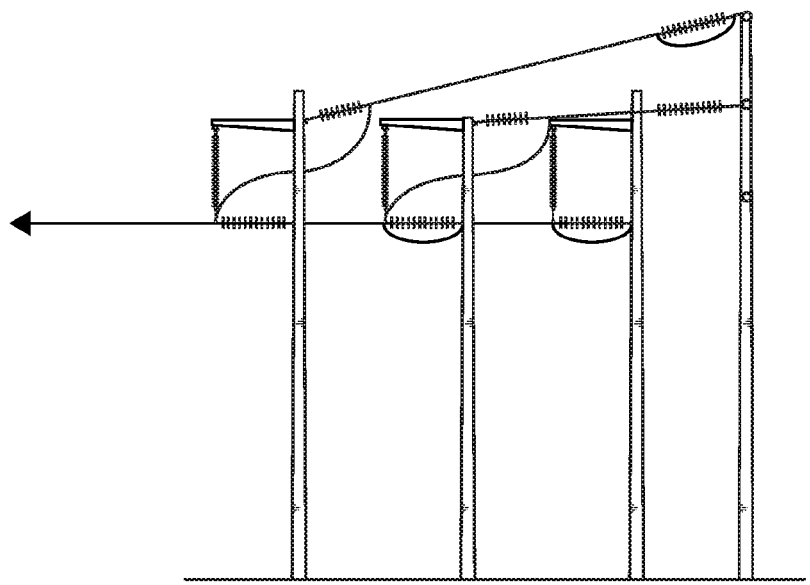
FIG. 16A
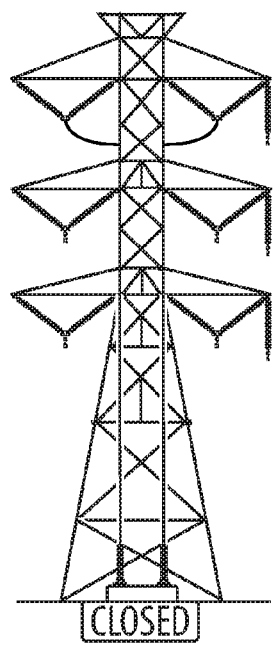 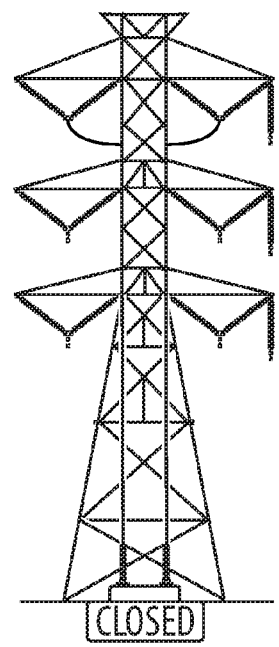
FIG. 16B  FIG. 16C

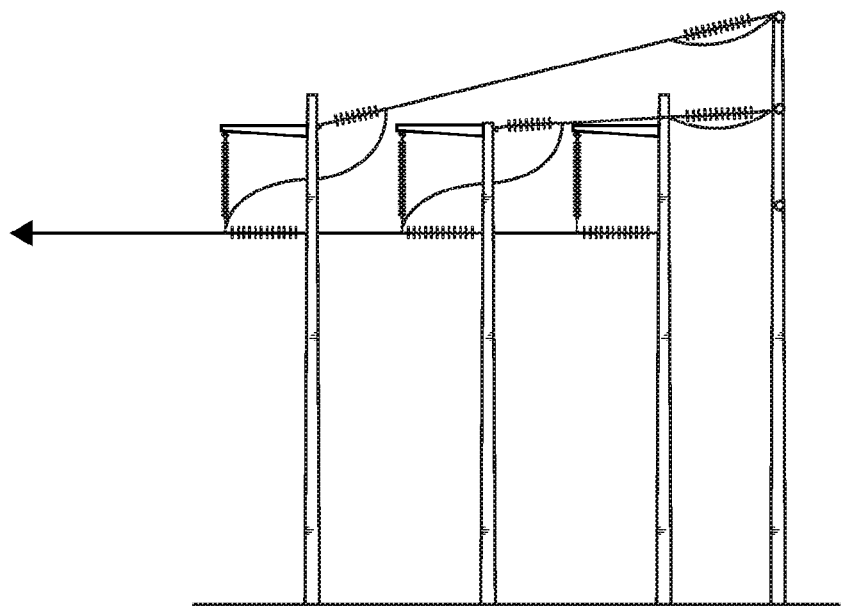
FIG. 17A
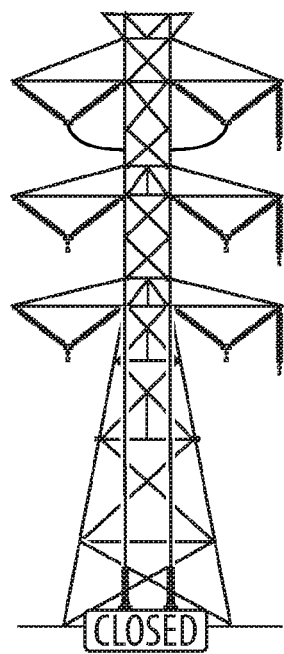 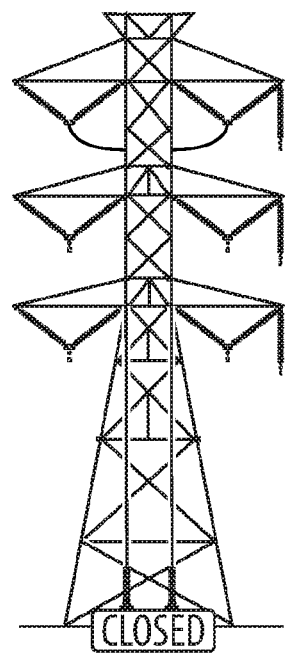
FIG. 17B        FIG. 17C

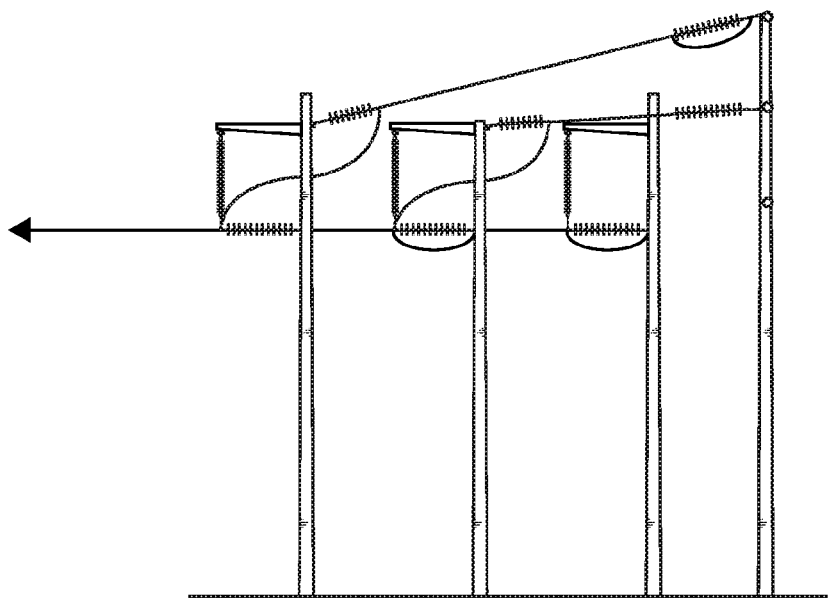
FIG. 18A
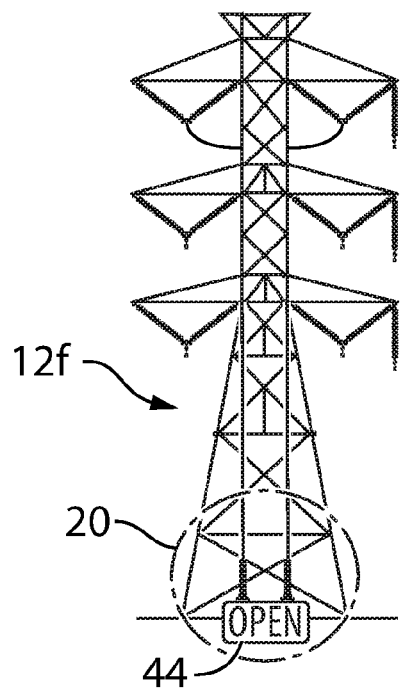 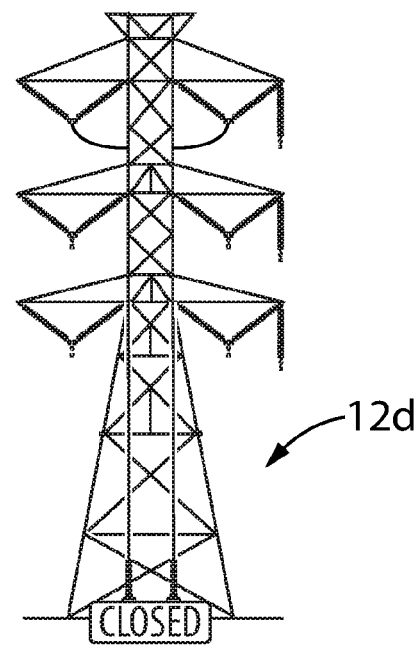
FIG. 18B FIG. 18C

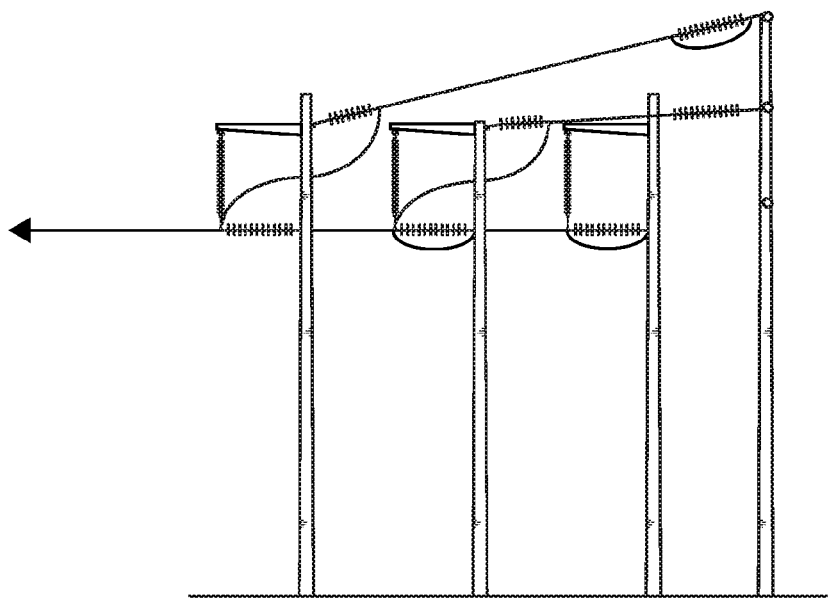
FIG. 19A
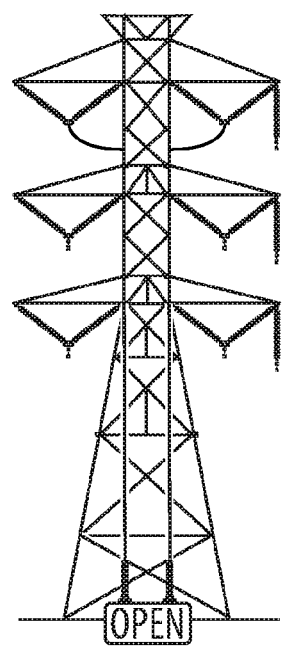 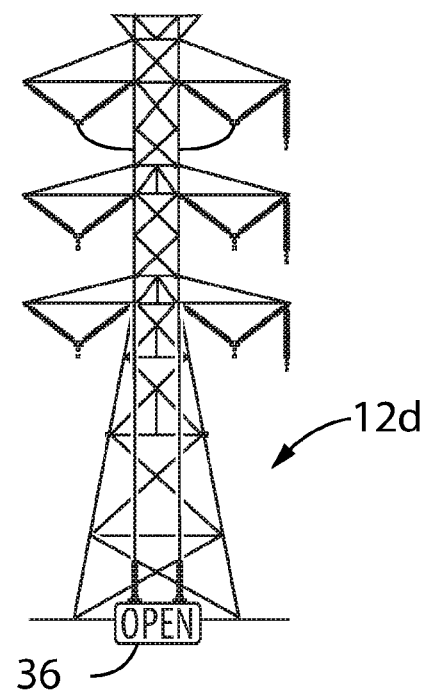
FIG. 19B FIG. 19C

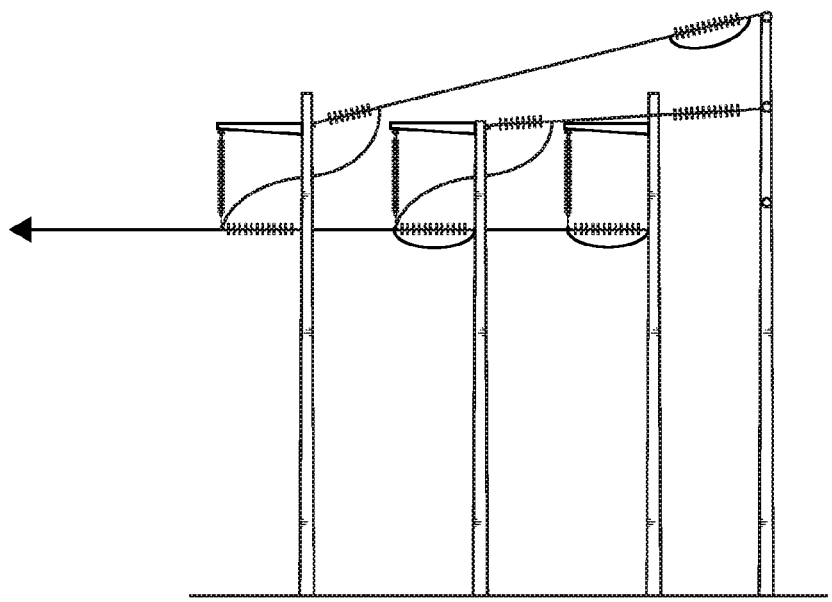
FIG. 20A
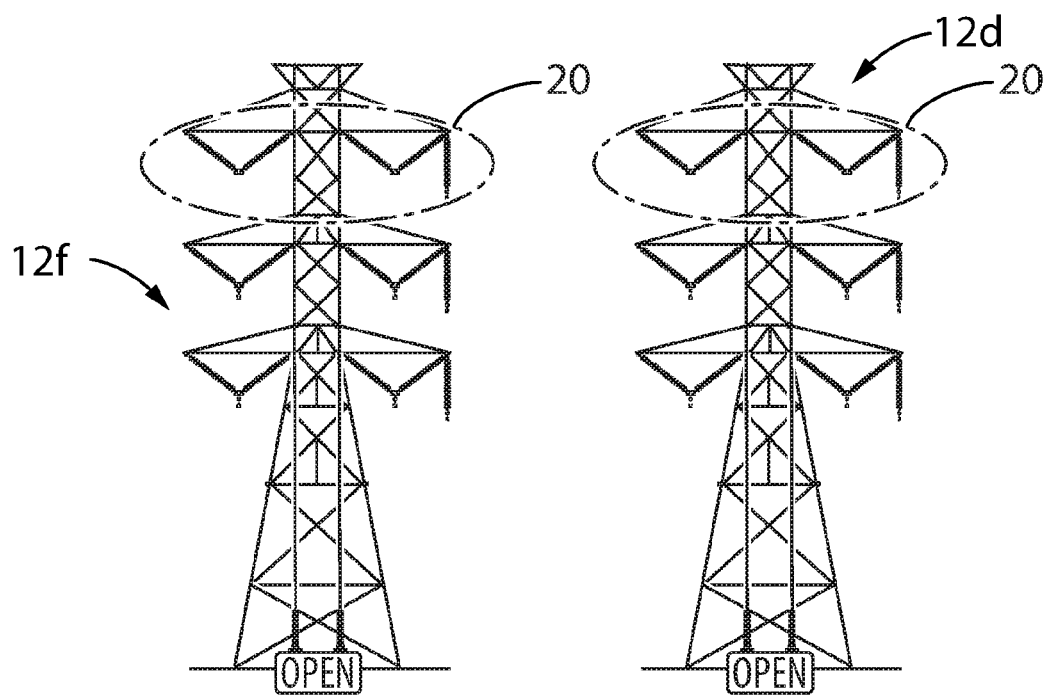
FIG. 20B   FIG. 20C

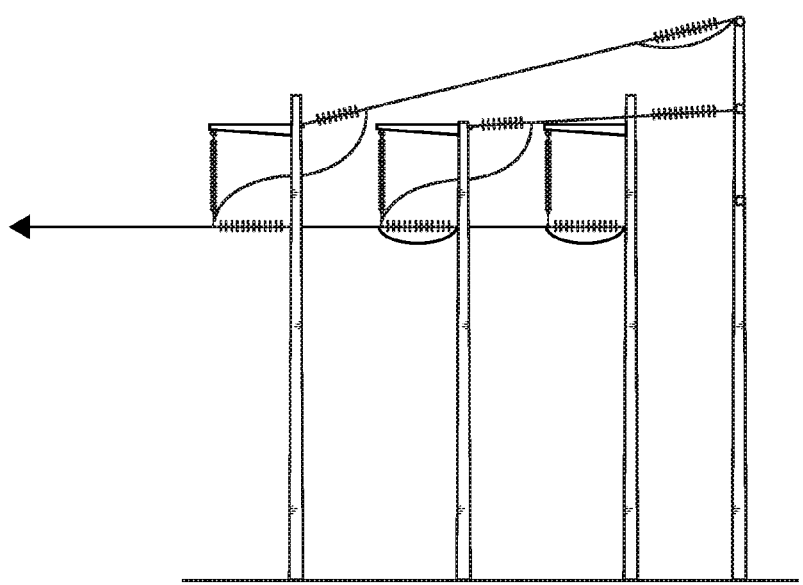
FIG. 21A
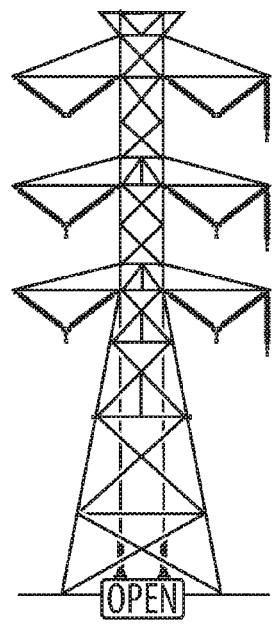 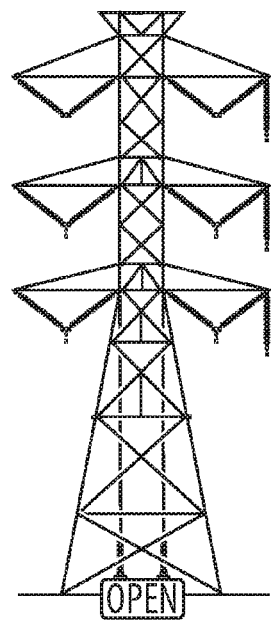
FIG. 21B  FIG. 21C

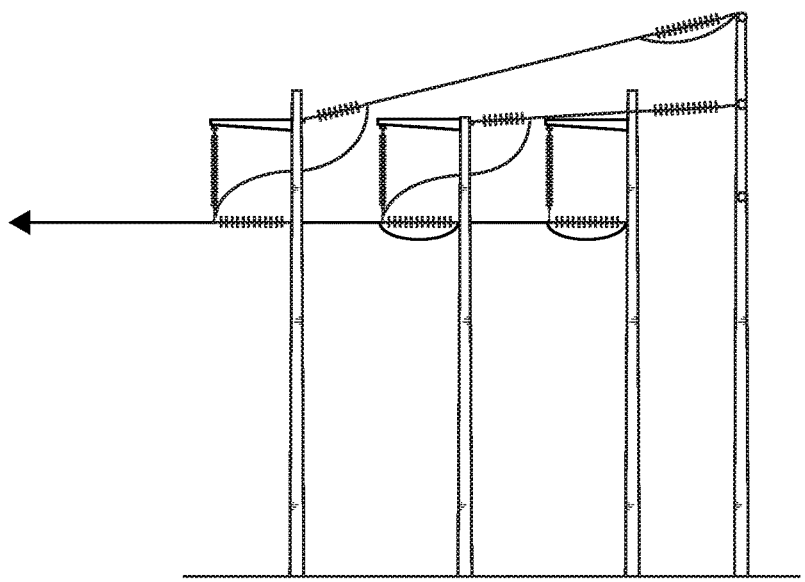
FIG. 22A
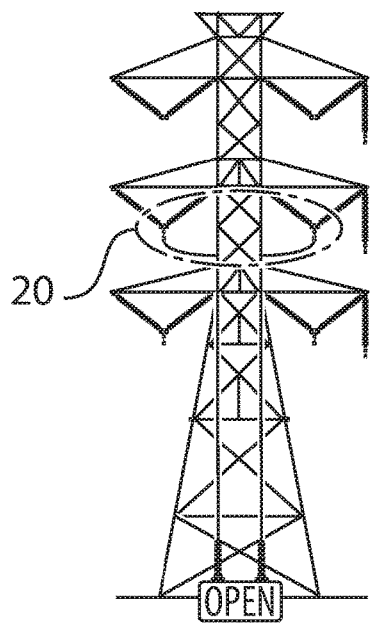 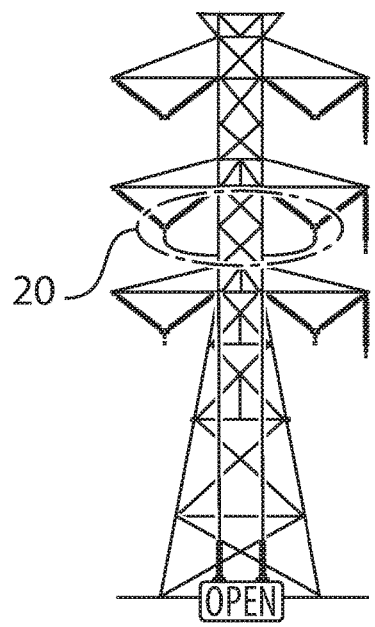
FIG. 22B      FIG. 22C

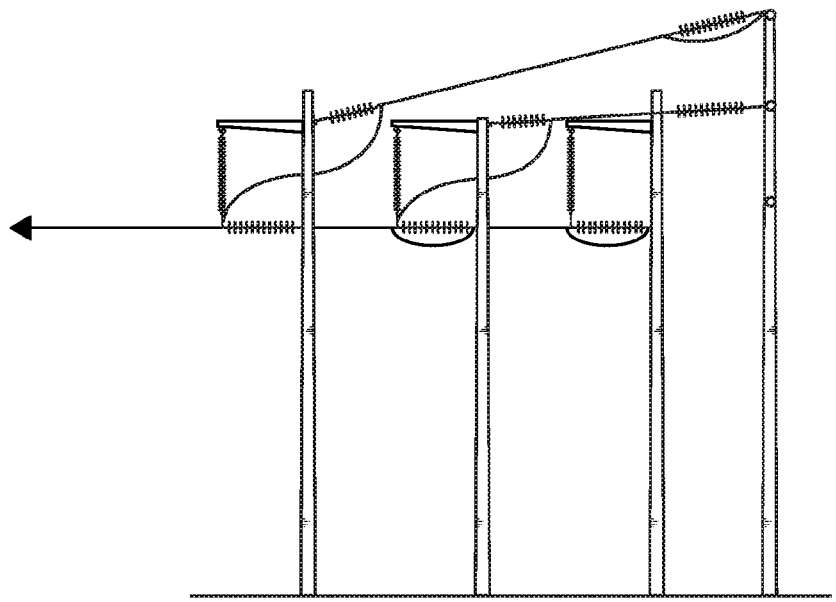
FIG. 23A
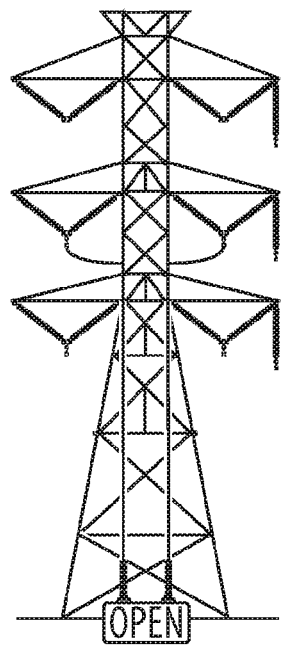 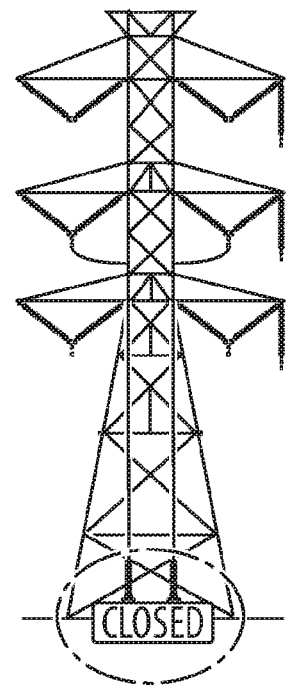
FIG. 23B  FIG. 23C

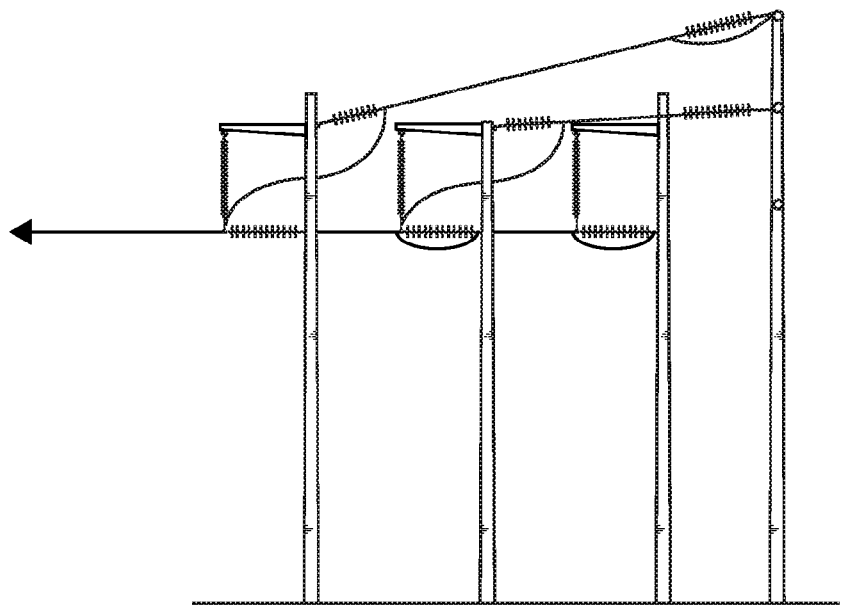
FIG. 24A
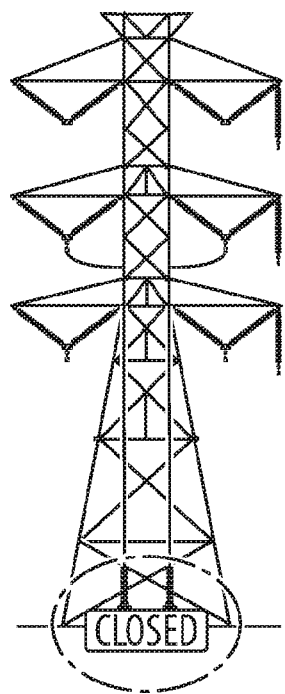 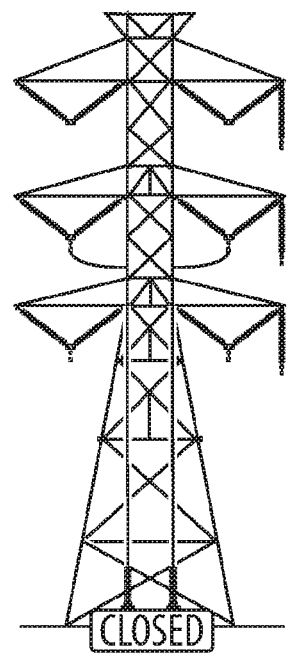
FIG. 24B  FIG. 24C

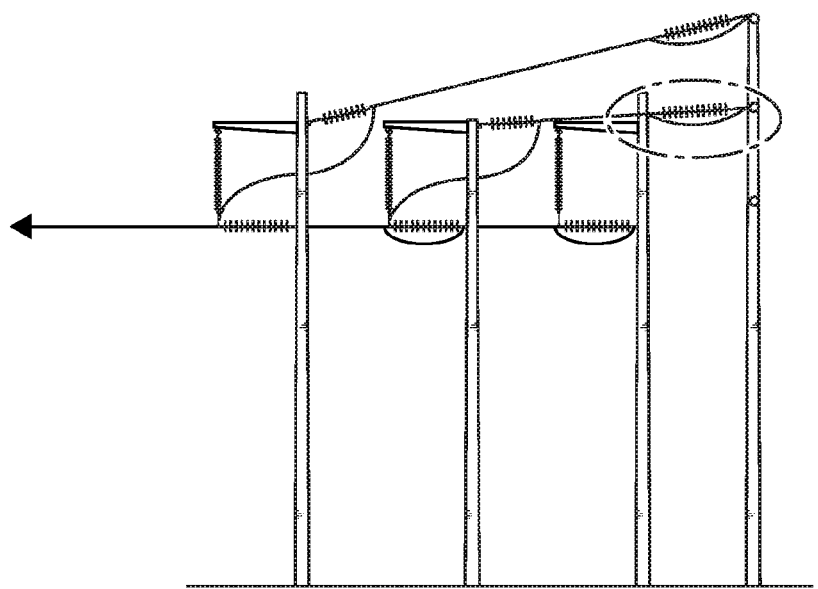
FIG. 25A
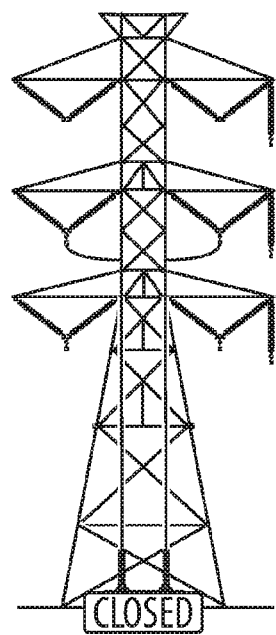 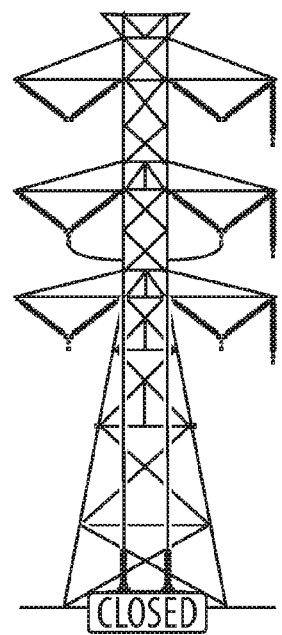
FIG. 25B    FIG. 25C

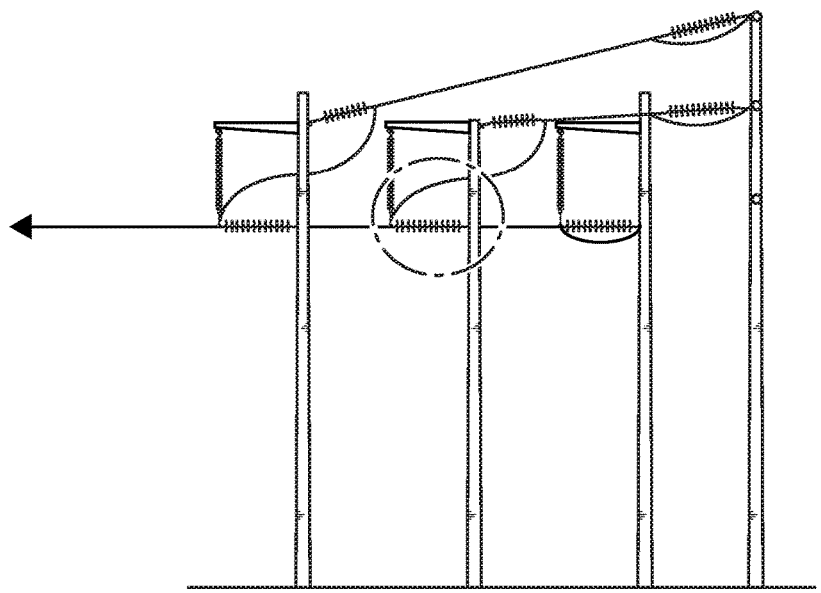
FIG. 26A
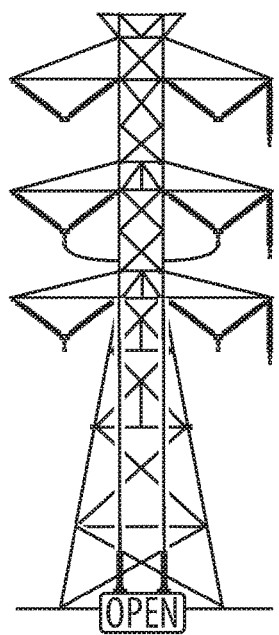  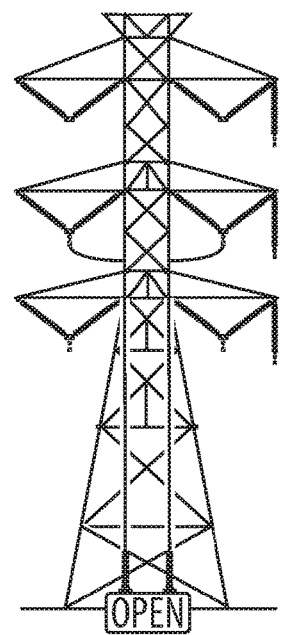
FIG. 26B    FIG. 26C

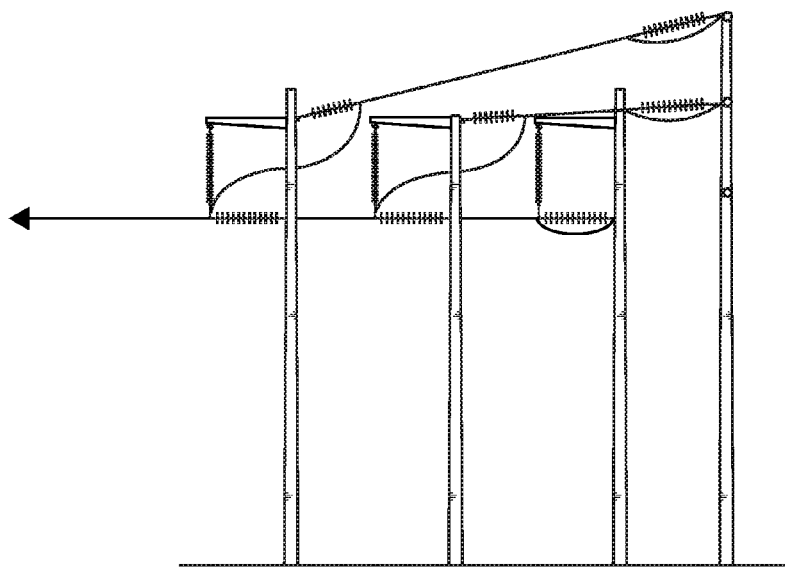
FIG. 27A
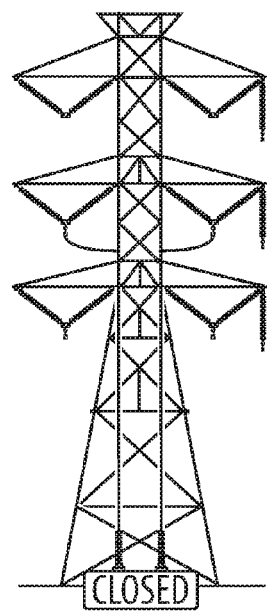 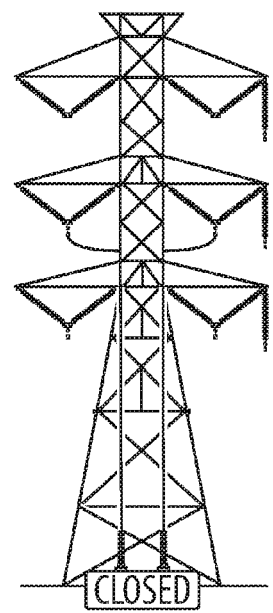
FIG. 27B  FIG. 27C

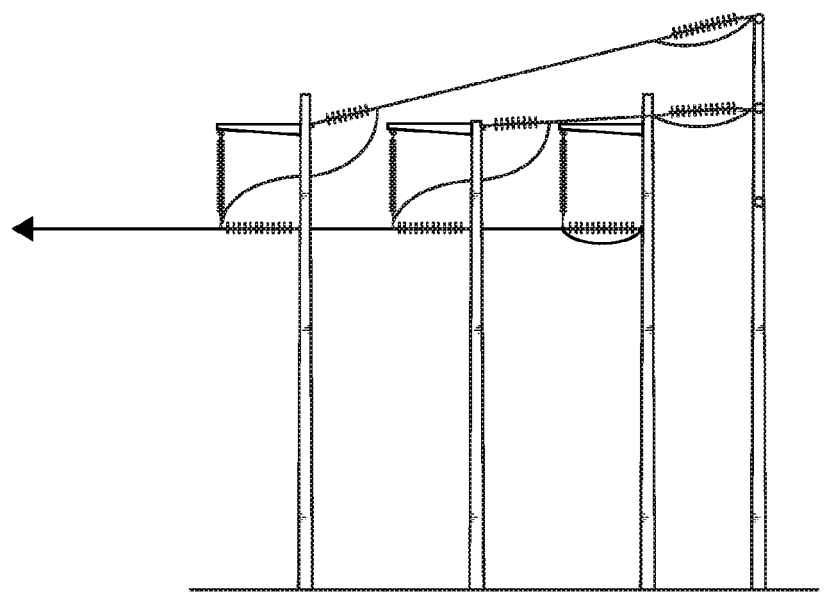
FIG. 28A
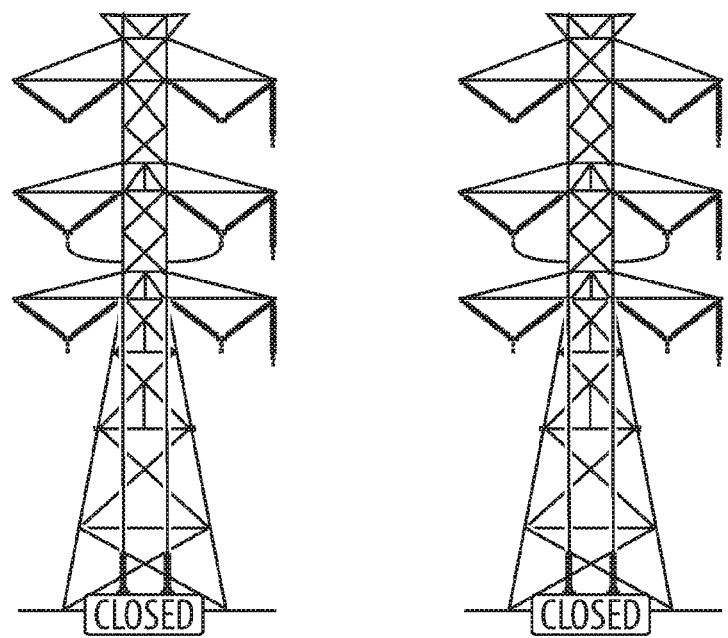
FIG. 28B  FIG. 28C

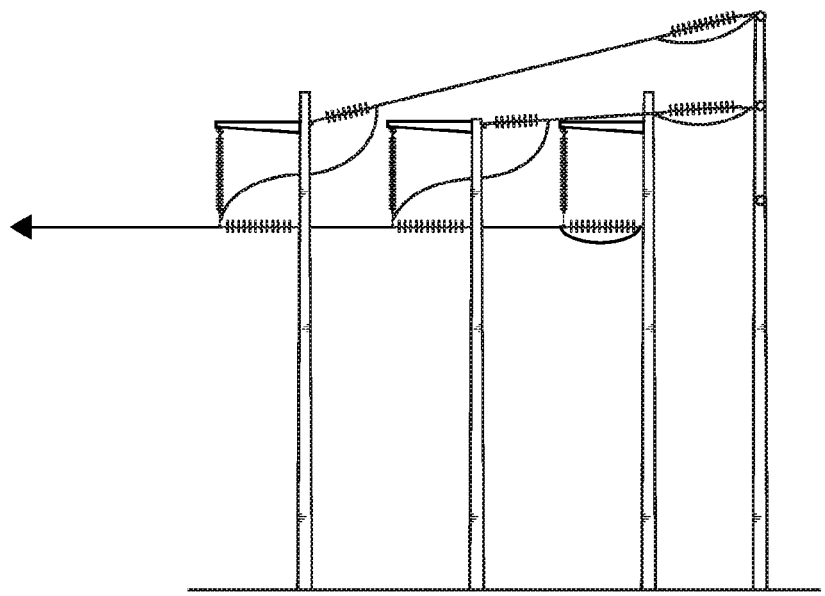
FIG. 29A
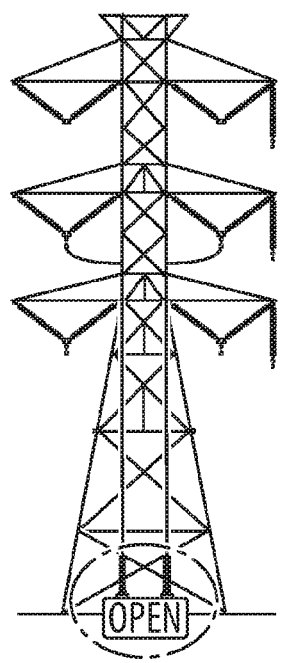 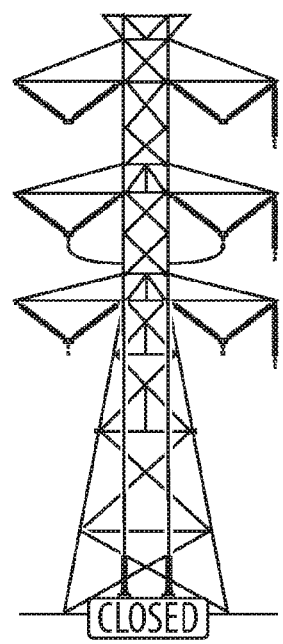
FIG. 29B          FIG. 29C

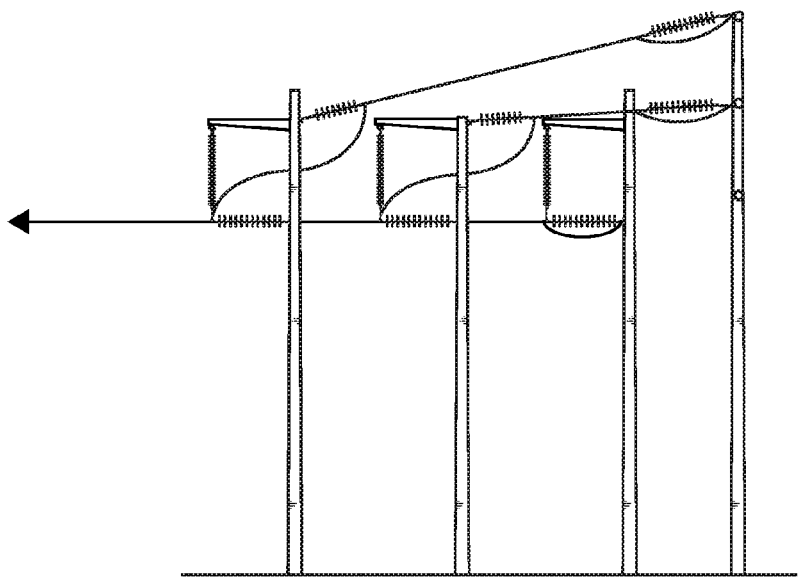
FIG. 31A
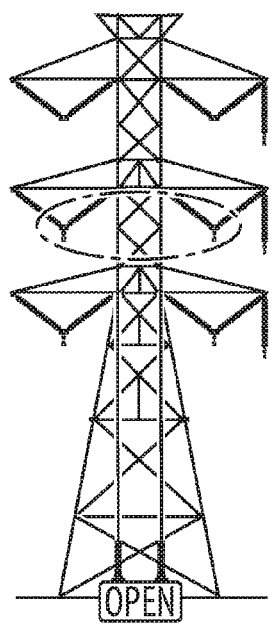 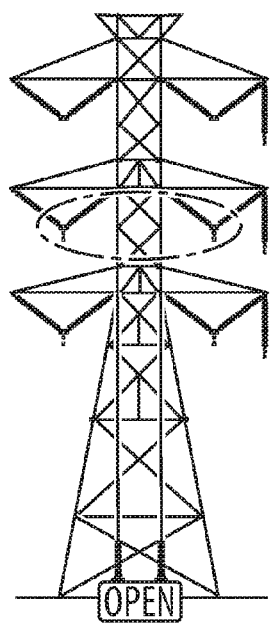
FIG. 31B          FIG. 31C

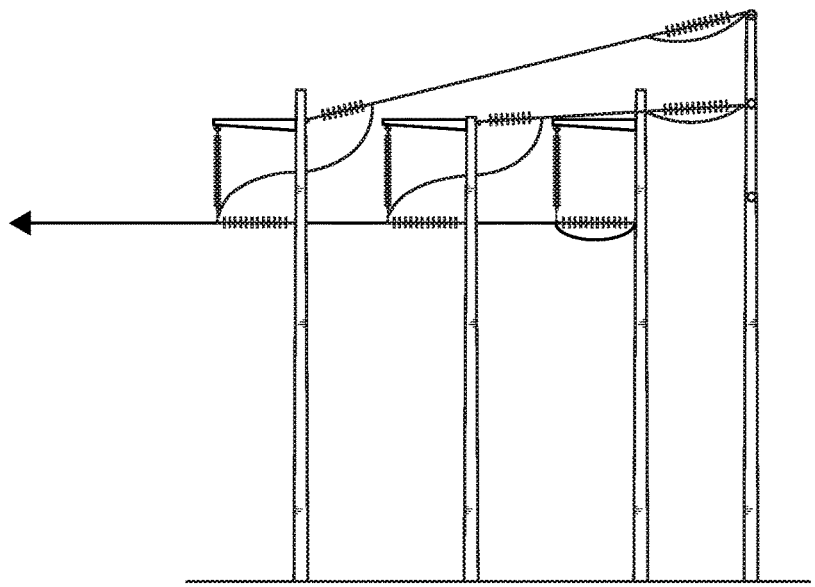
FIG. 32A
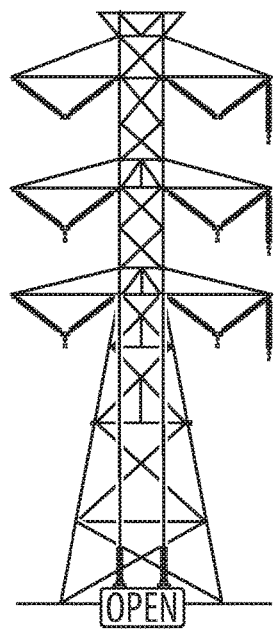 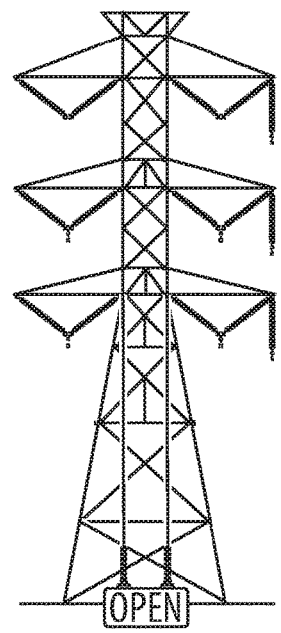
FIG. 32B        FIG. 32C

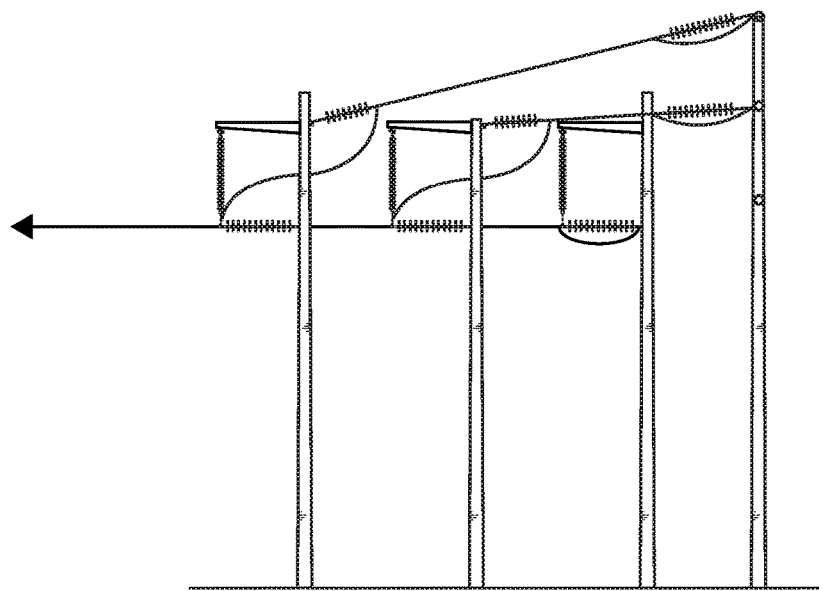
FIG. 33A
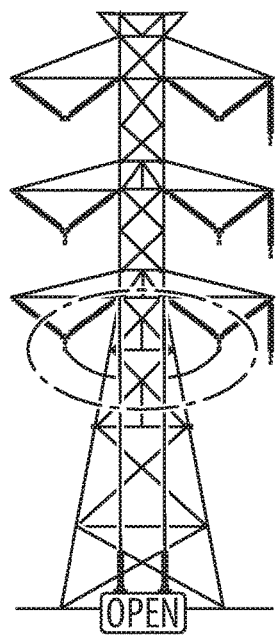 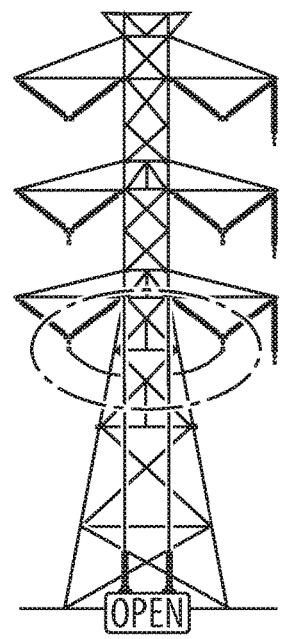
FIG. 33B      FIG. 33C

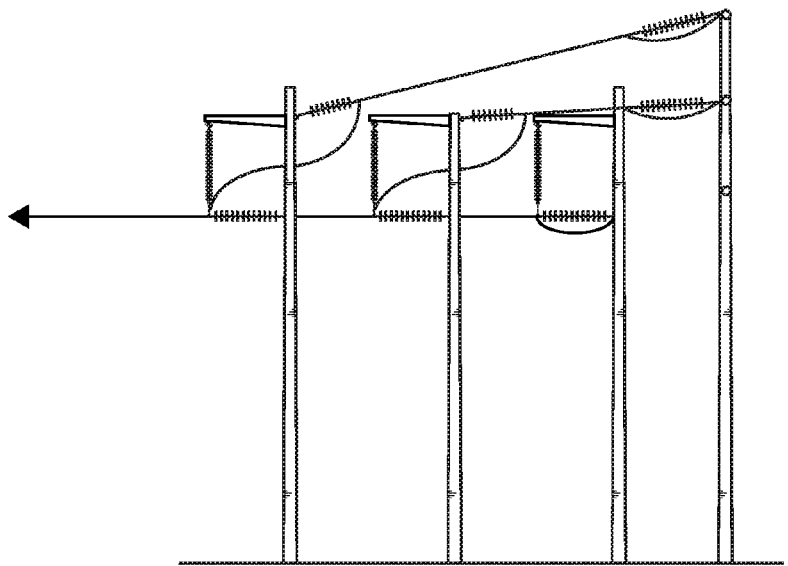
FIG. 34A
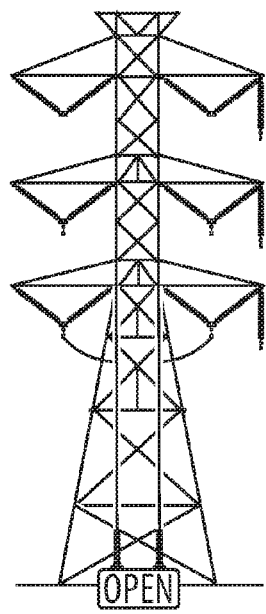 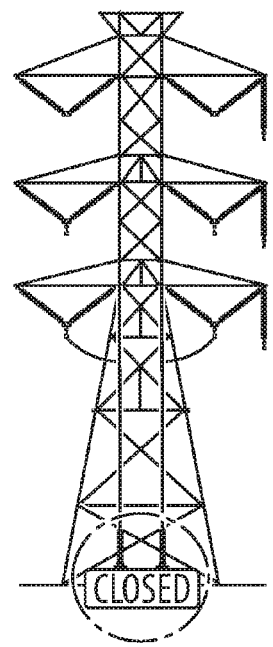
FIG. 34B  FIG. 34C

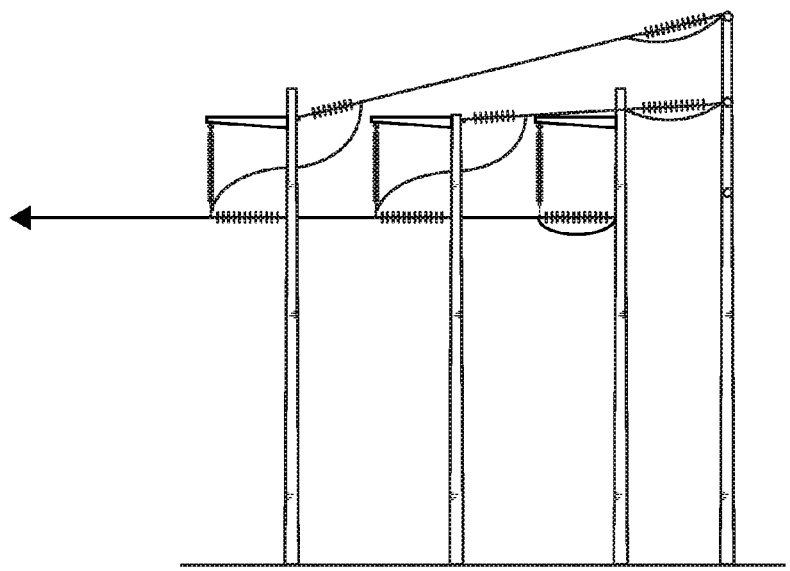
FIG. 35A
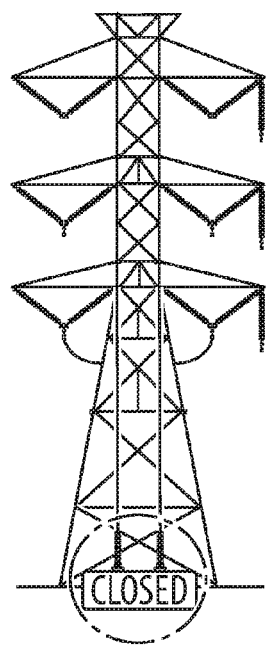 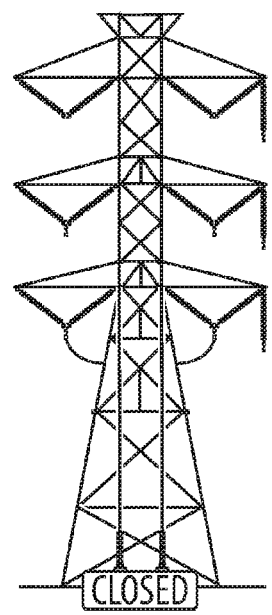
FIG. 35B  FIG. 35C

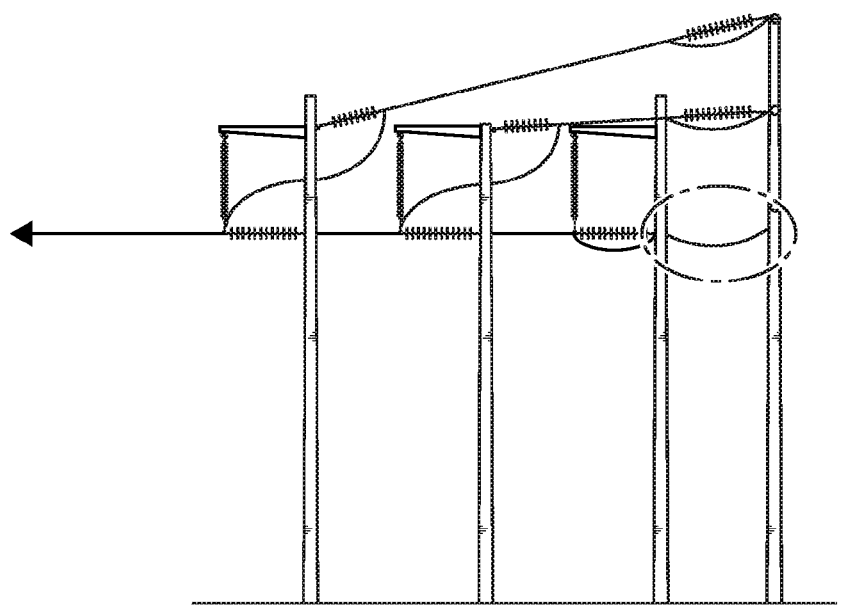
FIG. 36A
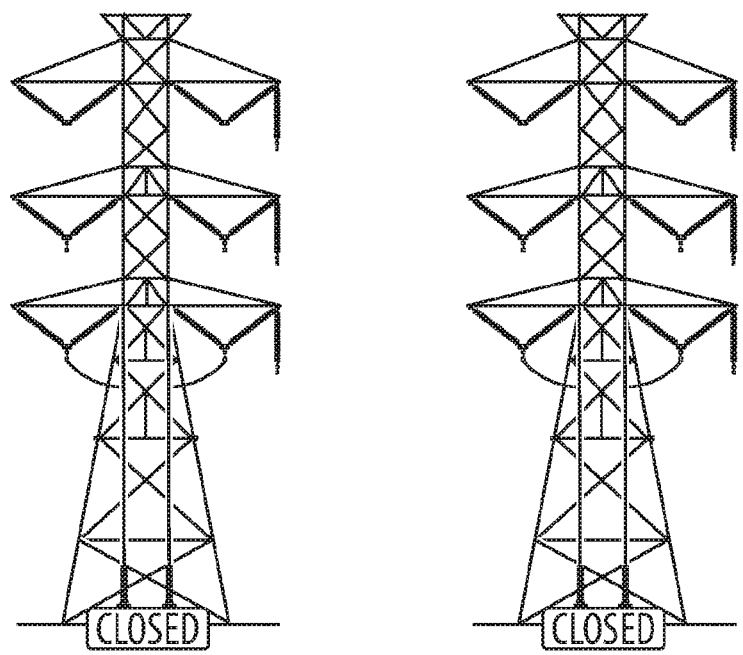
FIG. 36B  FIG. 36C

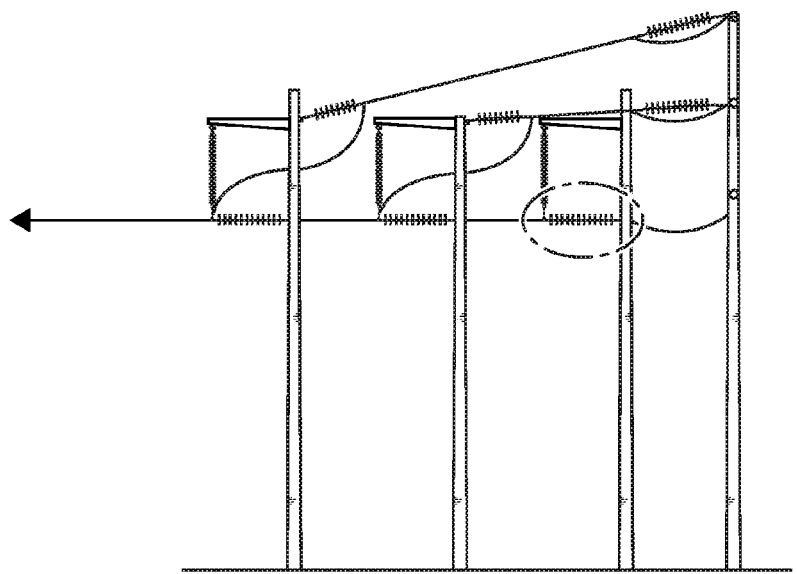
FIG. 37A
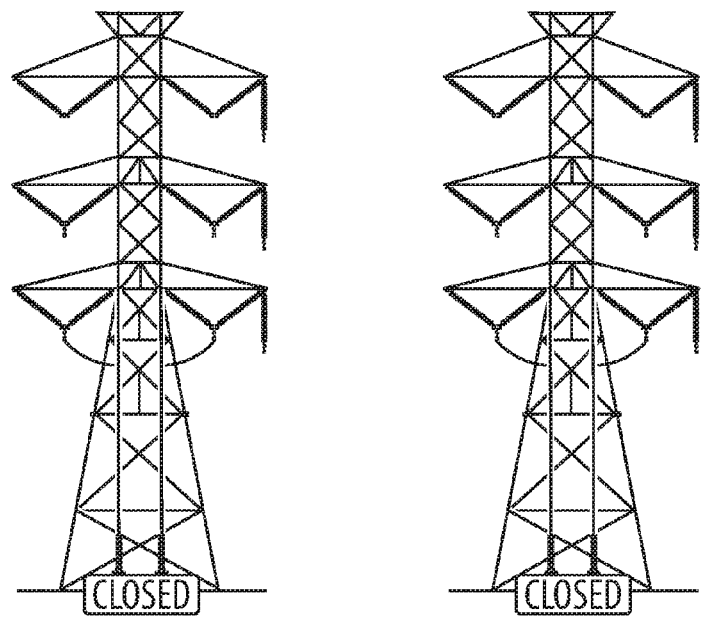
FIG. 37B    FIG. 37C

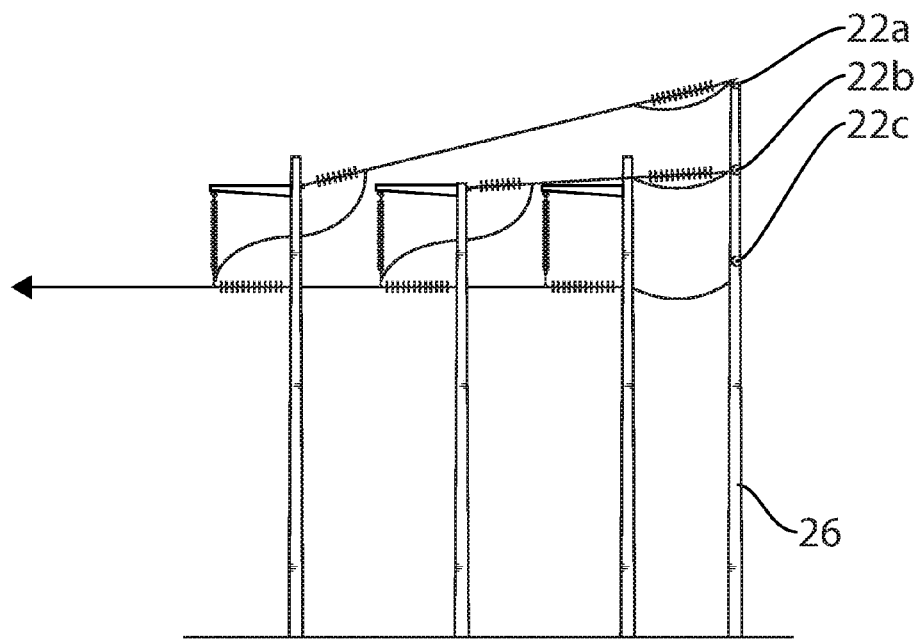
FIG. 38A
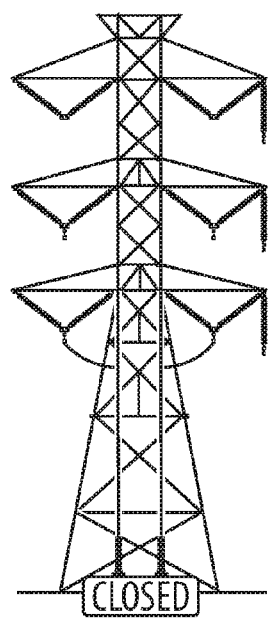 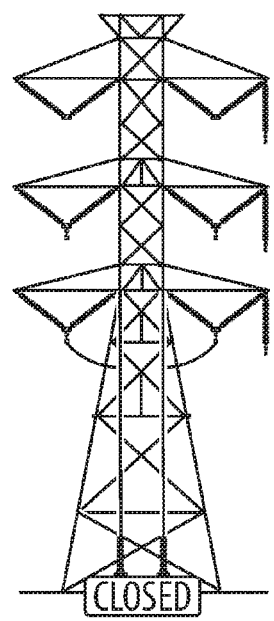
FIG. 38B        FIG. 38C

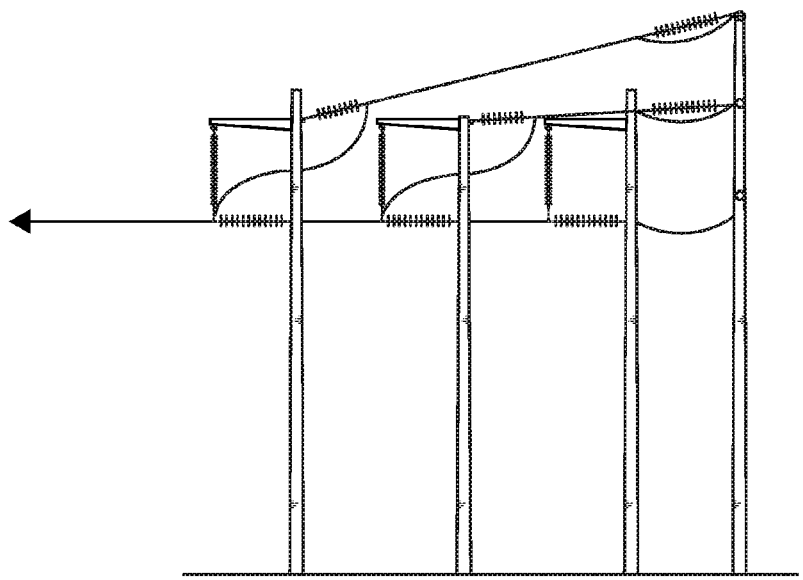
FIG. 39A
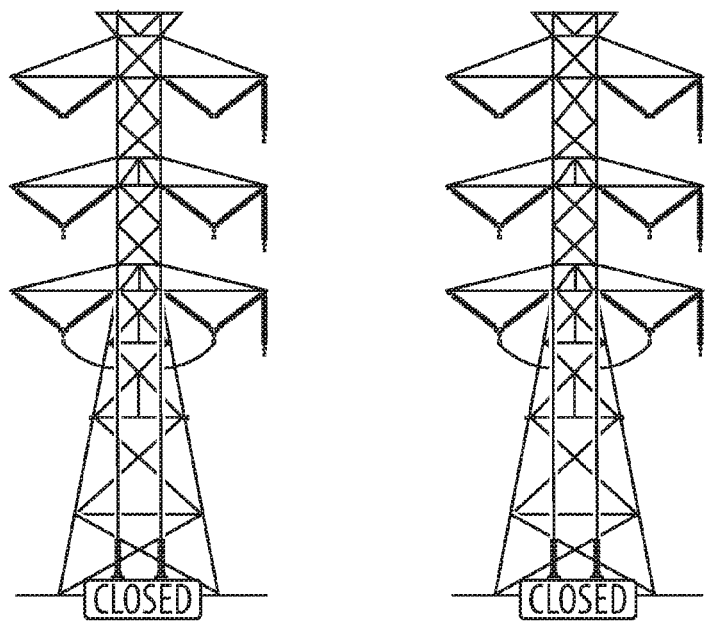
FIG. 39B  FIG. 39C

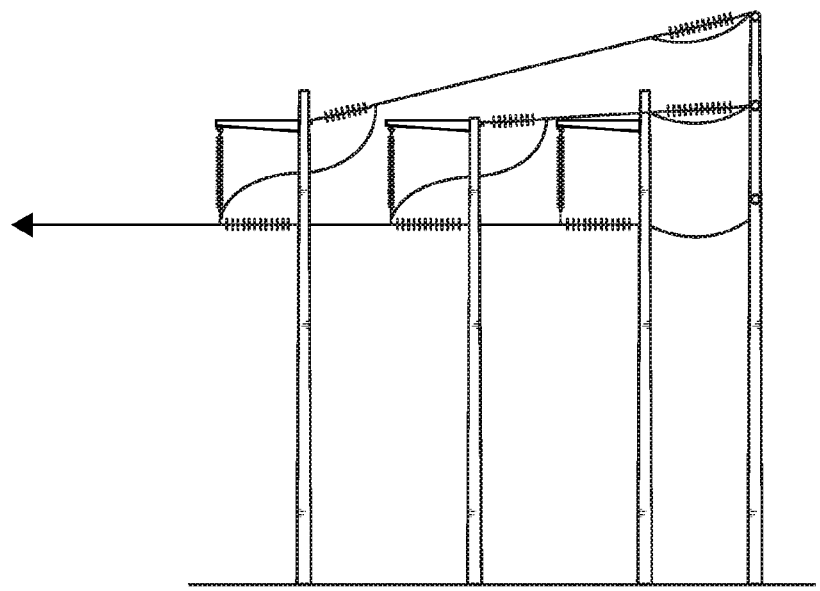
FIG. 40A
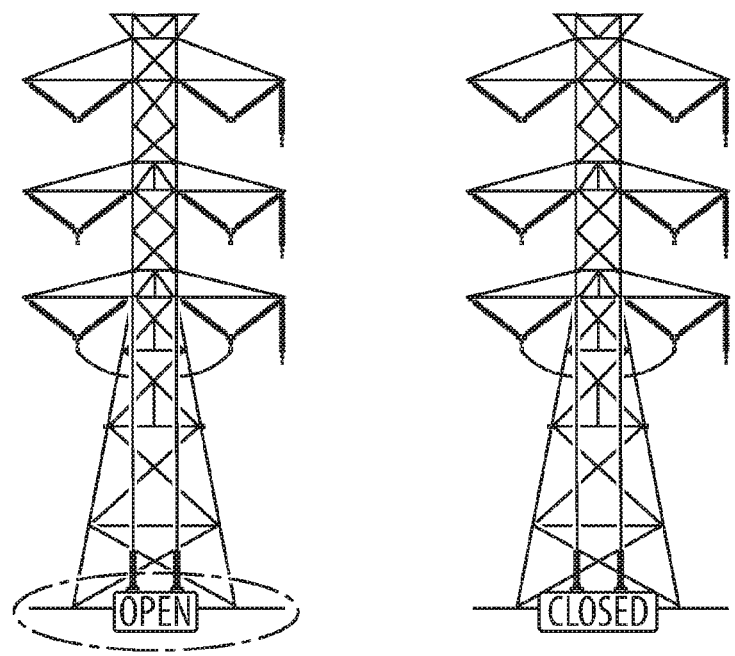
FIG. 40B  FIG. 40C

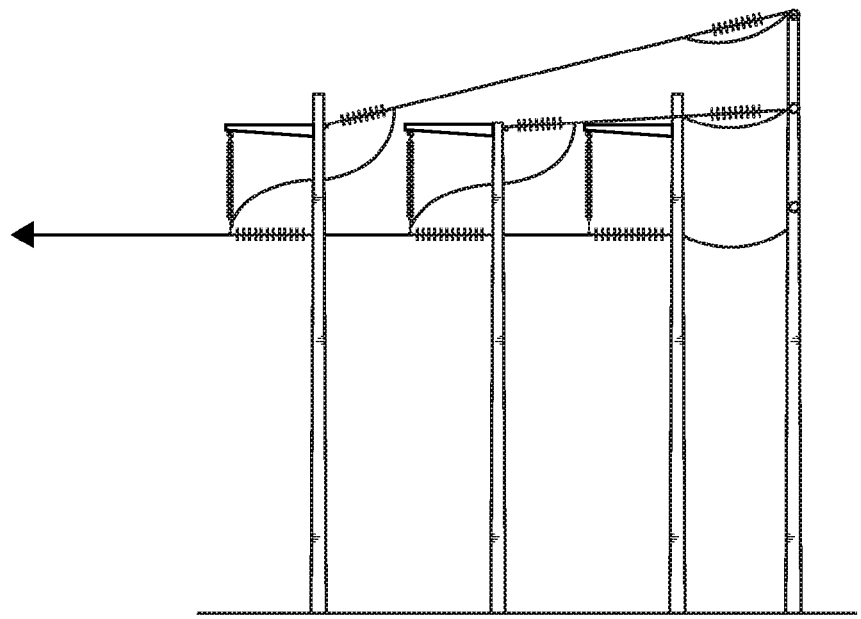
FIG. 41A
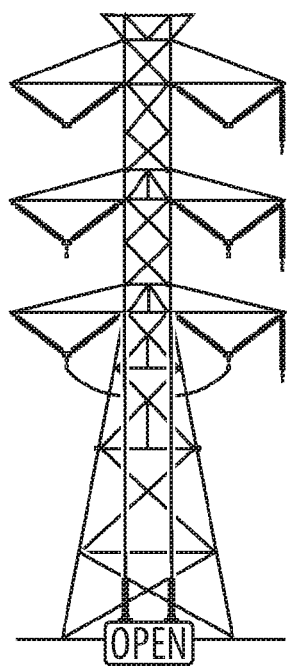 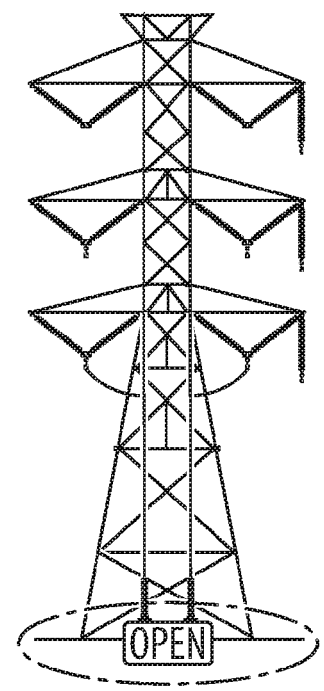
FIG. 41B　　FIG. 41C

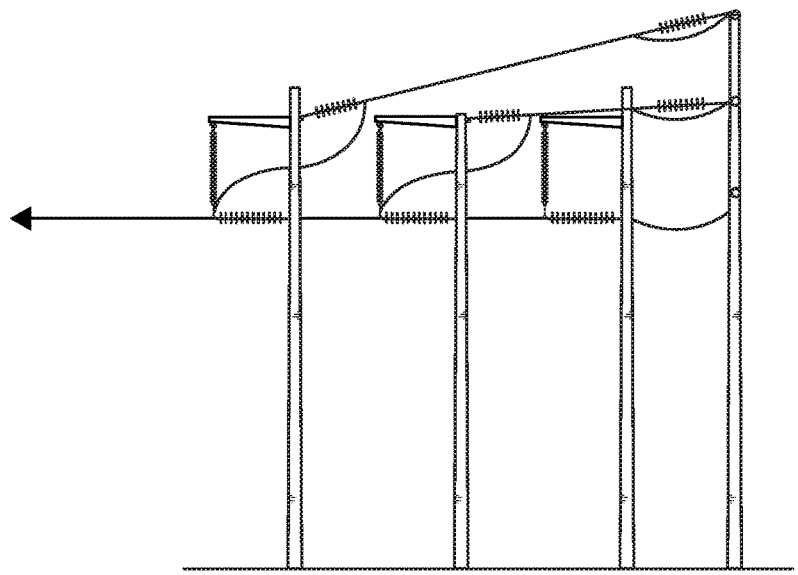
FIG. 42A
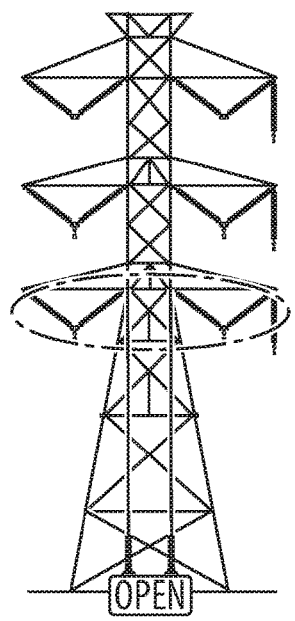 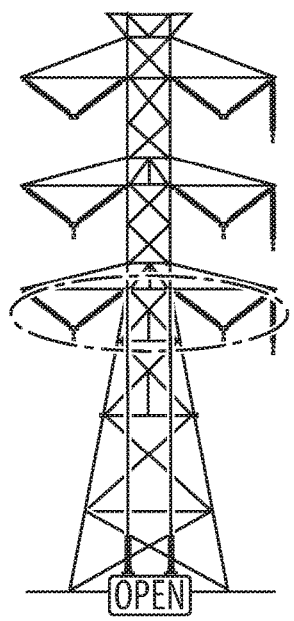
FIG. 42B  FIG. 42C

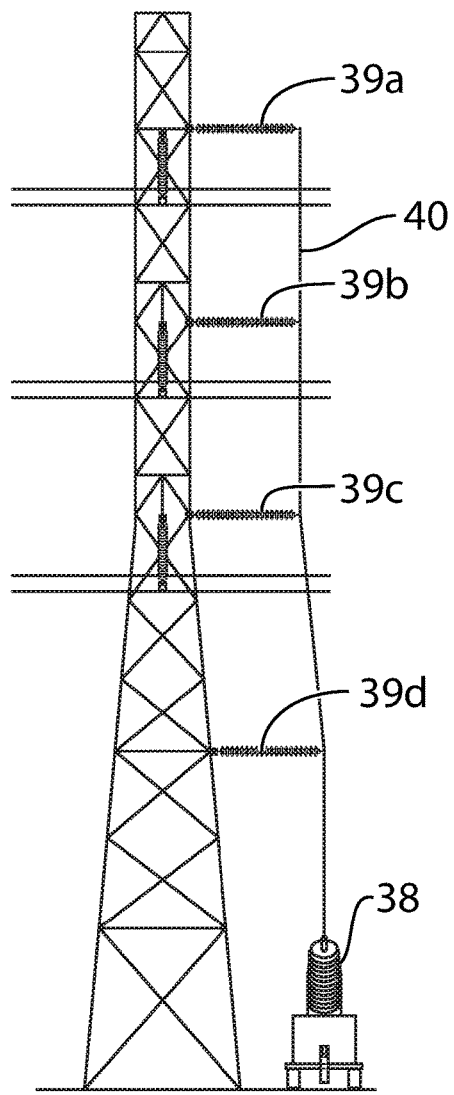
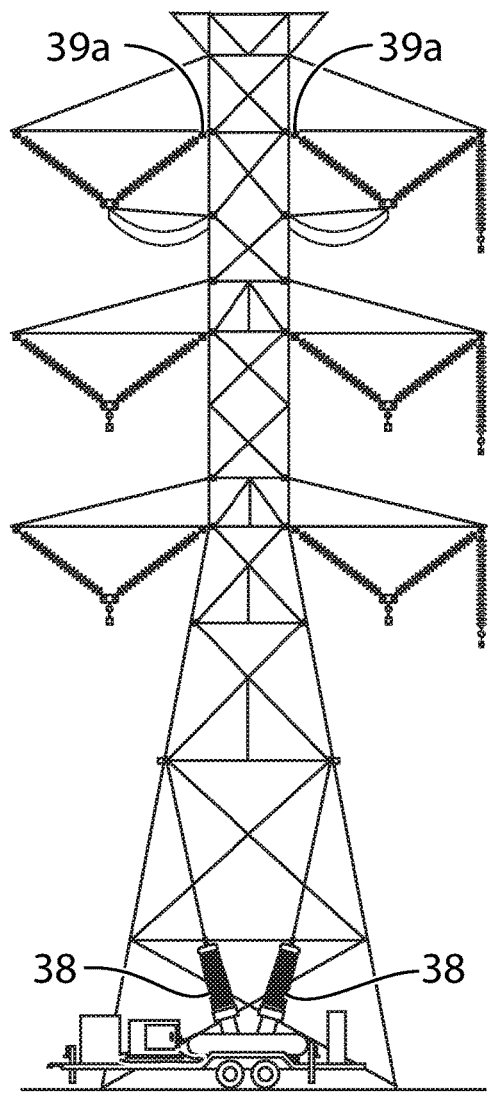
FIG. 43A                                   FIG. 43B

US 10,367,337 B2

CONDUCTOR AS A TOOL

FIELD OF THE INVENTION

This invention relates to the field of repair or re-conductoring of energized conductors and to the use and re-use of temporary conductors in the manner of a tool which is used over and over again as work progresses from section to section along energized power lines.

SUMMARY OF THE INVENTION

A method of using a piece of conductor as a tool, wherein the method is for use in live re-conductoring of energized phases, at a voltage potential, strung, in at least a first section, between at least first and second supports, and also in a contiguous second section, contiguous to the first section, between the second and a third support,
  wherein in both the first and second sections of the energized phases or conductors are contiguous between the first and second sections,
  and wherein the energized phases or conductors comprise a spaced apart energized array of energized conductors, which may be substantially parallel, and which may be vertically or horizontally aligned vertically spaced apart energized array of energized conductors, wherein the energized conductors comprise separate phases,
  the method comprising in the first section:
  a) providing a re-usable set of temporary conductors,
  b) stringing the temporary conductors in a substantially aligned, spaced apart temporary array alongside, and spaced apart from, the energized array so that each energized conductor of the energized array has a corresponding temporary conductor of the temporary array alongside it,
  c) commencing with a first energized conductor of the energized array, energizing so as to bring a corresponding first temporary conductor of the temporary array to the voltage potential of the first energized conductor, paralleling the first temporary conductor with the first energized conductor, and then de-energizing the first conductor,
  d) maintaining, for example, repairing or re-conductoring, the de-energized first conductor or delaying the maintenance,
  e) repeating in sequence steps (a) through (d) for each subsequent energized conductor in the energized array and corresponding temporary conductor in the temporary array,
  f) for those energized conductors not maintained in step (d), then maintaining those energized conductors, then,
  g) re-energizing the conductors and paralleling the energized conductors with the temporary conductors,
  h) de-energizing the temporary conductors,
  i) removing the temporary conductors for later re-use as a tool in the second section, the method further comprising in the second section:
  j) providing the set of temporary conductors,
  k) repeating steps (b) through (i), whereby the maintenance on the first and second sections occurs without transposing relative positions of the energized conductors in the energized array, and whereby the temporary conductors are re-usable from section to section.

The invention is an apparatus, system and/or method as shown, described or implied herein.

BRIEF DESCRIPTION OF THE DRAWINGS

In the drawings wherein like reference characters denote corresponding parts in each view; and wherein the procedure described in FIGS. 1-20 apply to a first of three phases and are illustrated by way of example as applied to the top phase in a vertical array of three phases: namely, a top phase, a center phase, and a bottom phase:

FIG. 8A is a sectional view in FIG. 8 at the position of the sectional view of FIG. 7A in FIG. 7.

FIG. 8B is a sectional view in FIG. 8 at the position of a sectional view of FIG. 7B in FIG. 7.

FIG. 8C is a sectional view in FIG. 8 at the position of a sectional view of FIG. 7C in FIG. 7.

FIG. 9A is a sectional view in FIG. 9 at the position of the sectional view of FIG. 8A in FIG. 8.

FIG. 9B is a sectional view in FIG. 9 at the position of the sectional view of FIG. 8B in FIG. 8.

FIG. 9C is a sectional view in FIG. 9 at the position of the sectional view of FIG. 8C in FIG. 8.

FIG. 10A is a sectional view in FIG. 10 at the position of a sectional view of FIG. 9A in FIG. 9.

FIG. 10B is a sectional view in FIG. 10 at the position of the sectional view of FIG. 9B in FIG. 9.

FIG. 10C is a sectional view in FIG. 10 at the position of the sectional view of FIG. 9C in FIG. 9.

FIG. 11A is a sectional view in FIG. 11 at the position of the sectional view of FIG. 10A in FIG. 10.

FIG. 11B is a sectional view in FIG. 11 at the position of the sectional view of FIG. 10B in FIG. 10.

FIG. 11C is a sectional view in FIG. 11 at the position of the sectional view of FIG. 10C in FIG. 10.

FIG. 13A is a sectional view in FIG. 13 at the position of a sectional view of FIG. 12A in FIG. 12.

FIG. 13B is a sectional view in FIG. 13 at the position of a sectional view of FIG. 12B in FIG. 12.

FIG. 13C is a sectional view in FIG. 13 at the position of a sectional view of FIG. 12C in FIG. 12.

FIG. 15A is a sectional view in FIG. 15 at the position of a sectional view of FIG. 14A in FIG. 14.

FIG. 15B is a sectional view in FIG. 15 at the position of the sectional view of FIG. 14B in FIG. 14.

FIG. 15C is a sectional view in FIG. 15 at the position of the sectional view of FIG. 14C in FIG. 14.

FIG. 16A is a sectional view in FIG. 16 at the position of the sectional view of FIG. 15A in FIG. 15.

FIG. 16B is a sectional view in FIG. 16 at the position of the sectional view of FIG. 15B in FIG. 15.

FIG. 16C is a sectional view in FIG. 16 at the position of the sectional view of FIG. 15C in FIG. 15.

FIG. 17A is a sectional view in FIG. 17 in the position of the sectional view of FIG. 16A in FIG. 16.

FIG. 17B is a sectional view of FIG. 17 at the position of the sectional view of FIG. 16B in FIG. 16.

FIG. 17C is a sectional view in FIG. 17 at the position of the sectional view of FIG. 16C in FIG. 16.

FIG. 18A is a sectional view in FIG. 18 at the position of the sectional of FIG. 17A in FIG. 17.

FIG. 18B is a sectional view in FIG. 18 at the position of the sectional of FIG. 17B in FIG. 17.

FIG. 18C is a sectional view in FIG. 18 at the position of the sectional of FIG. 17C in FIG. 17.

FIG. 19A is a sectional view in FIG. 19 at the position of the sectional view of FIG. 18A in FIG. 18.

FIG. 19B is a sectional view in FIG. 19 at the position of the sectional view of FIG. 18B in FIG. 18.

FIG. 19C is a sectional view in FIG. 19 at the position of the sectional view of FIG. 18C in FIG. 12.

FIG. 20A is a sectional view in FIG. 20 at the position of the sectional view of FIG. 19A in FIG. 19.

FIG. 20B is a sectional view in FIG. 20 at the position of the sectional view of FIG. 19B in FIG. 19.

FIG. 20C is a sectional view in FIG. 20 at the position of the sectional view of FIG. 19C in FIG. 19.

FIG. 21A is a sectional view in FIG. 21 at the position of the sectional view of FIG. 20A in FIG. 20.

FIG. 21B is a sectional view in FIG. 21 at the position of the sectional view of FIG. 20B in FIG. 20.

FIG. 21C is a sectional view in FIG. 21 at the position of the sectional view of FIG. 20C in FIG. 20.

FIG. 22A is a sectional view in FIG. 22 at the position of the sectional view of FIG. 21A in FIG. 21.

FIG. 22B is a sectional view in FIG. 22 at the position of the sectional view of FIG. 21B in FIG. 21.

FIG. 22C is a sectional view in FIG. 22 at the position of the sectional view of FIG. 21C in FIG. 21.

FIG. 23A is a sectional view in FIG. 23 at the position of the sectional view of FIG. 22A in FIG. 22.

FIG. 23B is a sectional view in FIG. 23 at the position of the sectional view of FIG. 22B in FIG. 22.

FIG. 23C is a sectional view in FIG. 23 at the position of the sectional view of FIG. 22C in FIG. 22.

FIG. 24A is a sectional view in FIG. 24 at the position of the sectional view of FIG. 23A in FIG. 23.

FIG. 24B is a sectional view in FIG. 24 at the position of the sectional view of FIG. 23B in FIG. 23.

FIG. 24C is a sectional view in FIG. 24 at the position of the sectional view of FIG. 23C in FIG. 23.

FIG. 25A is a sectional view in FIG. 25 at the position of the sectional view of FIG. 24A in FIG. 24.

FIG. 25B is a sectional view in FIG. 25 at the position of the sectional view of FIG. 24B in FIG. 24.

FIG. 25C is a sectional view in FIG. 25 at the position of the sectional view of FIG. 24C in FIG. 24.

FIG. 26A is a sectional view in FIG. 26 at the position of the sectional view of FIG. 25A in FIG. 25.

FIG. 26B is a sectional view in FIG. 26 at the position of the sectional view of FIG. 25B in FIG. 25.

FIG. 26C is a sectional view in FIG. 26 at the position of the sectional view of FIG. 25C in FIG. 25.

FIG. 27A is a sectional view in FIG. 27 at the position of the sectional view of FIG. 26A in FIG. 26.

FIG. 27B is a sectional view in FIG. 27 at the position of the sectional view of FIG. 26B in FIG. 26.

FIG. 27C is a sectional view in FIG. 27 at the position of the sectional view of FIG. 26C in FIG. 26.

FIG. 28A is a sectional view in FIG. 28 at the position of the sectional view of FIG. 27A in FIG. 27.

FIG. 28B is a sectional view in FIG. 28 at the position of the sectional view of FIG. 27B in FIG. 27.

FIG. 28C is a sectional view in FIG. 28 at the position of the sectional view of FIG. 27C in FIG. 27.

FIG. 29A is a sectional view in FIG. 29 at the position of the sectional view of FIG. 28A in FIG. 28.

FIG. 29B is a sectional view in FIG. 29 at the position of the sectional view of FIG. 28B in FIG. 28.

FIG. 29C is a sectional view in FIG. 29 at the position of the sectional view of FIG. 28C in FIG. 28.

FIG. 31A is a sectional view in FIG. 31 at the position of the sectional view of FIG. 30A in FIG. 30.

FIG. 31B is a sectional view in FIG. 31 at the position of the sectional view of FIG. 30B in FIG. 30.

FIG. 31C is a sectional view in FIG. 31 at the position of the sectional view of FIG. 30C in FIG. 30.

FIG. 32 is the view of FIG. 31 showing the layout of the bottom phase and bottom temporary phase.

FIG. 32A is a sectional view in FIG. 32 at the position of the sectional view of FIG. 31A in FIG. 31.

FIG. 32B is a sectional view in FIG. 32 at the position of the sectional view of FIG. 31B in FIG. 31.

FIG. 32C is a sectional view in FIG. 32 at the position of the sectional view of FIG. 31C in FIG. 31.

FIG. 33 is the view of FIG. 32 showing the installation of four jumpers and the installation of a temporary jumper to a suspension insulator.

FIG. 33A is a sectional view in FIG. 33 at the position of the sectional view of FIG. 32A in FIG. 32.

FIG. 33B is a sectional view in FIG. 33 at the position of the sectional view of FIG. 32B in FIG. 32.

FIG. 33C is a sectional view in FIG. 33 at the position of the sectional view of FIG. 32C in FIG. 32.

FIG. 34 is the view of FIG. 33 showing the first temporary breaker closed.

FIG. 34A is a sectional view in FIG. 34 at the position of the sectional view of FIG. 33A in FIG. 33.

FIG. 34B is a sectional view in FIG. 34 at the position of the sectional view of FIG. 33B in FIG. 33.

FIG. 34C is a sectional view in FIG. 34 at the position of the sectional view of FIG. 33C in FIG. 33.

Figure 34:
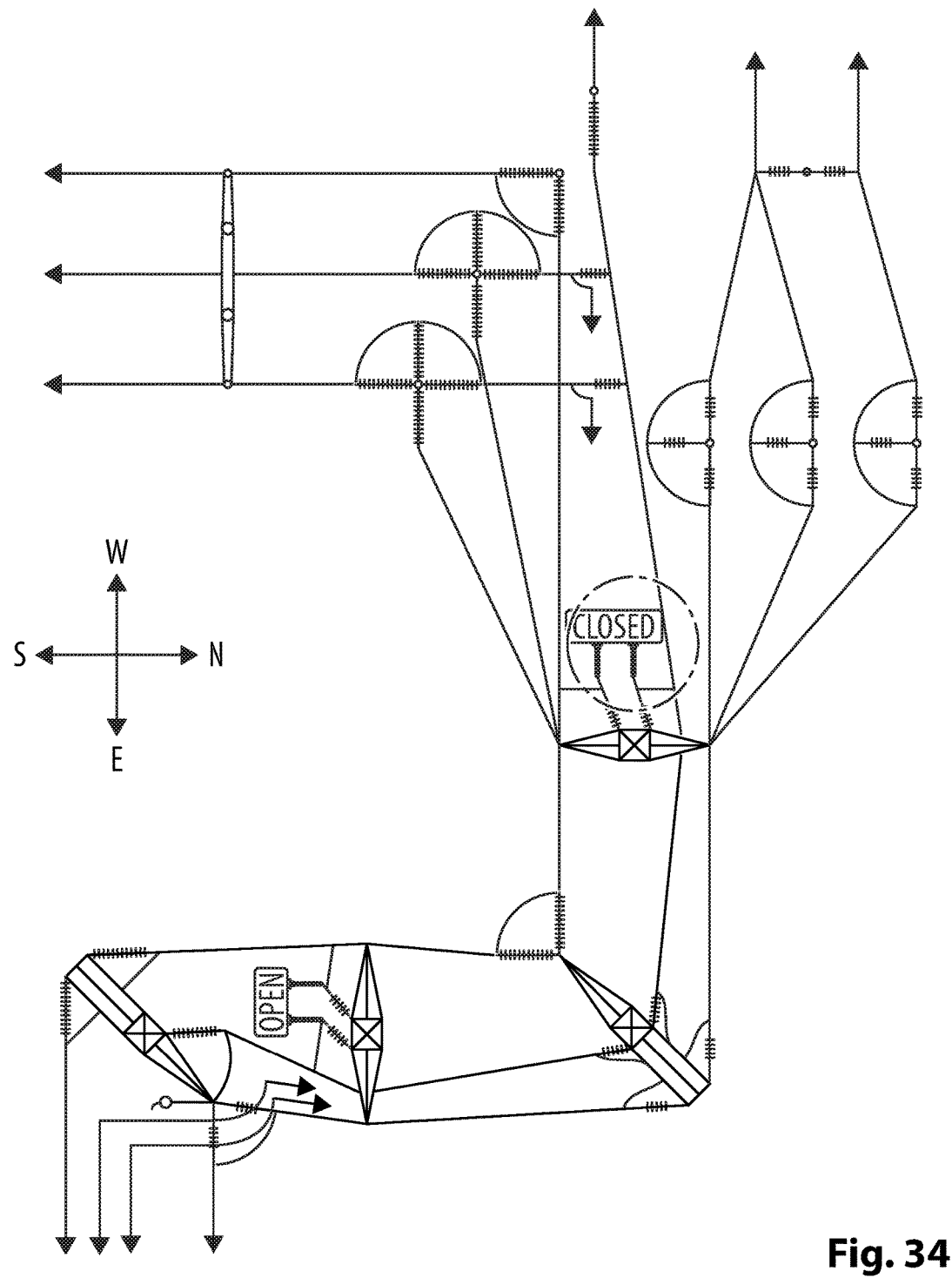
Figure 35:
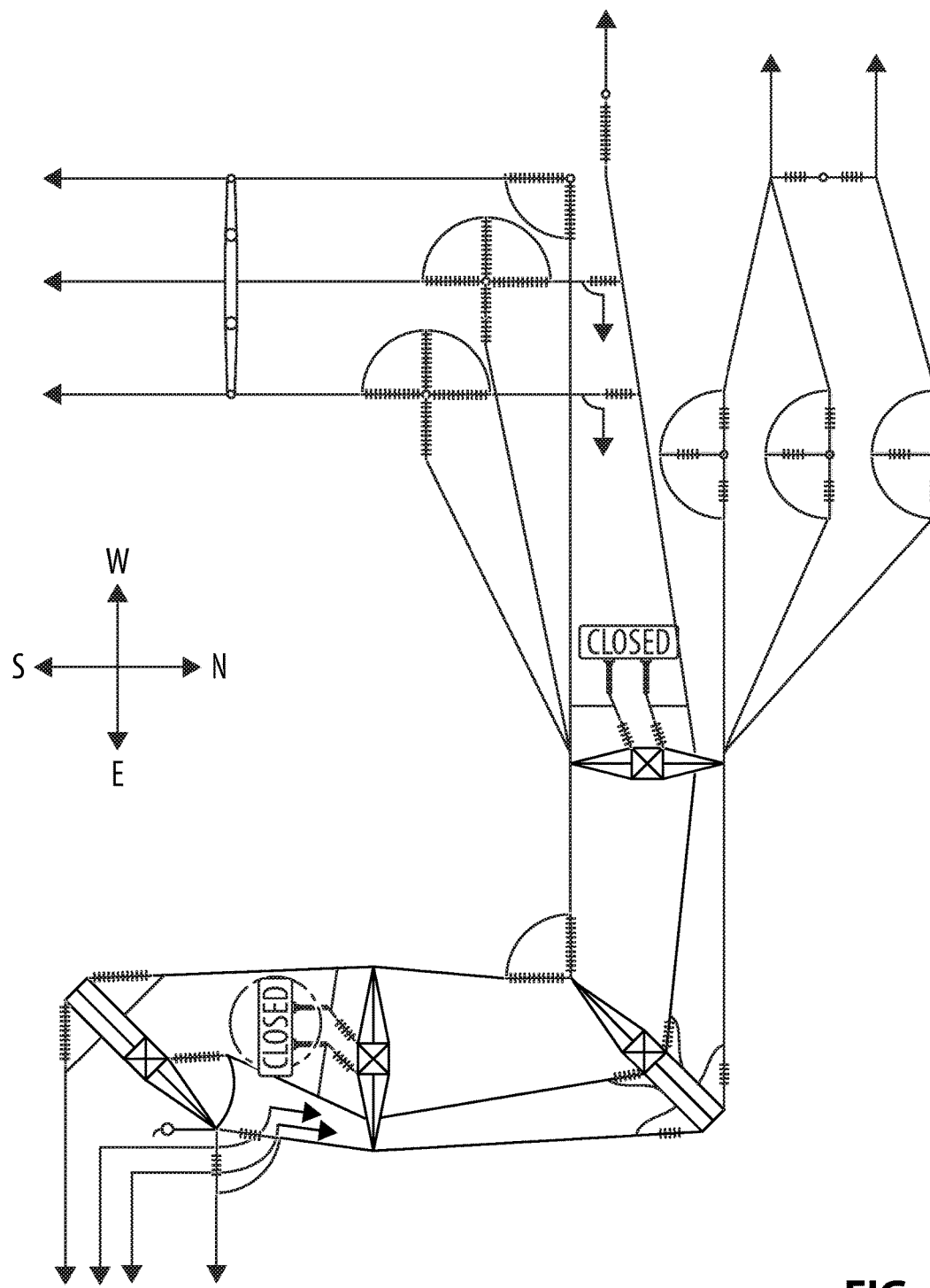

FIG. 35 is the view of FIG. 34 showing the second or further temporary breaker closed.

FIG. 35A is a sectional view in FIG. 35 at the position of the sectional view of FIG. 34A in FIG. 34.

FIG. 35B is a sectional view in FIG. 35 at the position of the sectional view of FIG. 34B in FIG. 34.

FIG. 35C is a sectional view in FIG. 35 at the position of the sectional view of FIG. 34C in FIG. 34.

Figure 36:
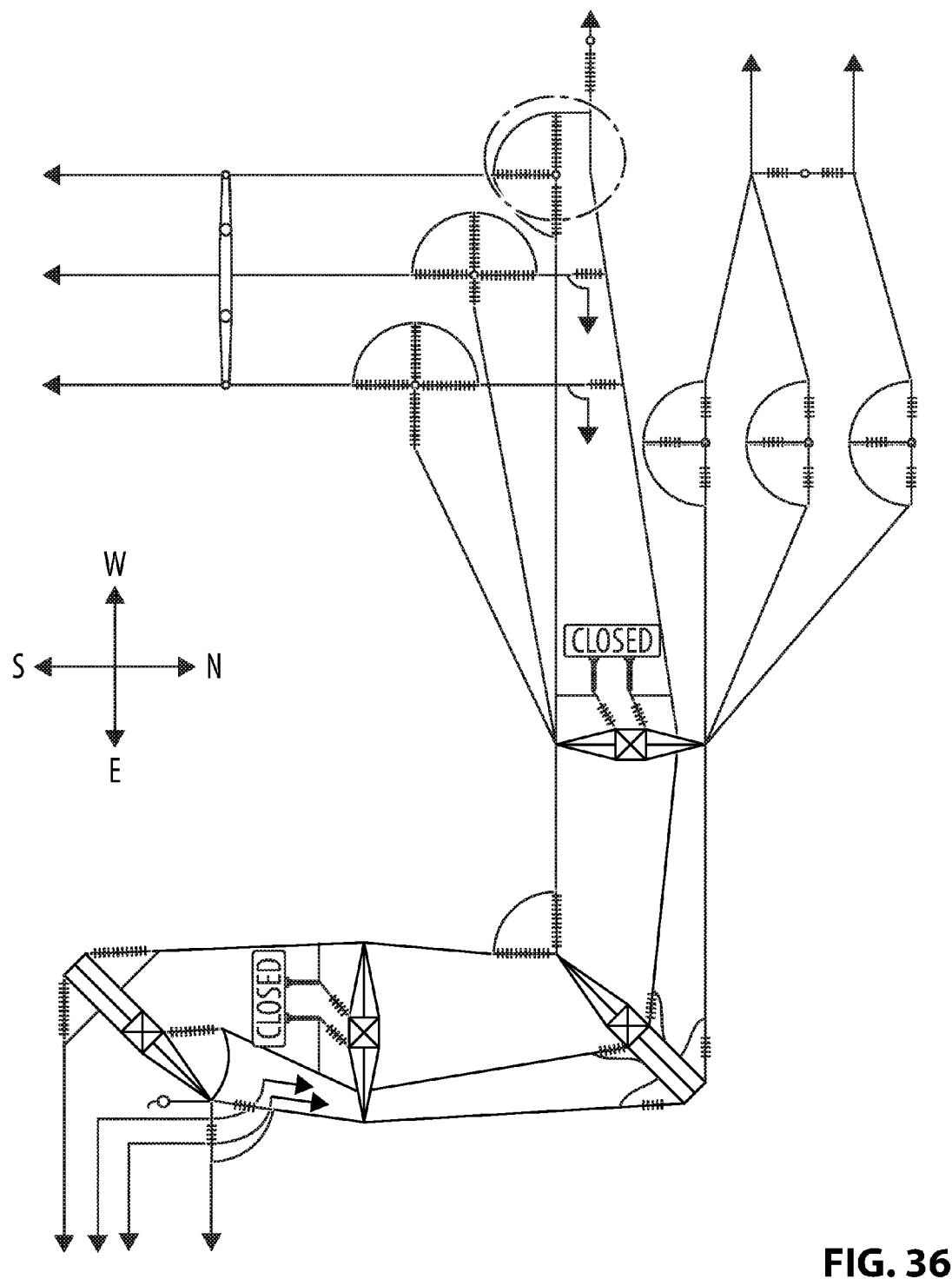

FIG. 36 is the view of FIG. 35 showing the installation of a further jumper.

FIG. 36A is a sectional view in FIG. 36 at the position of the sectional view of FIG. 35A in FIG. 35.

FIG. 36B is a sectional view in FIG. 36 at the position of the sectional view of FIG. 35B in FIG. 35.

FIG. 36C is a sectional view in FIG. 36 at the position of the sectional view of FIG. 35C in FIG. 35.

Figure 37:
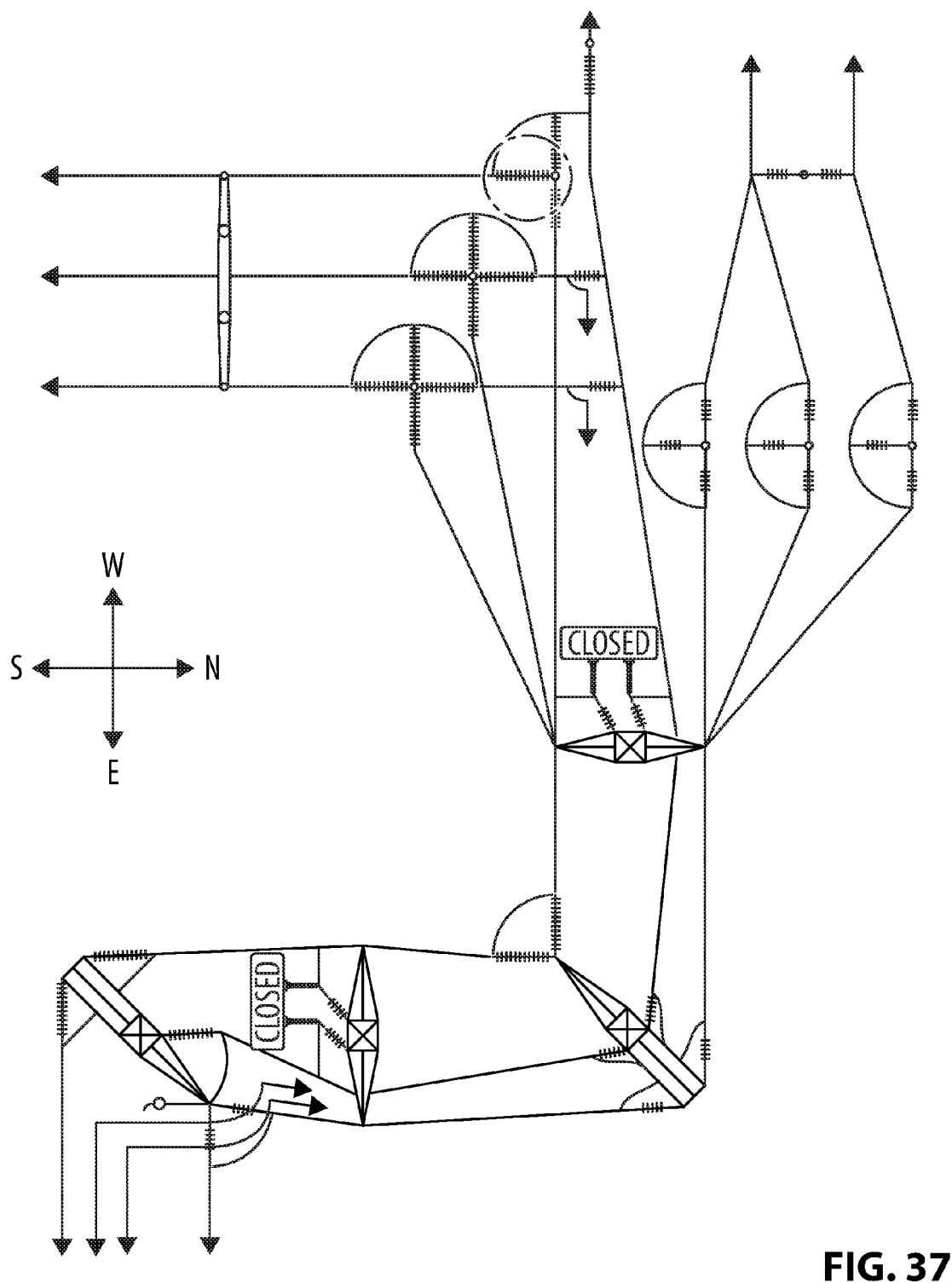

FIG. 37 is the view of FIG. 36 showing the removal of a permanent jumper.

FIG. 37A is a sectional view in FIG. 37 at the position of the sectional view of FIG. 36A in FIG. 36.

FIG. 37B is a sectional view in FIG. 37 at the position of the sectional view of FIG. 36B in FIG. 36.

FIG. 37C is a sectional view in FIG. 37 at the position of the sectional view of FIG. 36C in FIG. 36.

Figure 38:
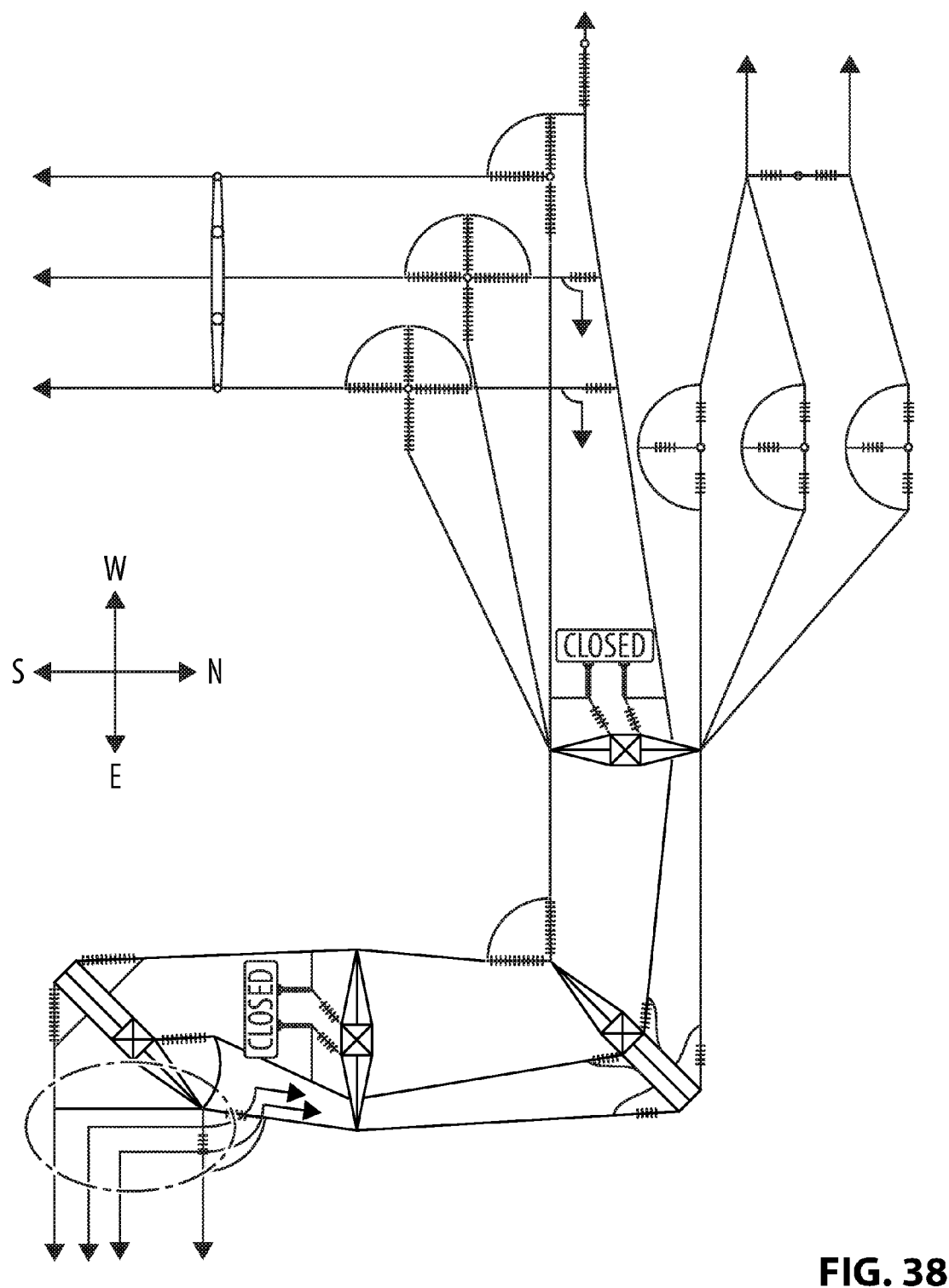

FIG. 38 is the view of FIG. 37 showing the installation of a further jumper.

FIG. 38A is a sectional view in FIG. 38 at the position of the sectional view of FIG. 37A in FIG. 37.

FIG. 38B is a sectional view in FIG. 38 at the position of the sectional view of FIG. 37B in FIG. 37.

FIG. 38C is a sectional view in FIG. 38 at the position of the sectional view of FIG. 37C in FIG. 37.

Figure 39:
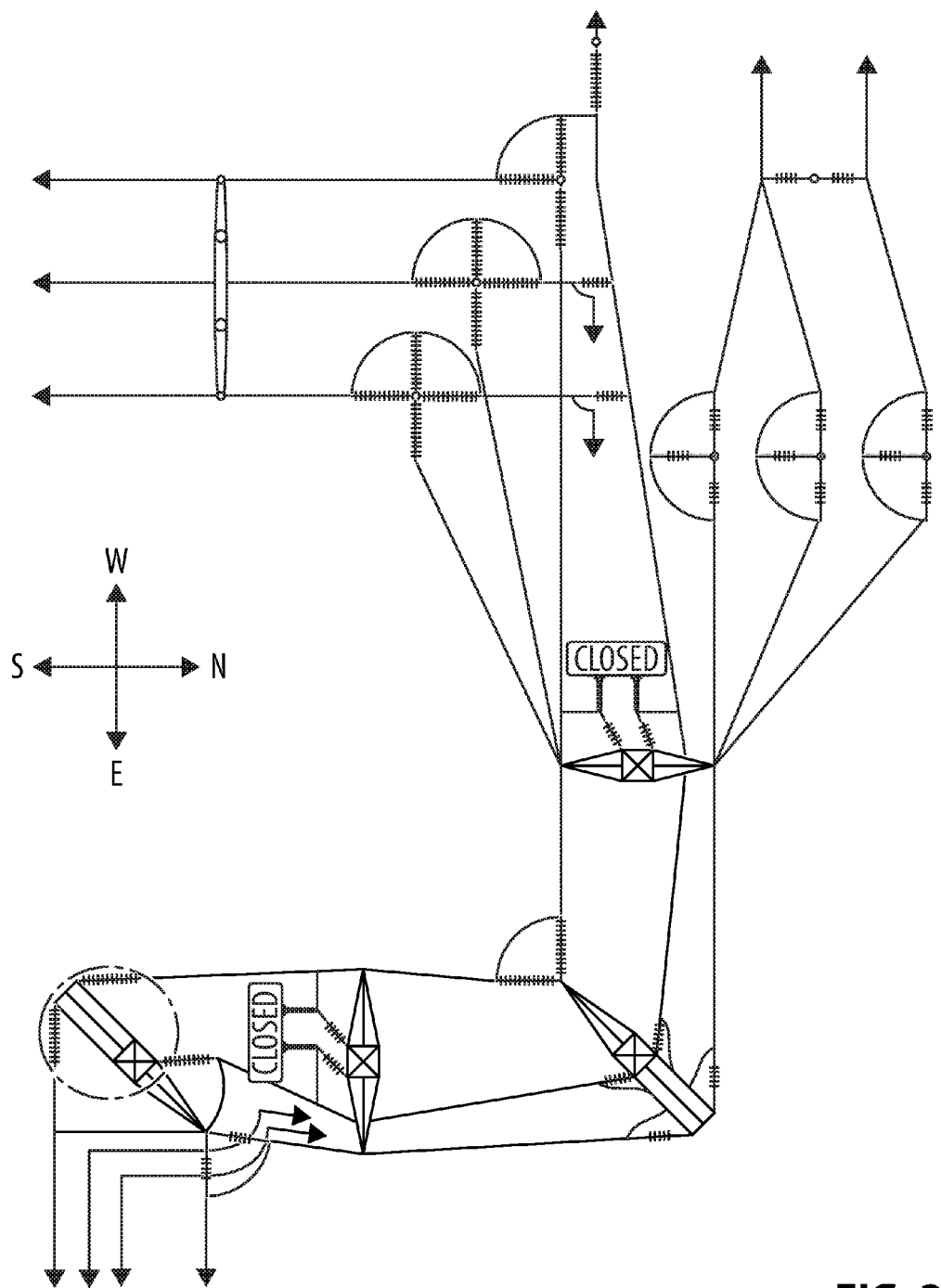

FIG. 39 is the view of FIG. 38 showing the removal of a permanent jumper.

FIG. 39A is a sectional view in FIG. 39 at the position of the sectional view of FIG. 38A in FIG. 38.

FIG. 39B is a sectional view in FIG. 39 at the position of the sectional view of FIG. 38B in FIG. 38.

FIG. 39C is a sectional view in FIG. 39 at the position of the sectional view of FIG. 38C in FIG. 38.

Figure 40:
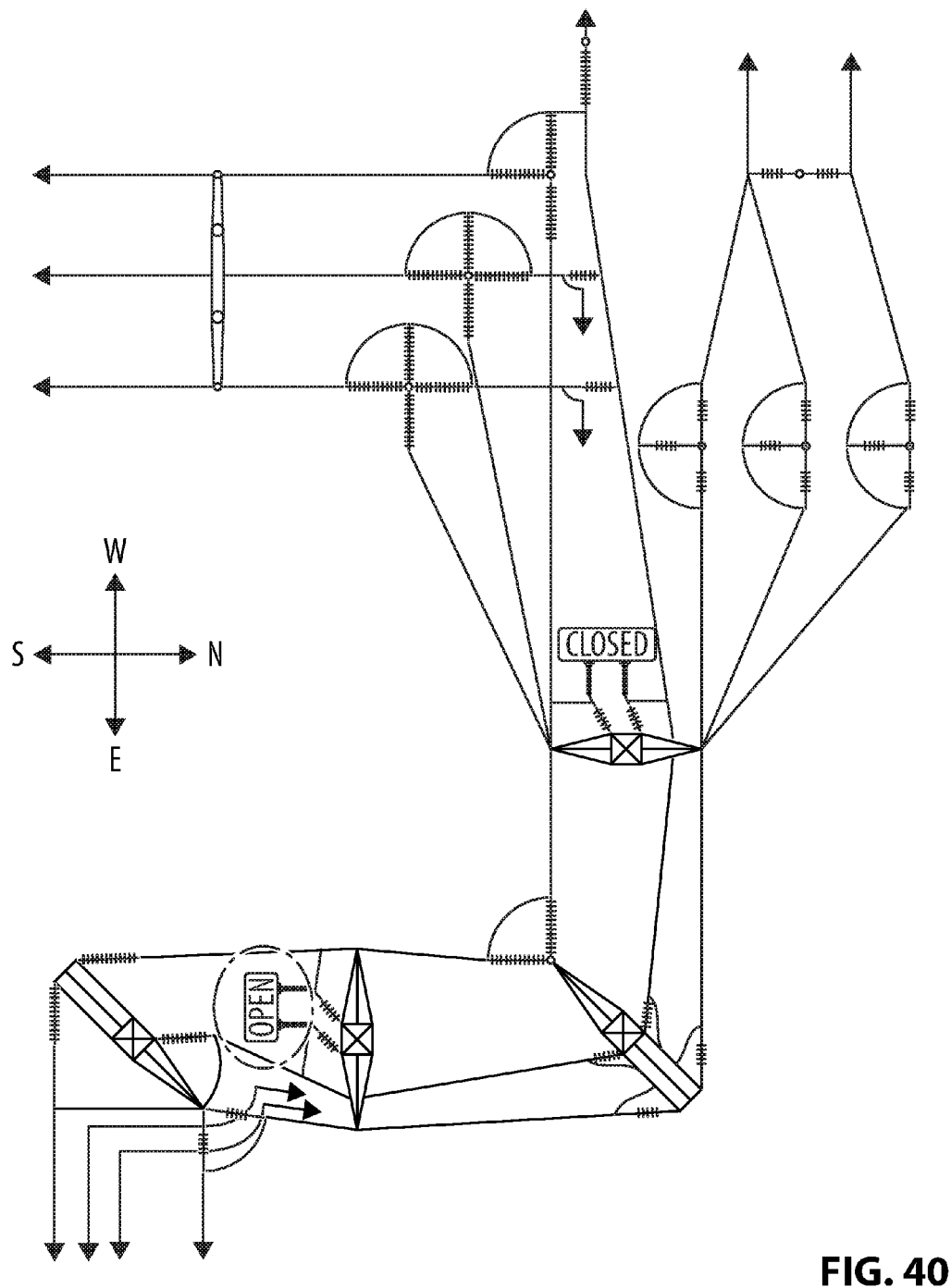

FIG. 40 is the view of FIG. 39 showing the opening of the second breaker.

FIG. 40A is a sectional view in FIG. 40 at the position of the sectional view of FIG. 39A in FIG. 39.

FIG. 40B is a sectional view in FIG. 40 at the position of the sectional view of FIG. 39B in FIG. 39.

FIG. 40C is a sectional view in FIG. 40 at the position of the sectional view of FIG. 39C in FIG. 39.

Figure 41:
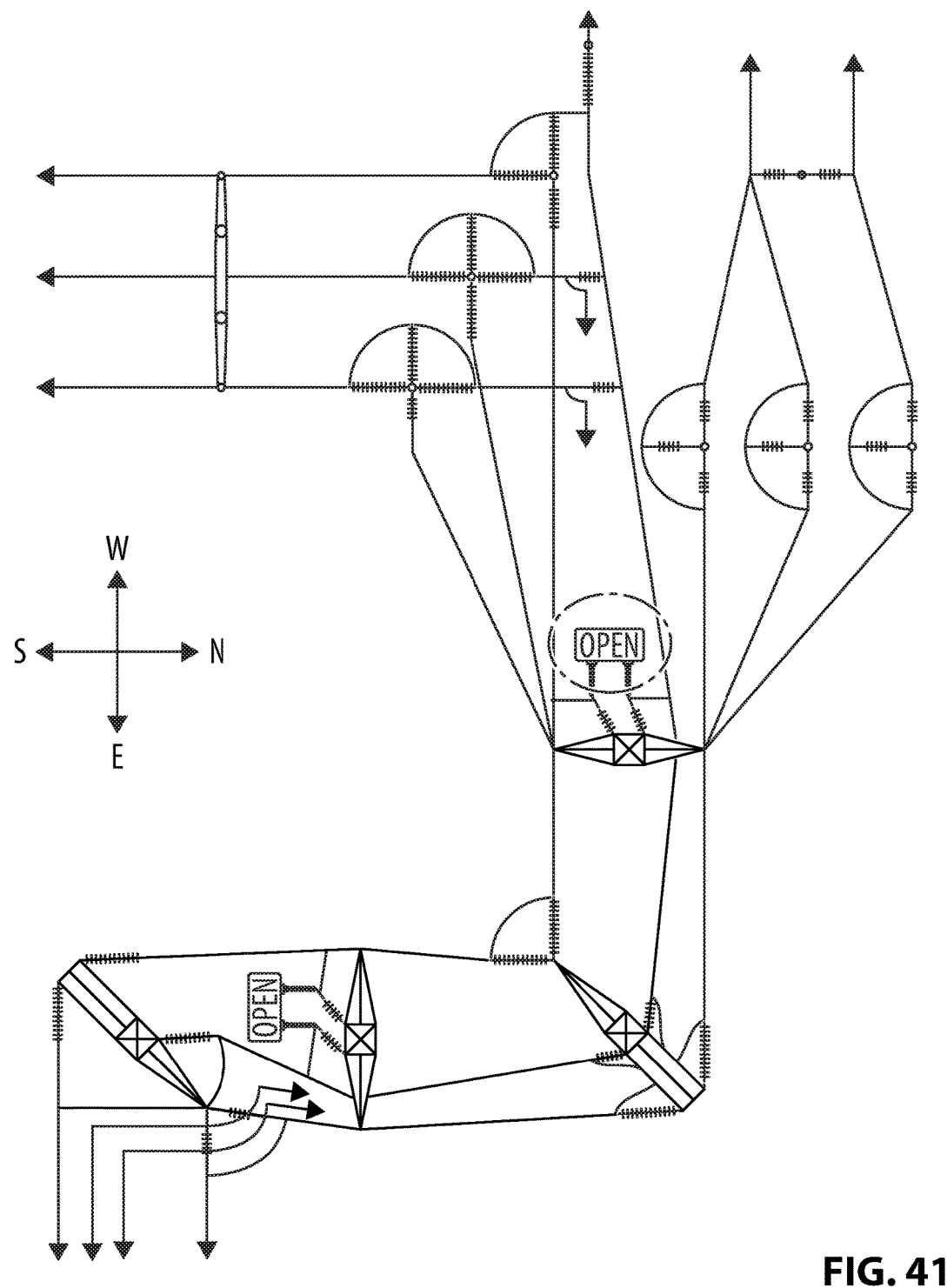

FIG. 41 is the view of FIG. 40 showing the opening of the first breaker.

FIG. 41A is a sectional view in FIG. 41 at the position of the sectional view of FIG. 40A in FIG. 40.

FIG. 41B is a sectional view in FIG. 41 at the position of the sectional view of FIG. 40B in FIG. 40.

FIG. 41C is a sectional view in FIG. 41 at the position of the sectional view of FIG. 40C in FIG. 40.

Figure 42:
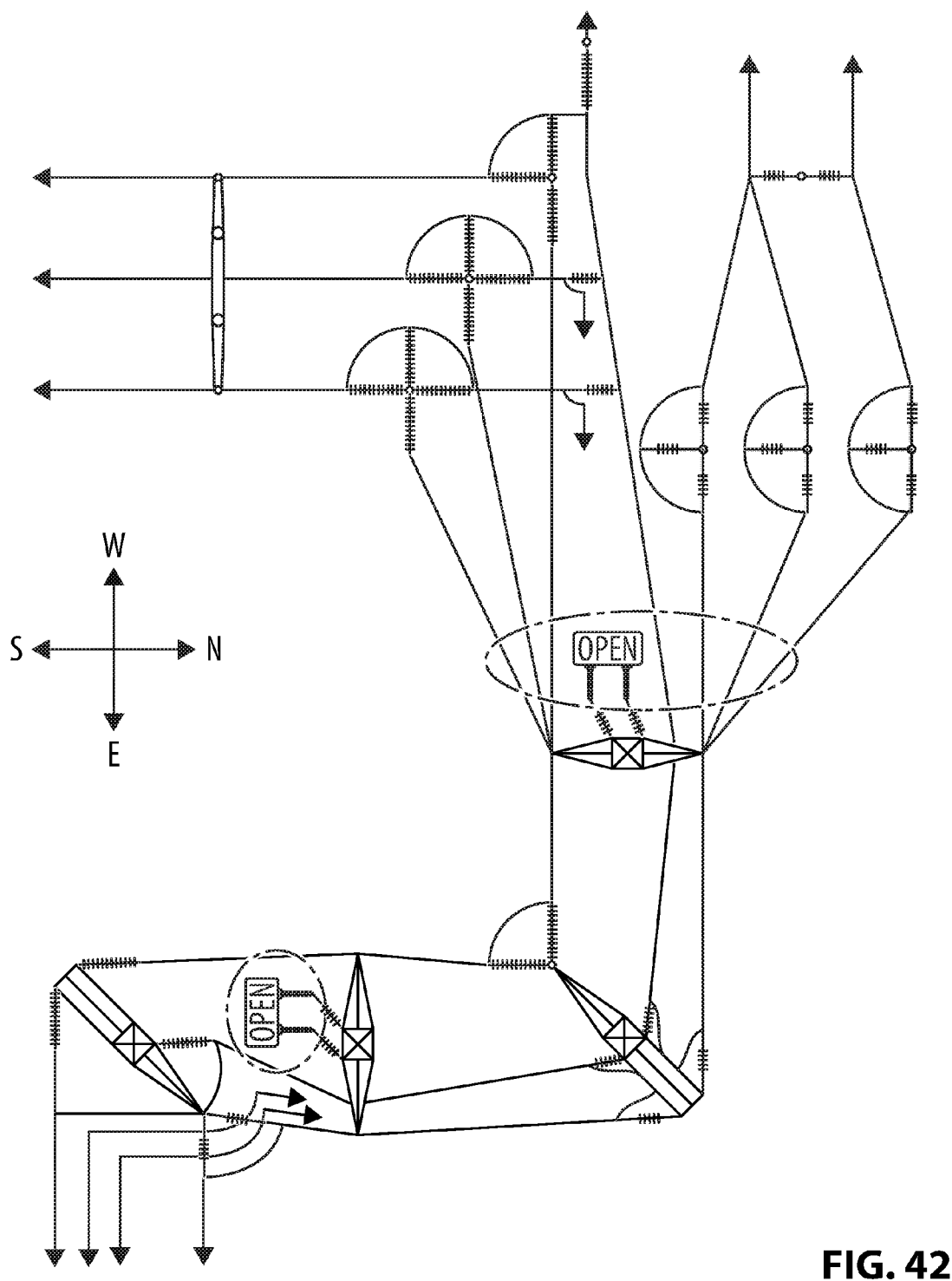

FIG. 42 is the view of FIG. 41 showing the removal of jumpers.

FIG. 42A is a sectional view in FIG. 42 at the position of the sectional view of FIG. 41A in FIG. 41.

FIG. 42B is a sectional view in FIG. 42 at the position of the sectional view of FIG. 41B in FIG. 41.

FIG. 42C is a sectional view in FIG. 42 at the position of the sectional view of FIG. 41C in FIG. 41.

FIG. 43A shows, in side elevation view, a support structure supporting top, center, and bottom phases, and a pair of temporary transfer buses extending vertically up the support structure from a circuit breaker.

FIG. 43B is a front elevation view of the support structure shown in FIG. 43A.

Figure 44A:
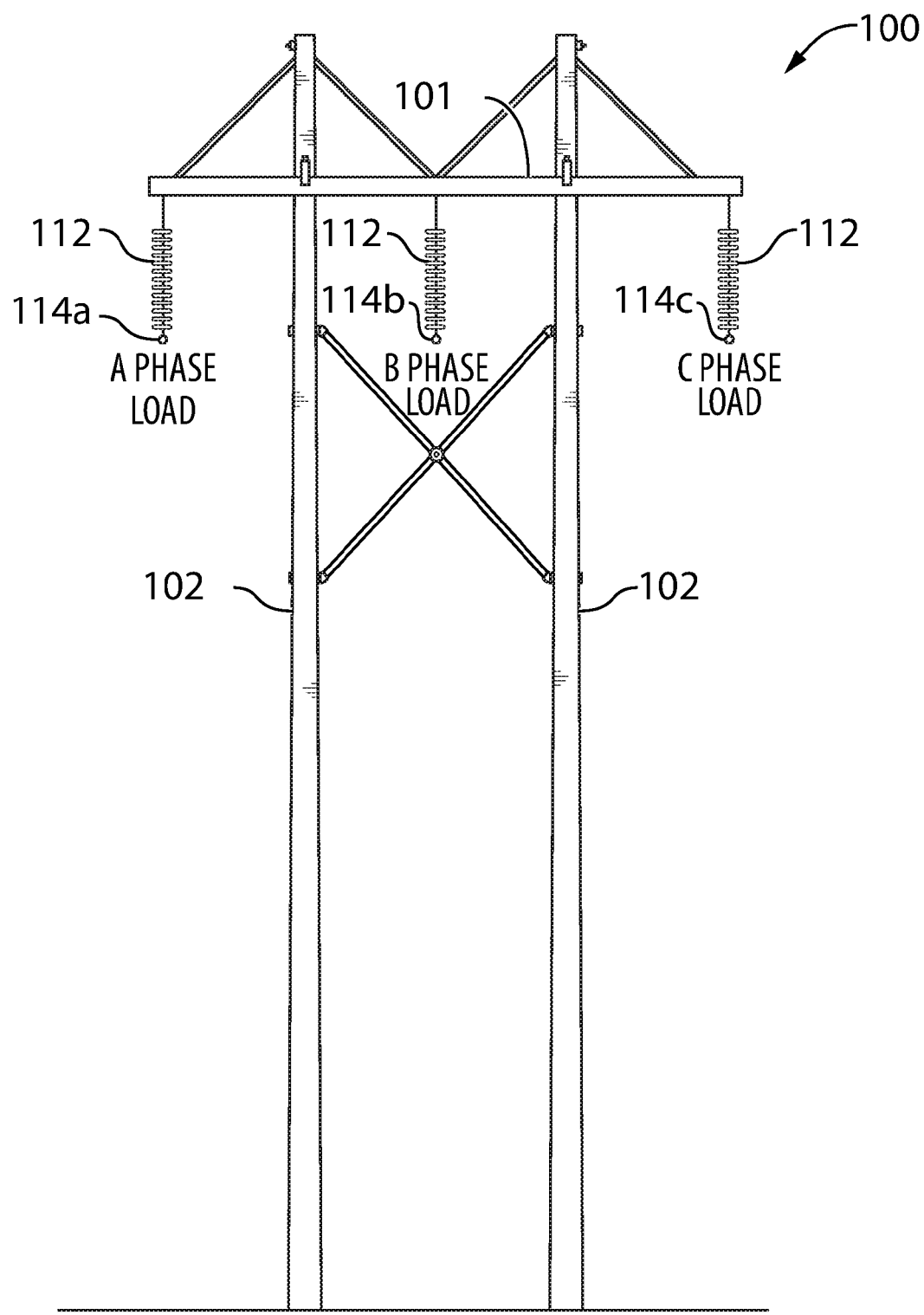

FIG. 44A is a front elevation view of an H-frame support structure carrying three phases in a horizontal configuration suspended from a cross-arm.

Figure 44B:
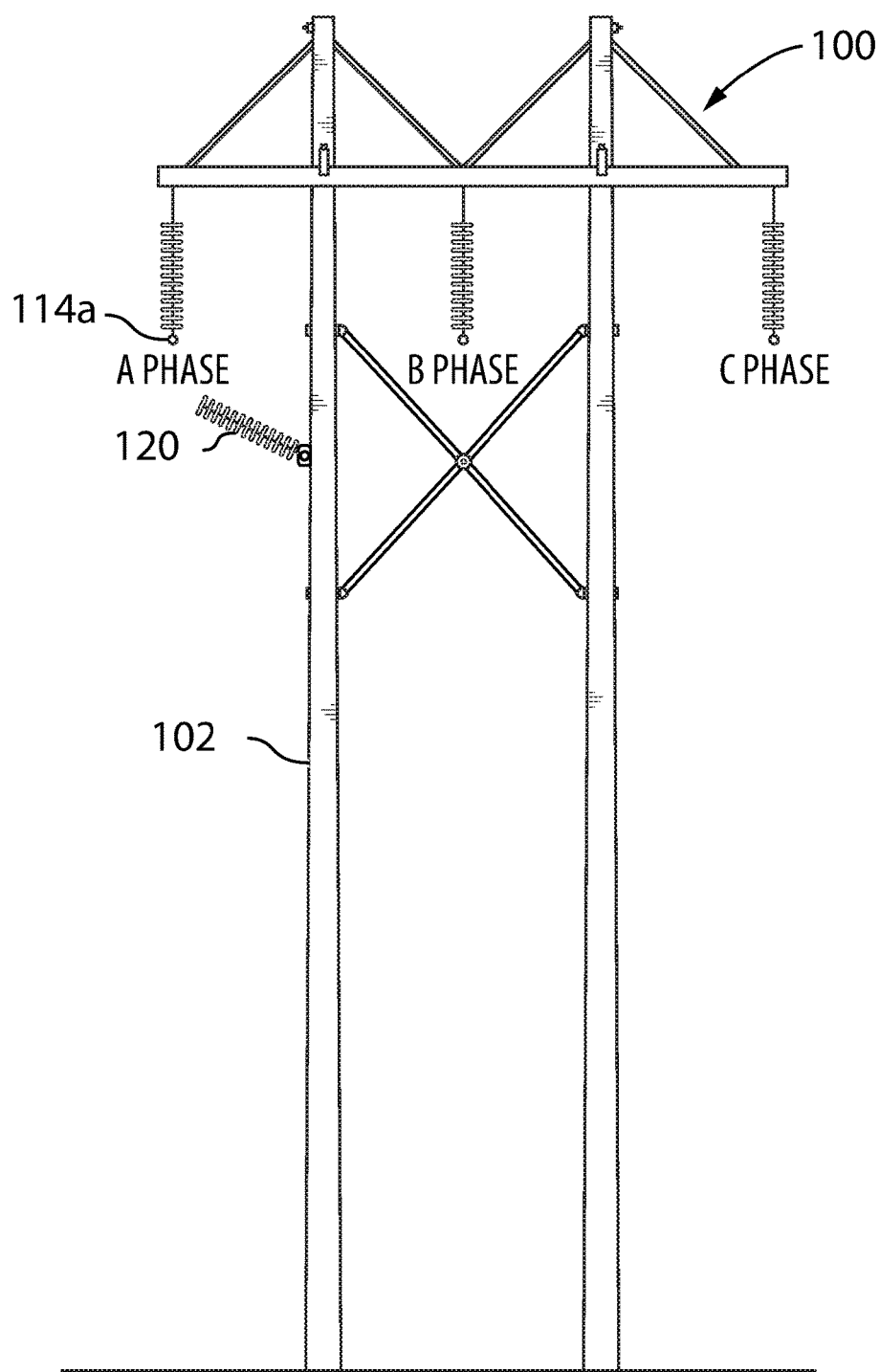

FIG. 44B is the H-frame support structure of FIG. 44A, showing a temporary support post mounted to the H-frame.

Figure 45:
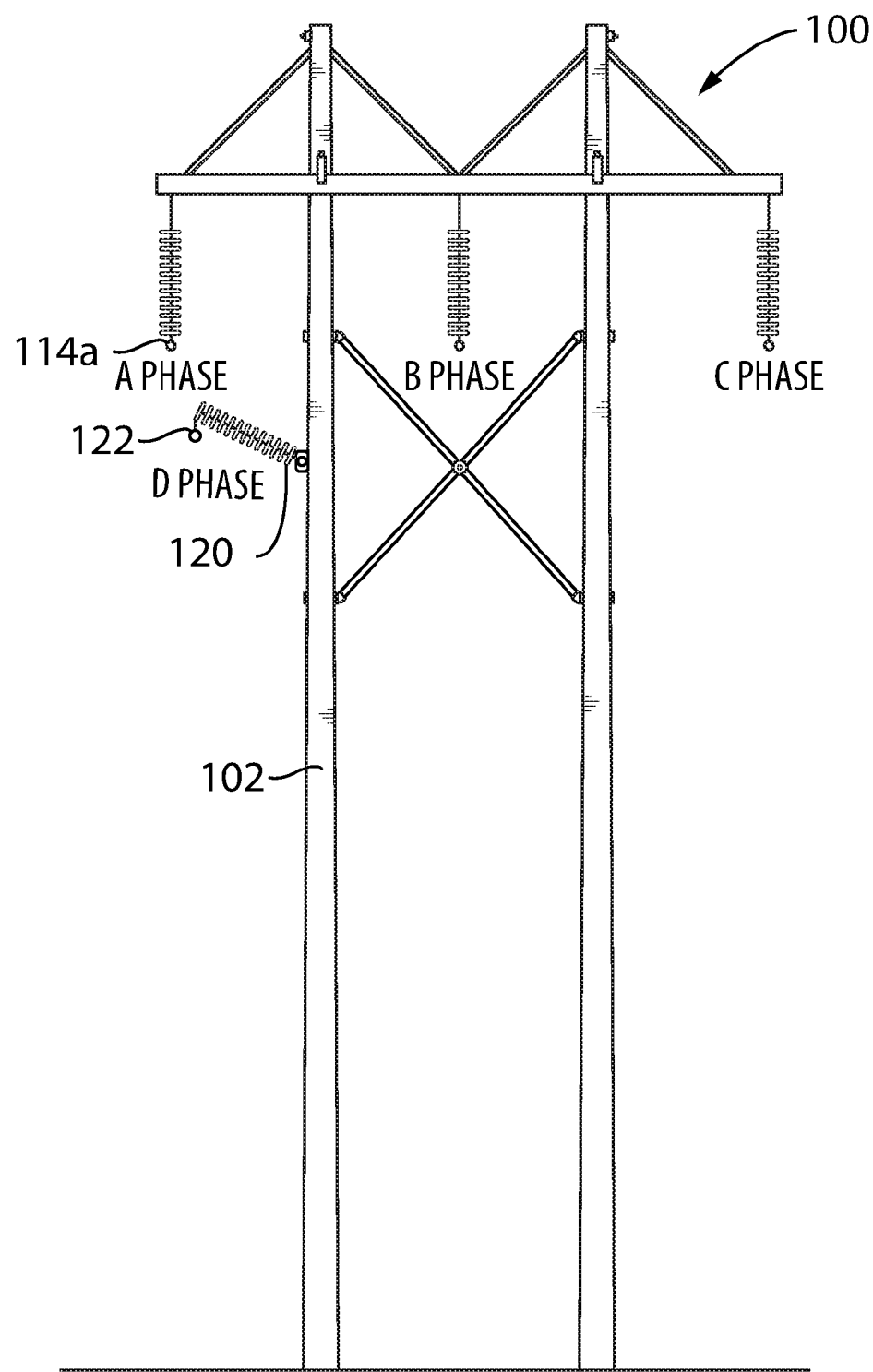

FIG. 45 is the H-frame support structure of FIG. 44B, showing a temporary conductor installed on, and suspended from, the temporary support post.

Figure 46:
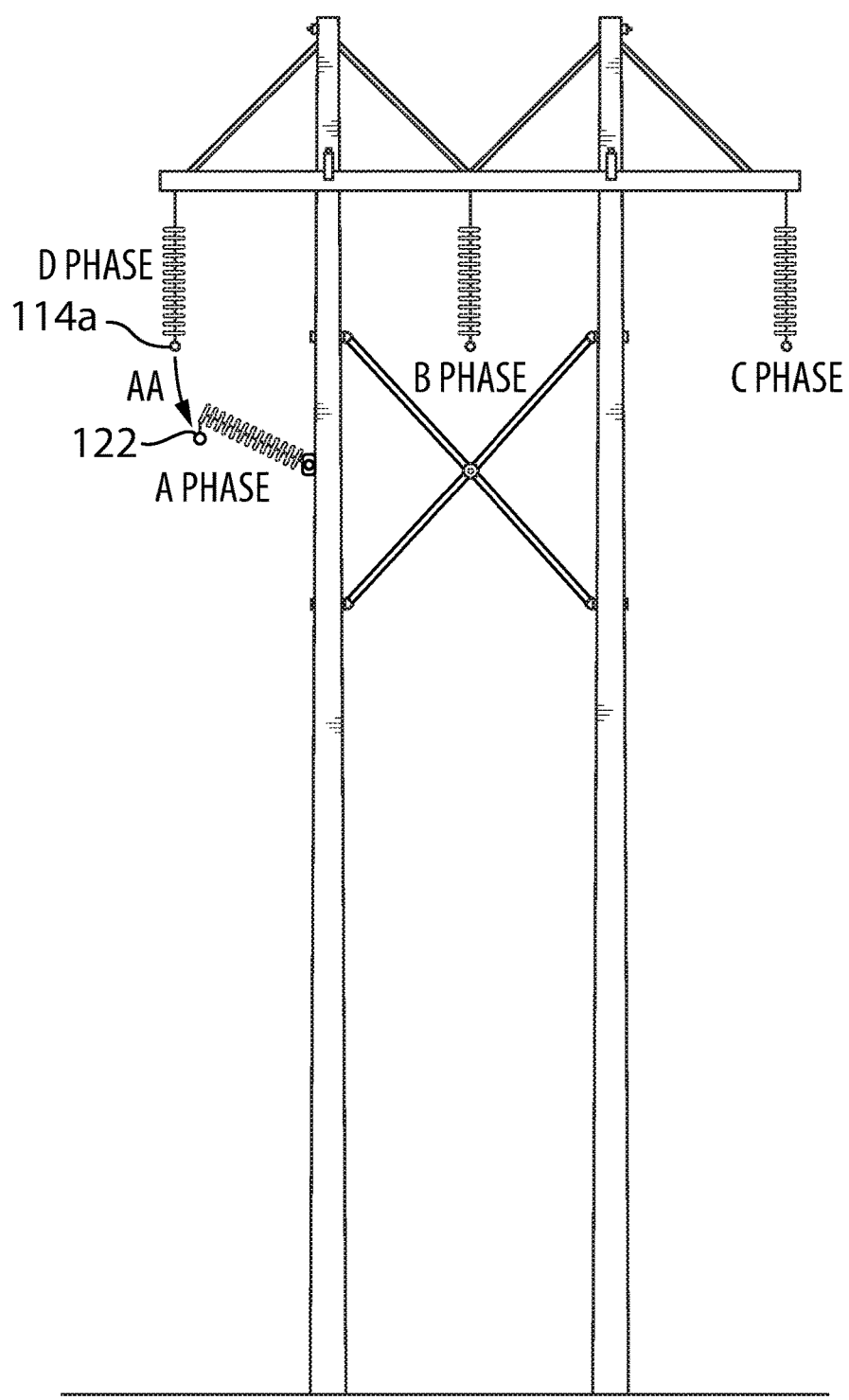

FIG. 46 is the view of FIG. 45 showing the A phase load being transferred to the temporary conductor.

Figure 47:
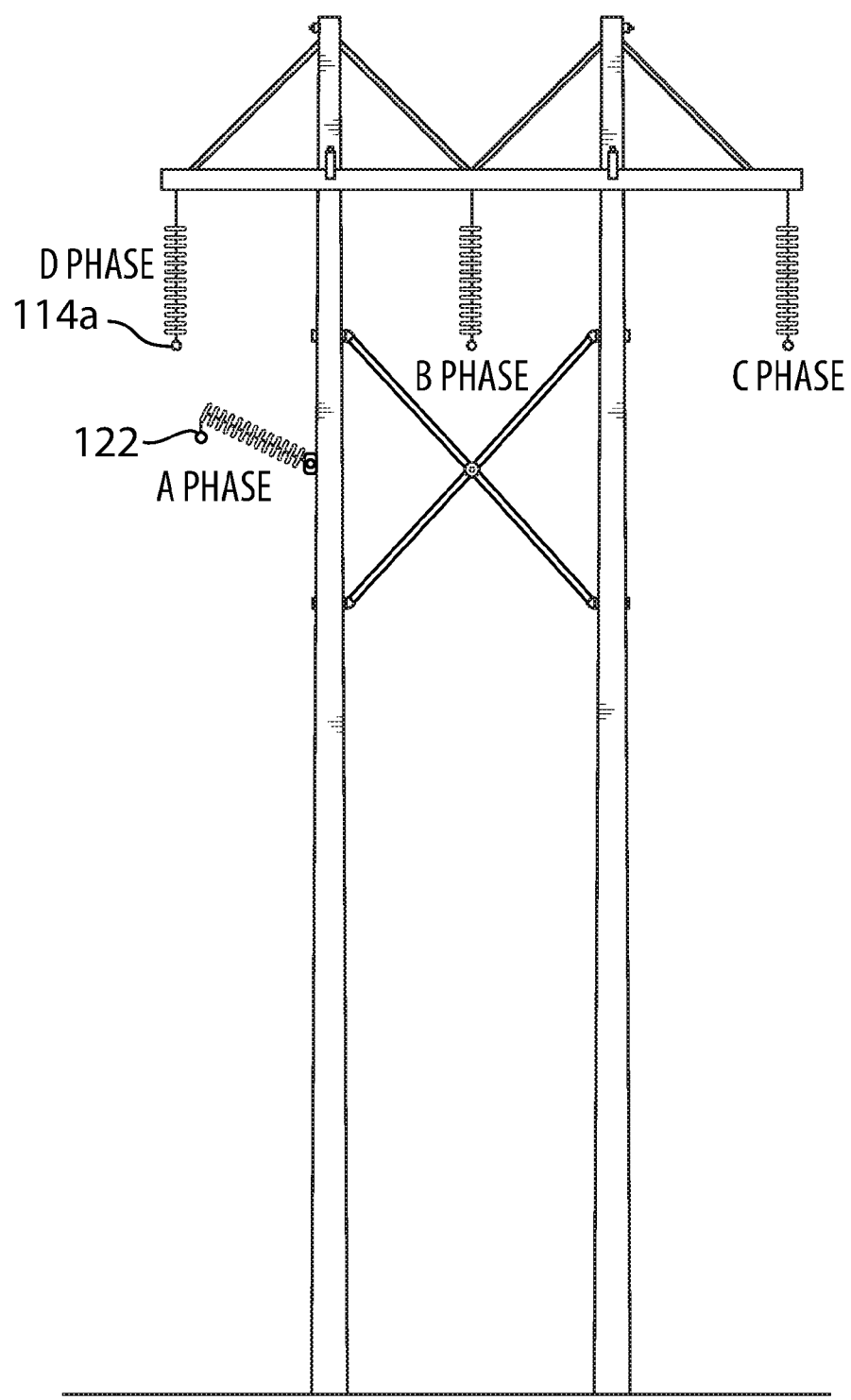

FIG. 47 is the view of FIG. 46 illustrating that the new D phase is reconductored once the A phase load has been transferred to the temporary conductor.

Figure 48:
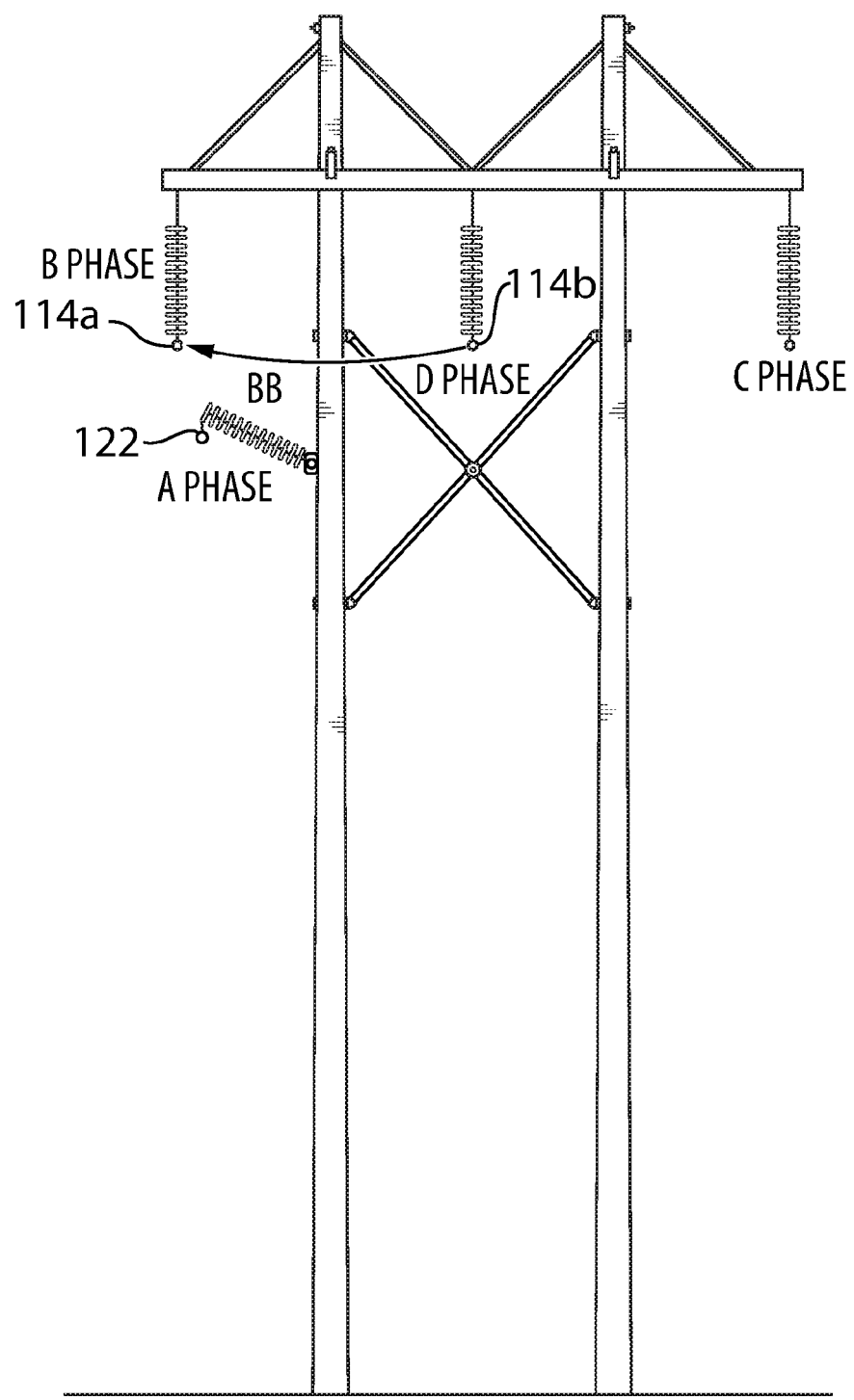

FIG. 48 is the view of FIG. 47 showing the B phase load being transferred to the conductor which was reconductored in FIG. 47.

Figure 49:
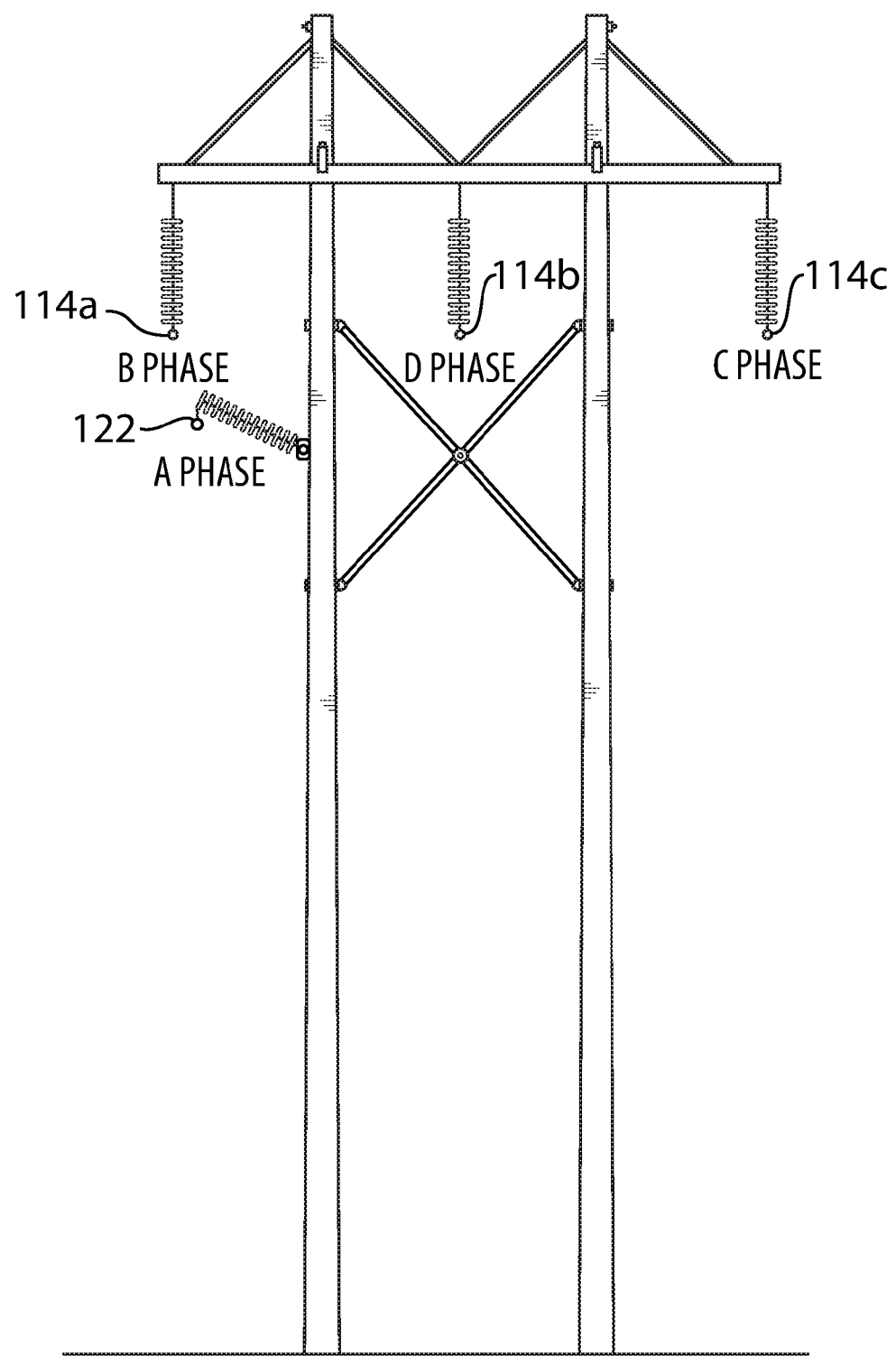

FIG. 49 is the view of FIG. 48 illustrating that the new D phase is reconductored once the B phase load has been transferred to the conductor which was reconductored in FIG. 47.

Figure 50:
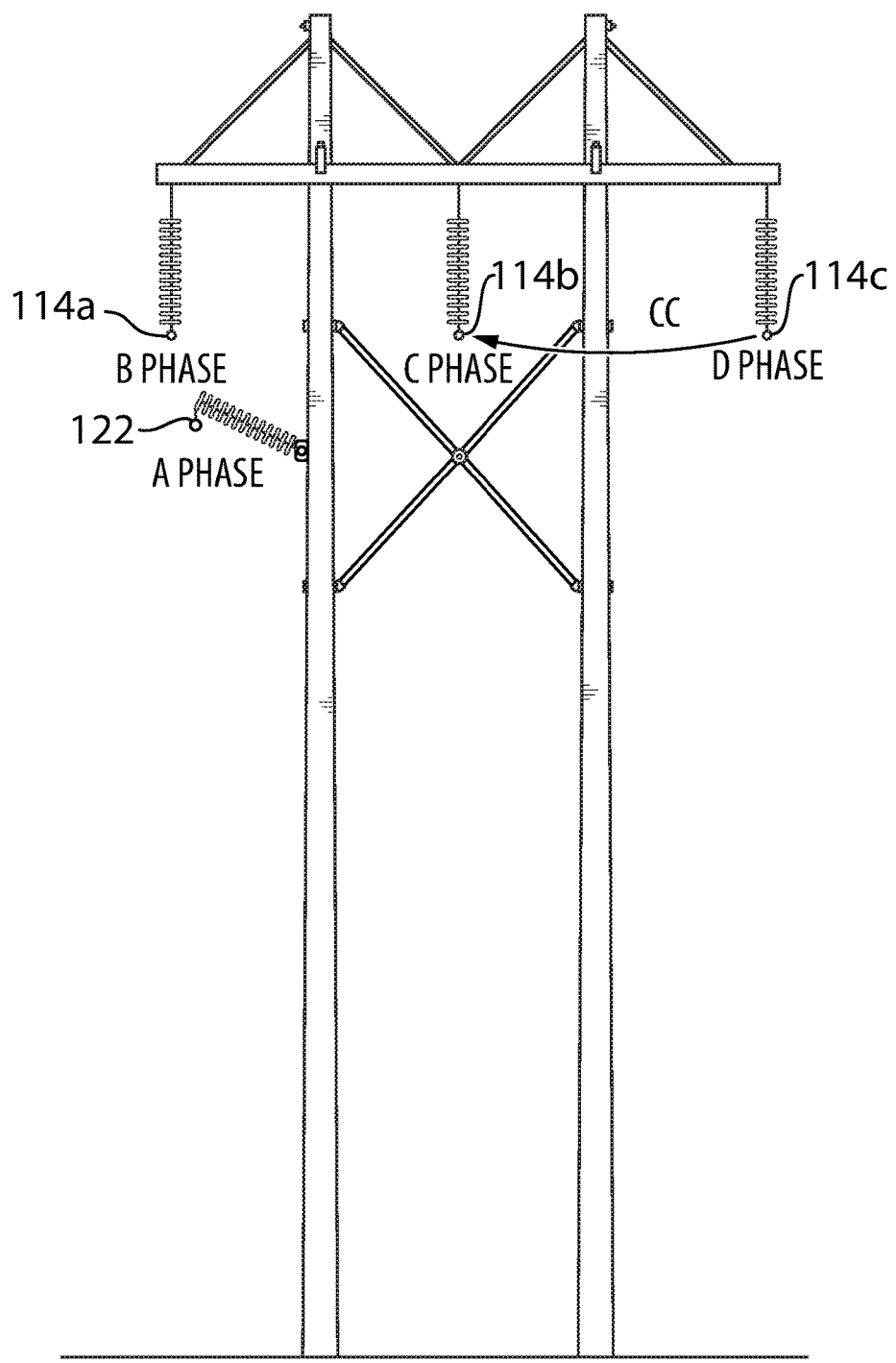

FIG. 50 is the view of FIG. 49 showing the C phase load being transferred to the conductor which was reconductored in FIG. 49.

Figure 51:
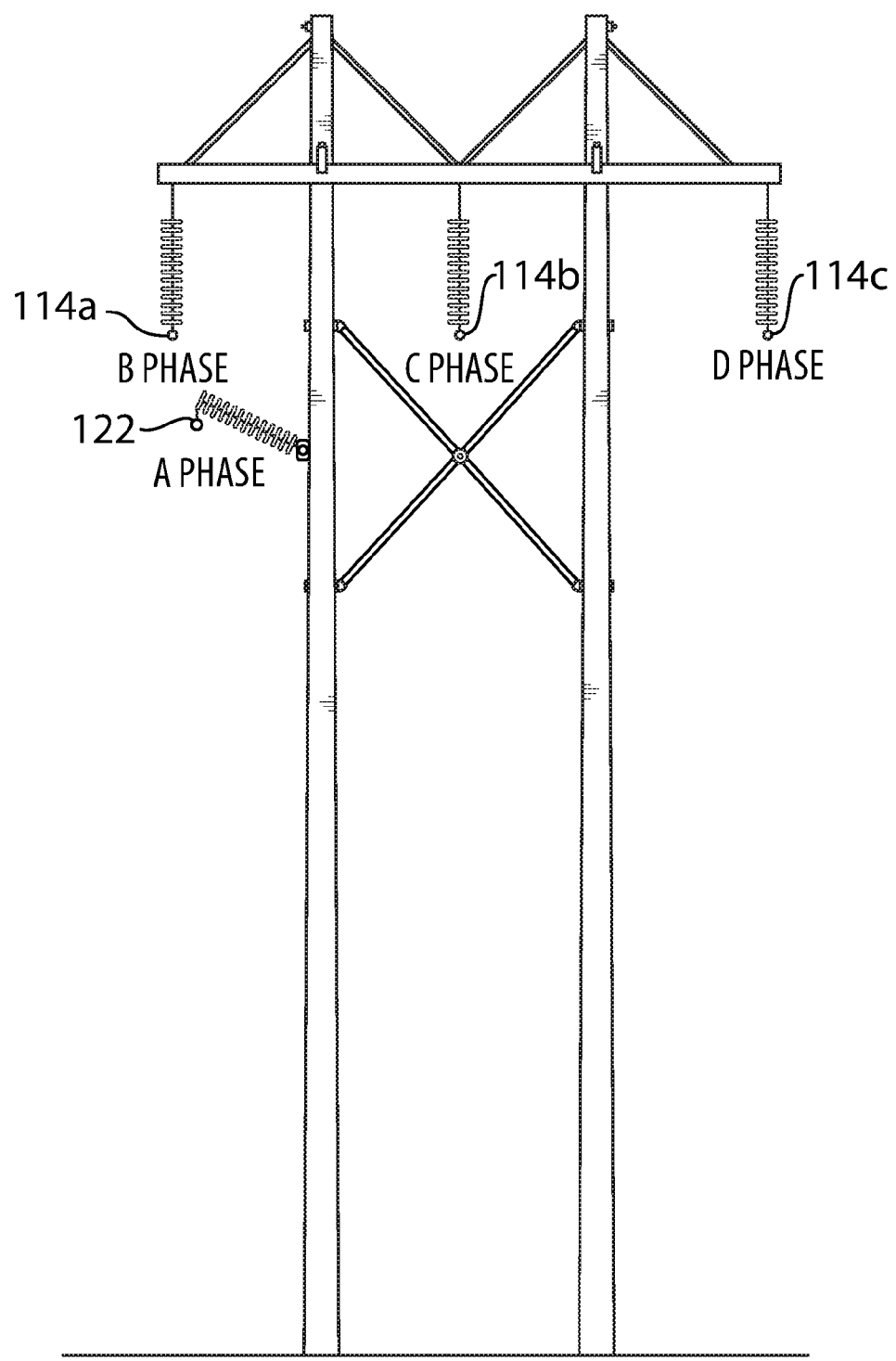

FIG. 51 is the view of FIG. 50 illustrating that the new D phase is reconductored once the C phase load has been transferred to the conductor which was reconductored in FIG. 49.

Figure 52:
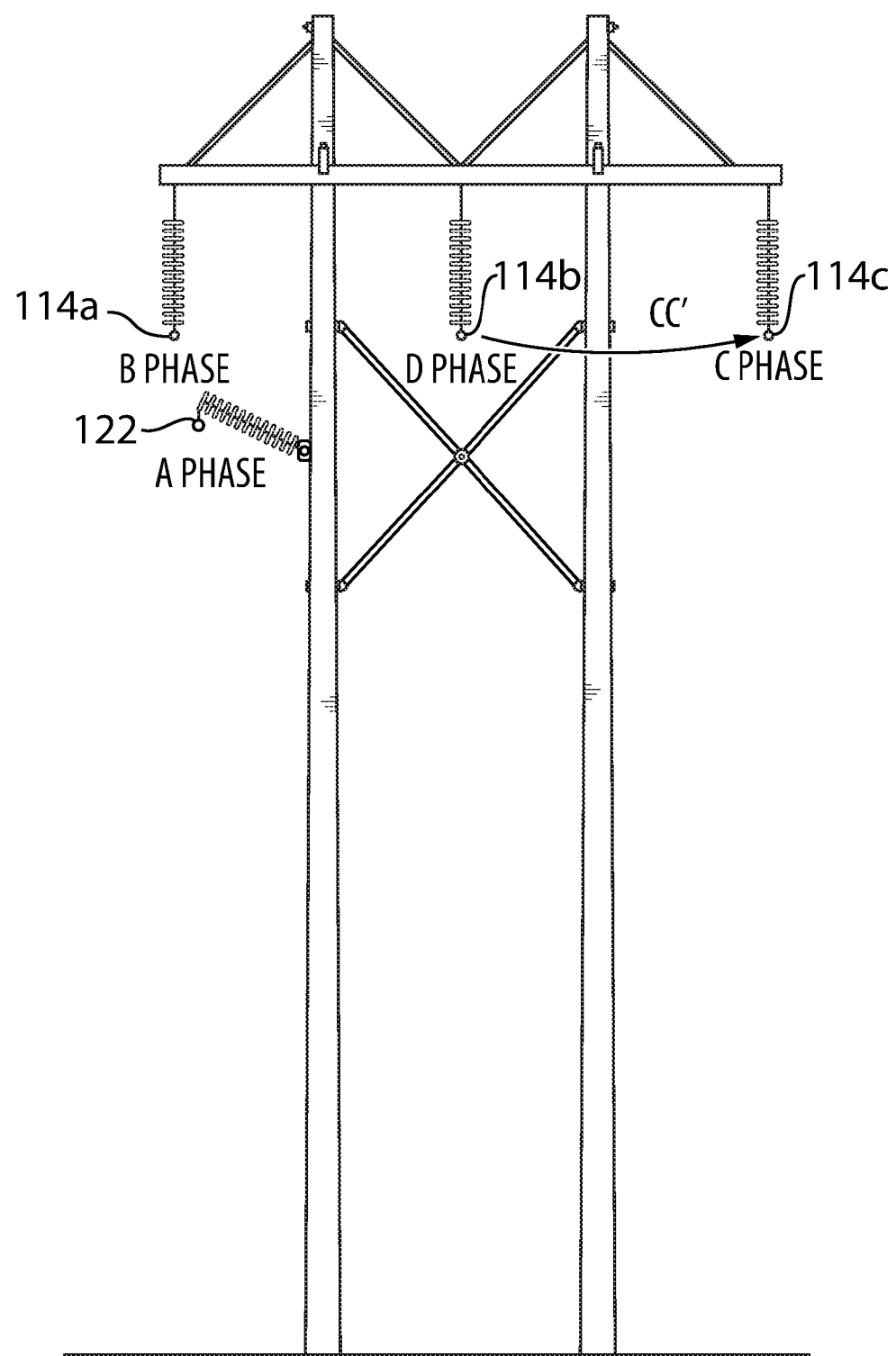

FIG. 52 is the view of FIG. 51 showing the C phase load being transferred back to the reconductored C phase.

Figure 53:
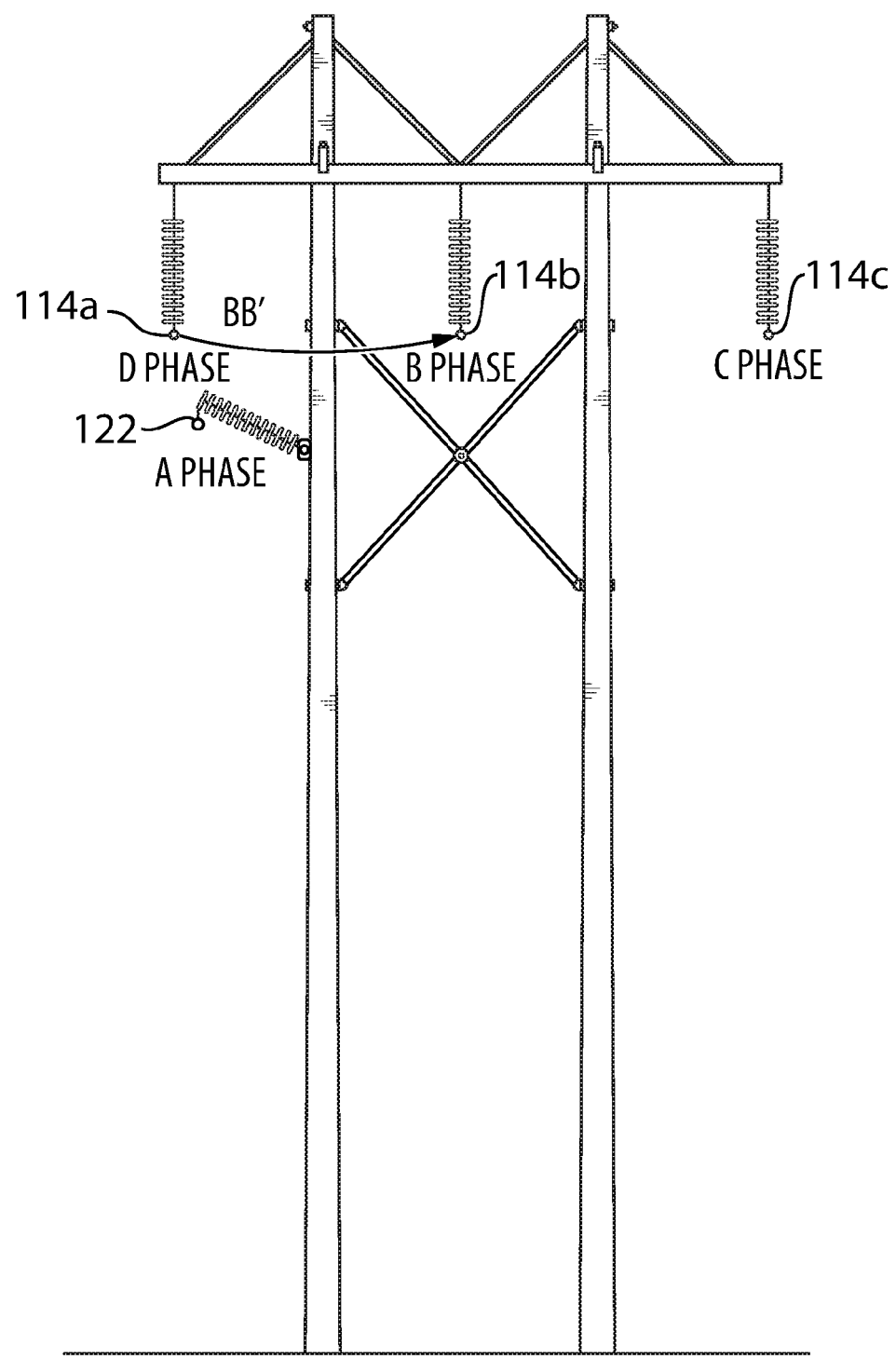

FIG. 53 is the view of FIG. 52 showing the B phase load being transferred back to the reconductored B phase.

Figure 54:
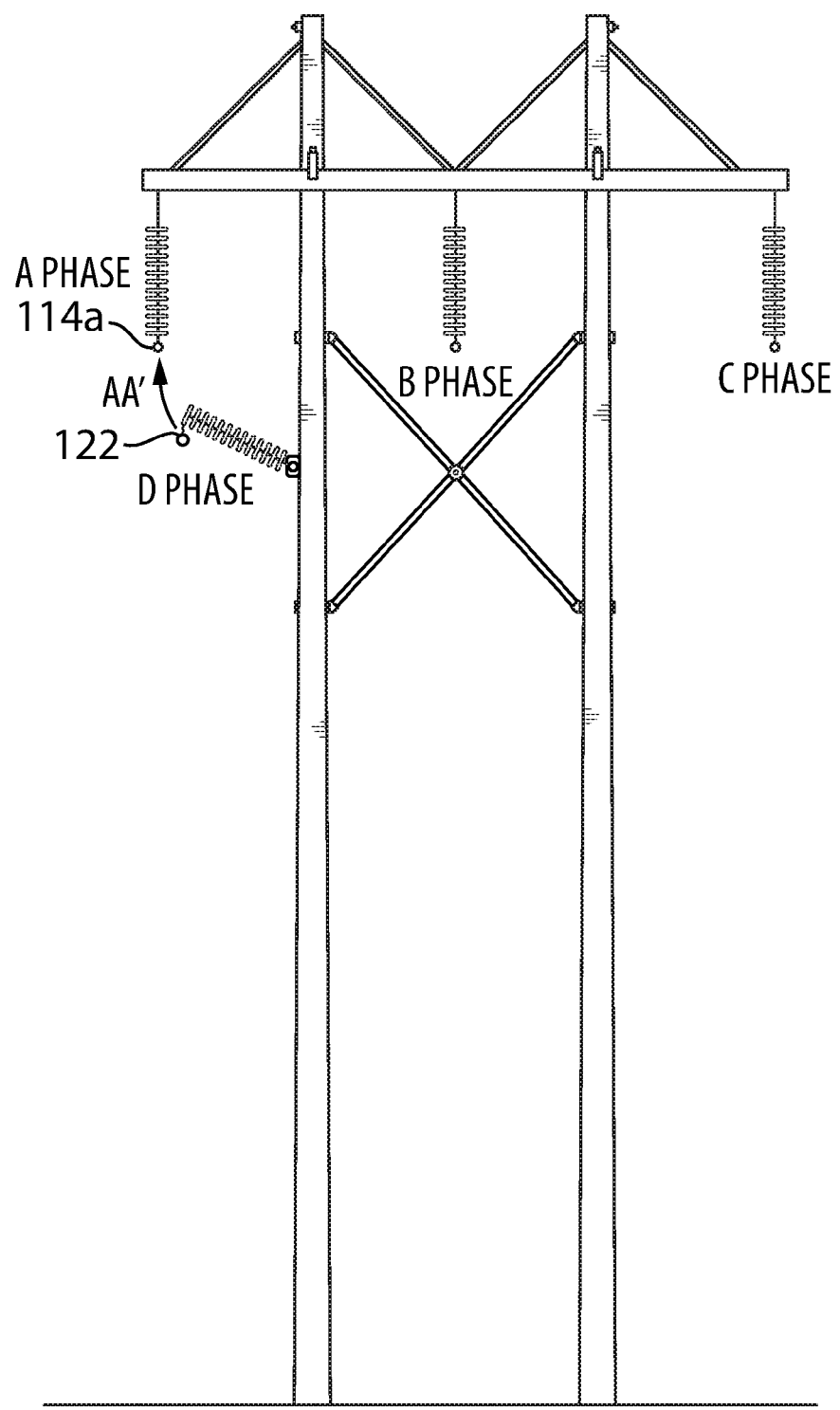

FIG. 54 is the view of FIG. 53 showing the A phase load being transferred back to the reconductored A phase.

Figure 55:
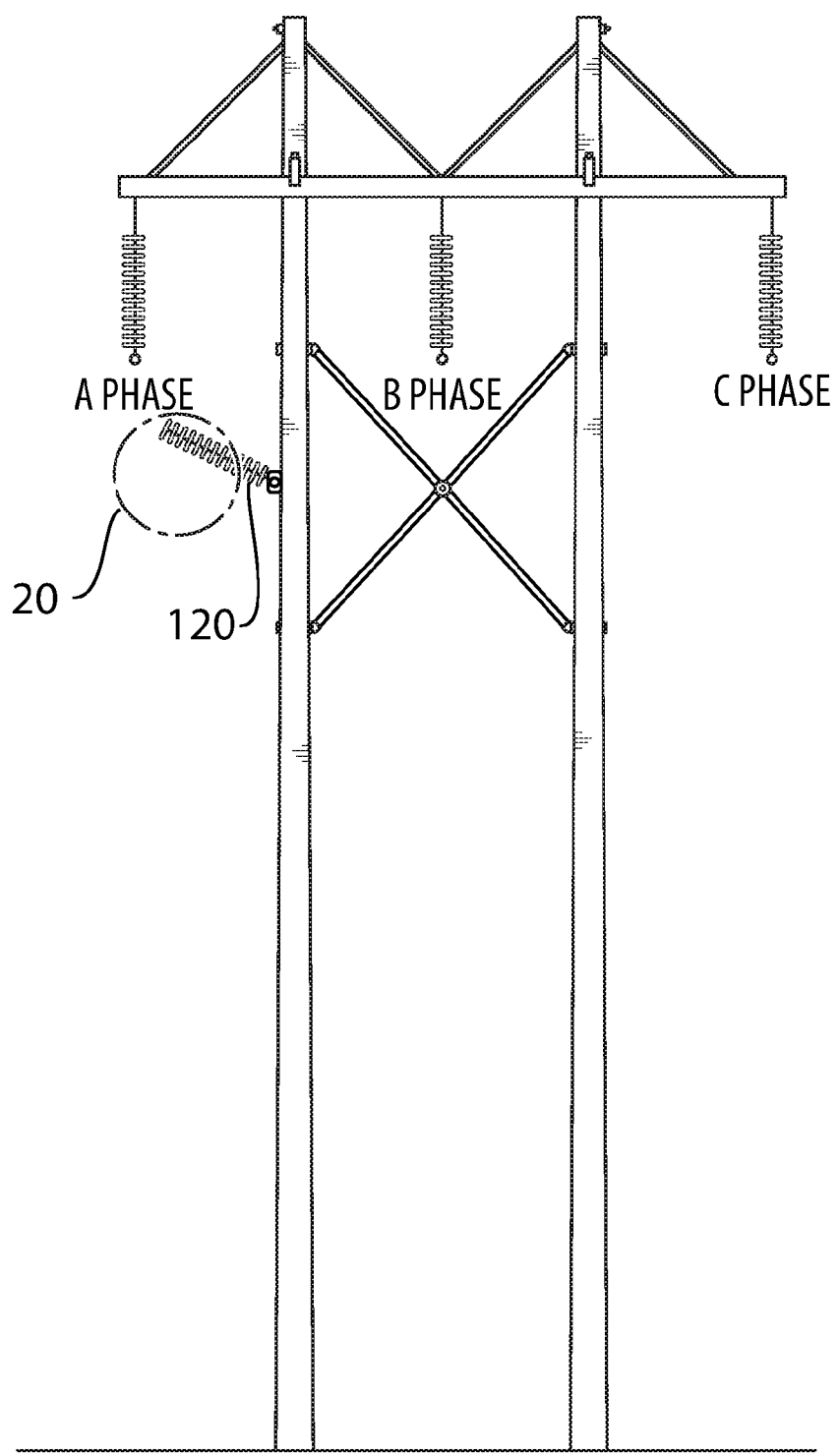

FIG. 55 is the view of FIG. 54 showing the temporary conductor removed.

Figure 56:
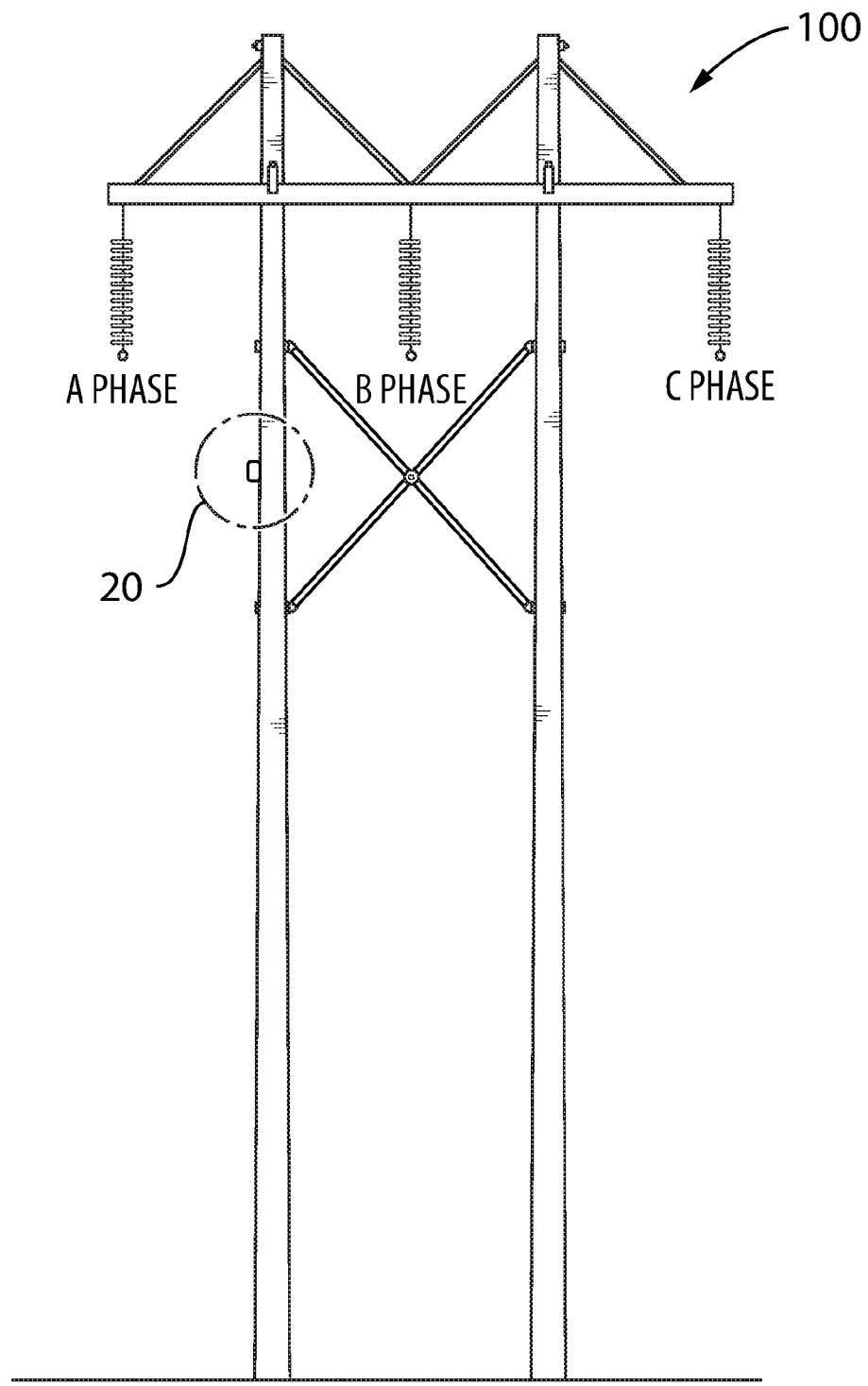

FIG. 56 is the view of FIG. 55 showing the temporary support post removed.

Figure 57:
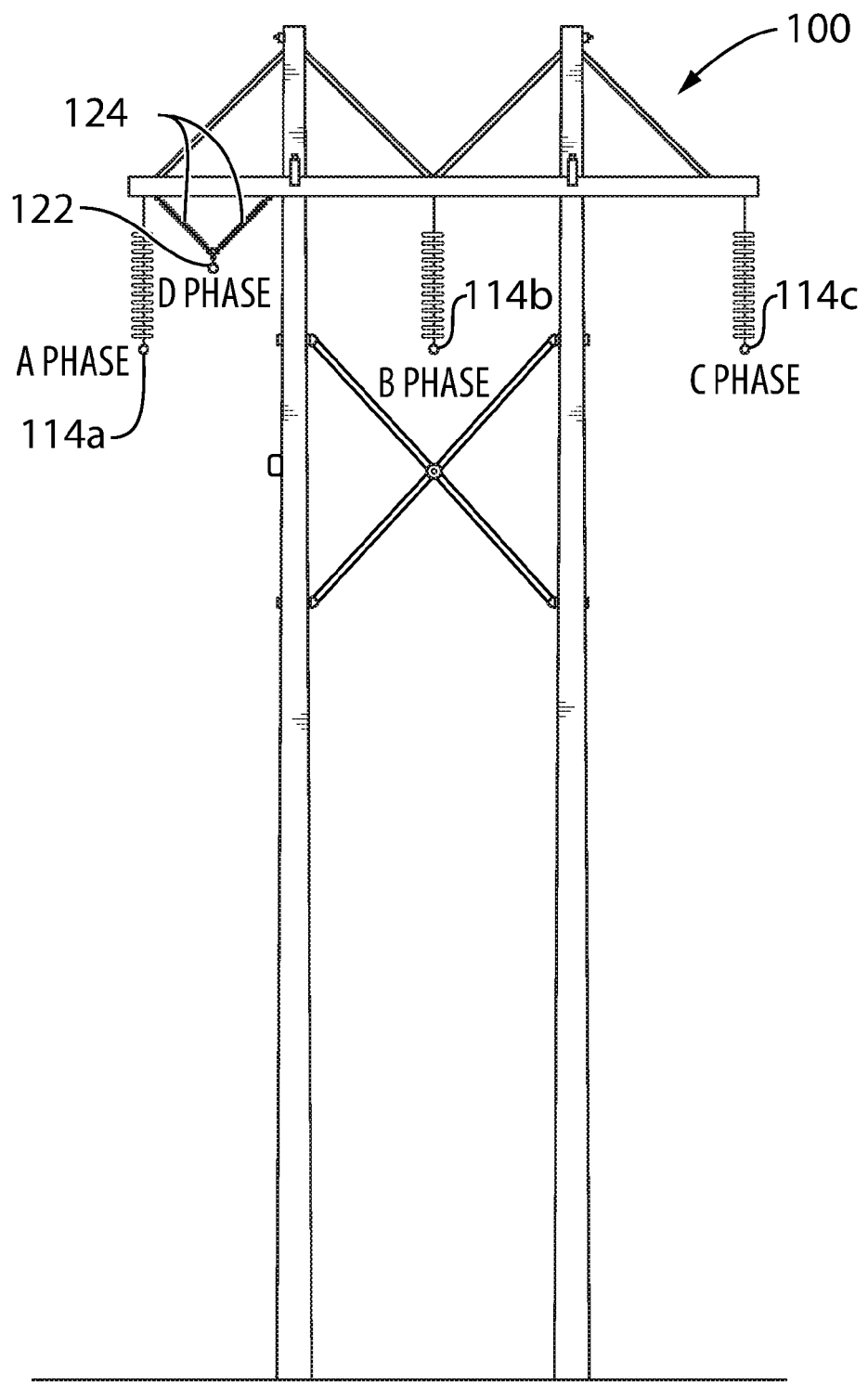

FIG. 57 is the view of FIG. 56 showing a temporary conductor suspended from the H-frame cross arm under a pair of insulators which form a V-shape.

DETAILED DESCRIPTION OF PREFERRED EMBODIMENTS

Figure 1:
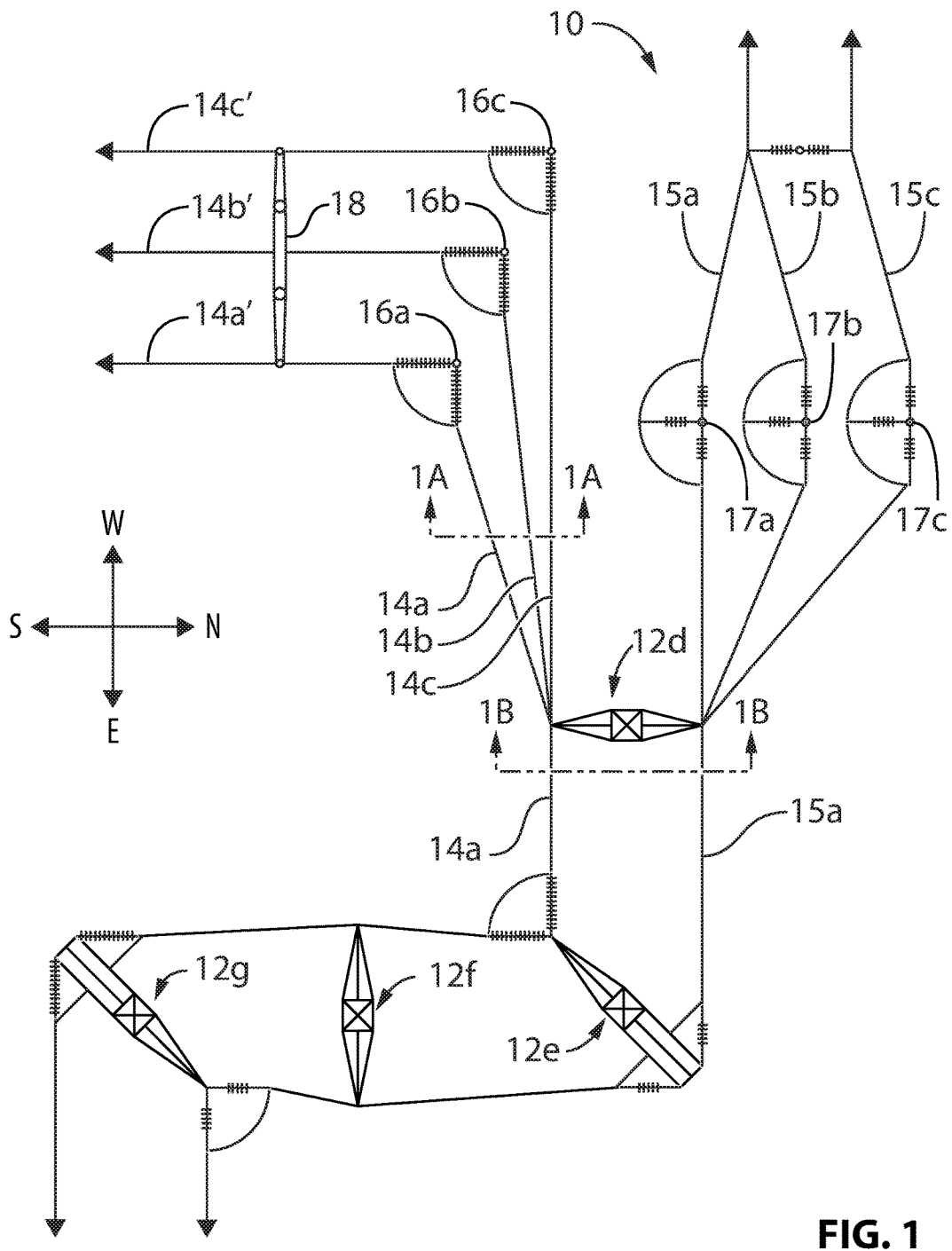
FIG. 1 is in diagrammatic plan view the layout of the energized conductors, re-conductoring.
Figure 1A:
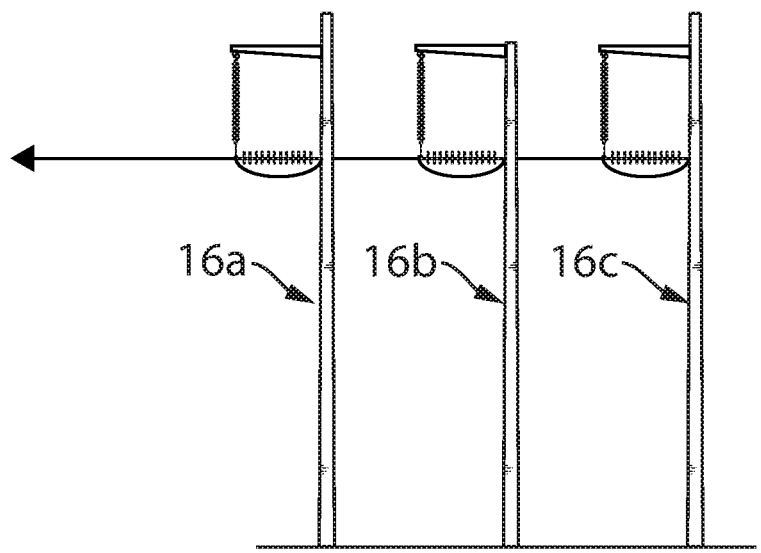
FIG. 1A is a sectional view partially cut away along line 1A-1A on FIG. 1.
Figure 1B:
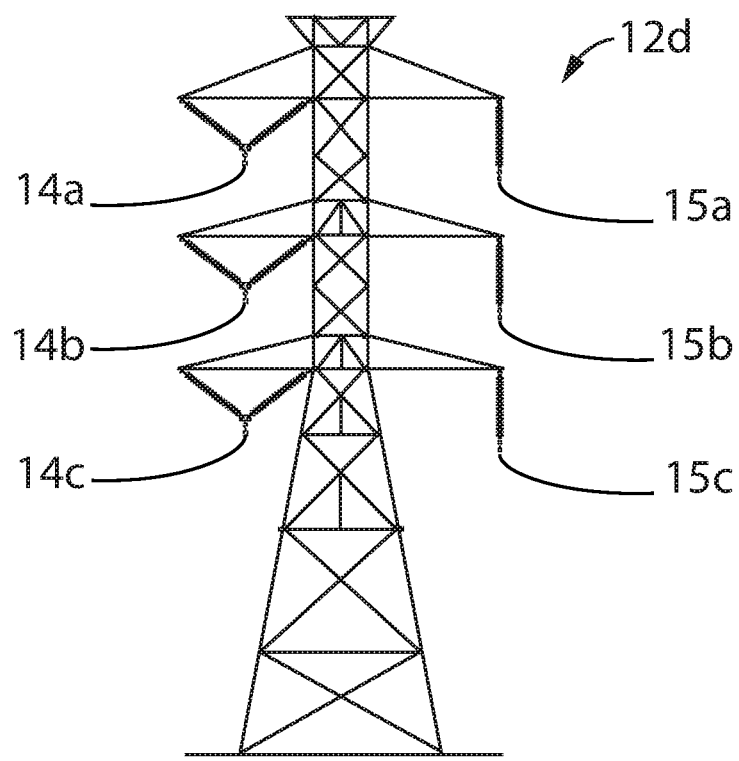
FIG. 1B is a partially cut away sectional view along line 1B-1B on FIG. 1.

With reference to FIG. 1, what is seen is the layout of support towers, and of the conductors supported by the towers, as seen from above, that is, in plan view. FIG. 1A is a side elevation view along line 1A-1A in FIG. 1. FIG. 1B is a side elevation view along line 1B-1B in FIG. 1. A compass orientation is provided in each view for ease of reference between the various labelled phases. The orientation of the compass is by way of example only.

Thus, as seen in the diagrammatic overview 10, which is intended to be representative and not limiting, each of support towers 12d, 12e, 12f, and 12g support, on either side of each tower, electrical conductors comprised of three phases; namely, top phase 14a, center phase 14b, and bottom phase 14c. In the illustrated example the main line being reconductored is 345 Kilovolts (KV) and the circuit on the right is 138 KV as indicated by shorter insulators, the 138 KV line phases are identified using reference numbers 15a, 15b and 15c. Poles are identified as 17a, 17b and 17c and are only labelled in FIG. 1. This embodiment is not intended to be limiting as other high voltage loads may also be carried. In the lower portion of FIG. 1, because phases of 14a-14c are stacked vertically one above the other as seen in FIG. 1B, only top phase 14a can be seen. In the upper portion of FIG. 1A, that is in the upper portion of FIG. 1 relative to structure 16, each of the phases diverges in plan view from one another so as to convert from a vertical spaced apart array of phases to a horizontally spaced apart horizontal array of phases 14a-14c carried by vertical supports 16a-16c respectively. The horizontal array of phases 14a-14c is then carried on support structure 18.

As carried by support structure 18, top phase 14a is renumbered as horizontal phase 14a'. Likewise, center phase 14b is relabeled as horizontal phase 14b' and bottom phase 14c is relabeled horizontal phase 14c'.

The energized re-conductoring method according to one aspect of the present invention is exemplified by the illustrated operations carried out on the layout of FIG. 1 as shown in the balance of the FIGS. 2-42, as those operations are described below. One skilled in the art would know that such operations in a live re-conductoring exercise are highly dangerous and that safety precautions must be followed, so as to avoid hazards such as for example, those discussed in U.S. Pat. No. 7,535,132 entitled Live Conductor Stringing and Splicing Method and Apparatus.

Figure 2:
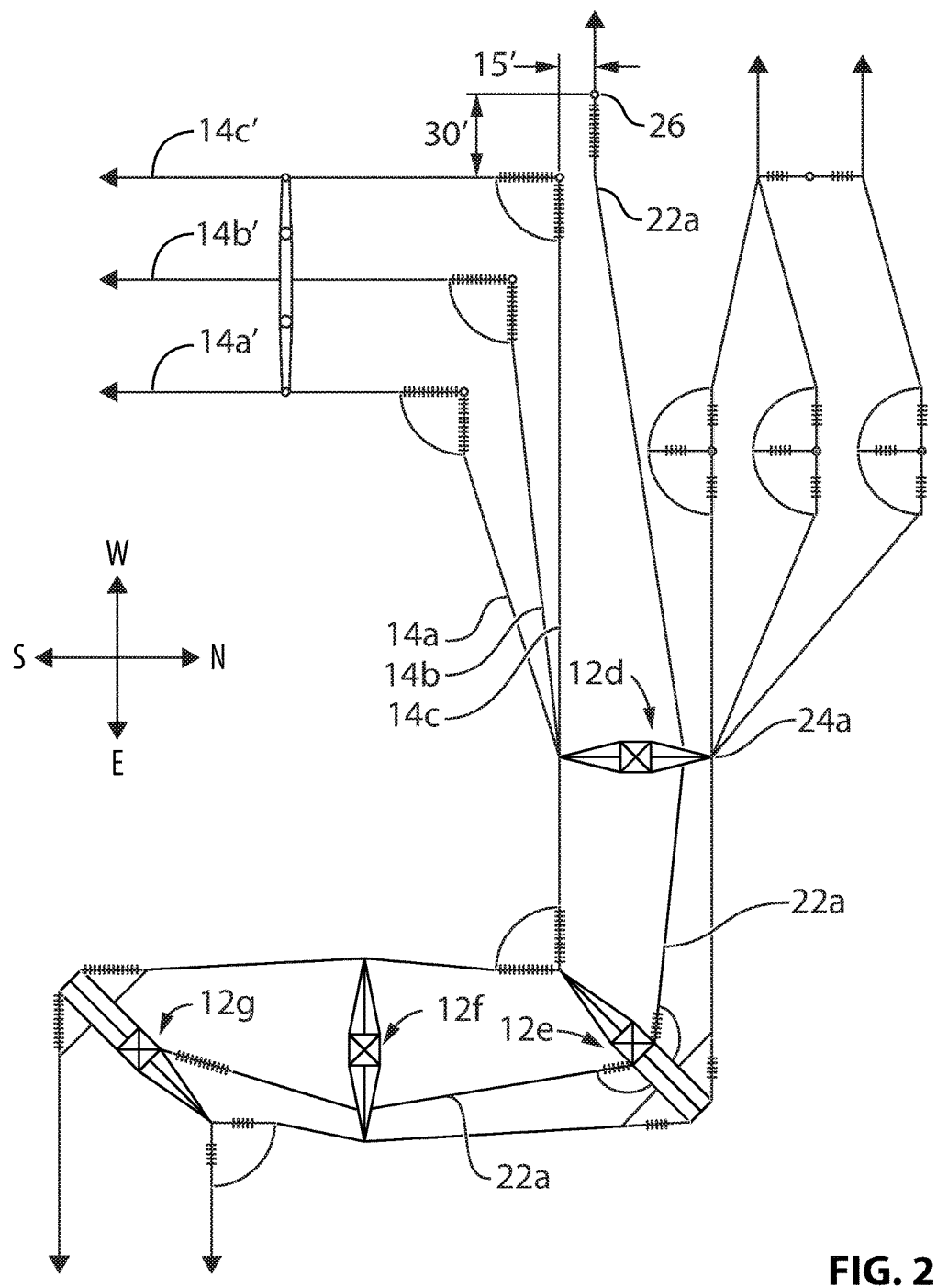
FIG. 2 is the plan view of FIG. 1 showing the addition of a temporary line.
Figure 2A:
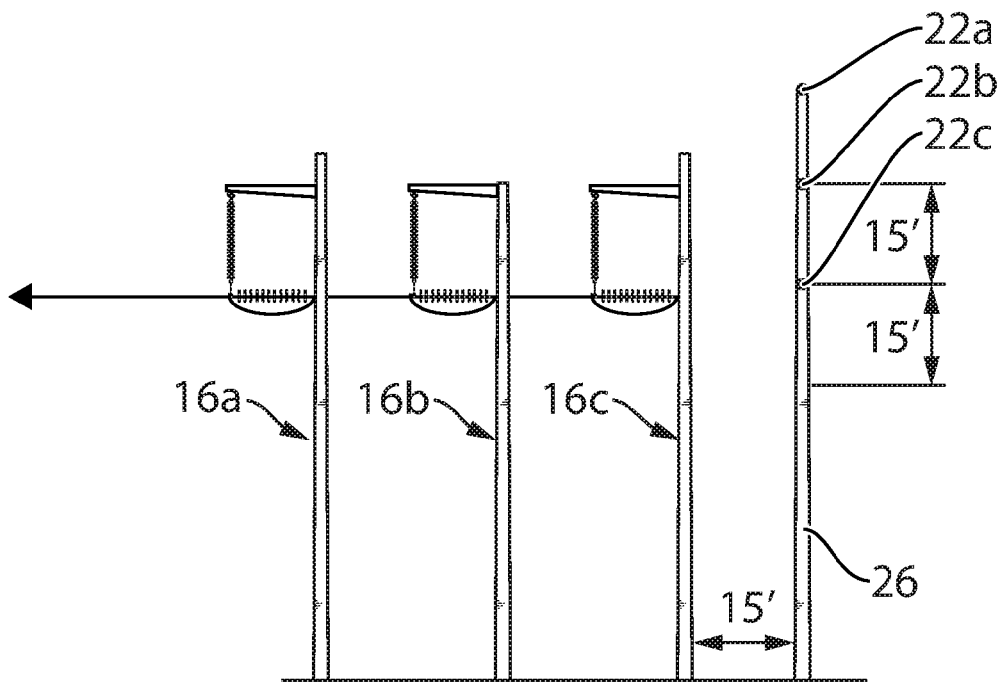
FIG. 2A is a sectional view in FIG. 2 at the position shown at FIG. 1A in FIG. 1.
Figure 2B:
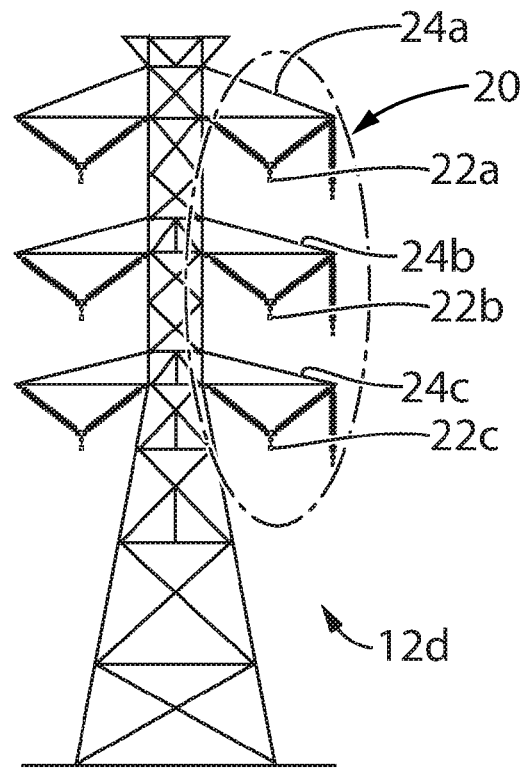
FIG. 2B is a sectional view in FIG. 2 at the position of sectional view FIG. 1B in FIG. 1.

Commencing in FIG. 2B, ovals and circles 20, have been added to highlight in at least one view where changes have been made which affect the representation in the previous view and thus allow for rapid detection by the reader of the changes made by the various steps in the method described herein.

Thus as seen in FIG. 2B, the highlight oval 20 is shown around the north arms of tower 12d to indicate that changes are made from the representation of tower 12d in FIG. 1B. Thus highlight oval 20 in FIG. 2B indicates that a re-usable temporary line comprising temporary phases 22a, 22b, and 22c for the temporary top, center and bottom phases respectively have been strung under the corresponding top, center and bottom arms 24a, 24b, and 24c respectively of tower 12d. The temporary line extends from tower 12g via towers 12f, 12e and 12d to temporary vertical dead-end 26, better seen in FIG. 2A. Temporary phases 22a, 22b and 22c are maintained in a vertically spaced apart array from tower 12g to temporary vertical dead-end 26.

Figure 3:
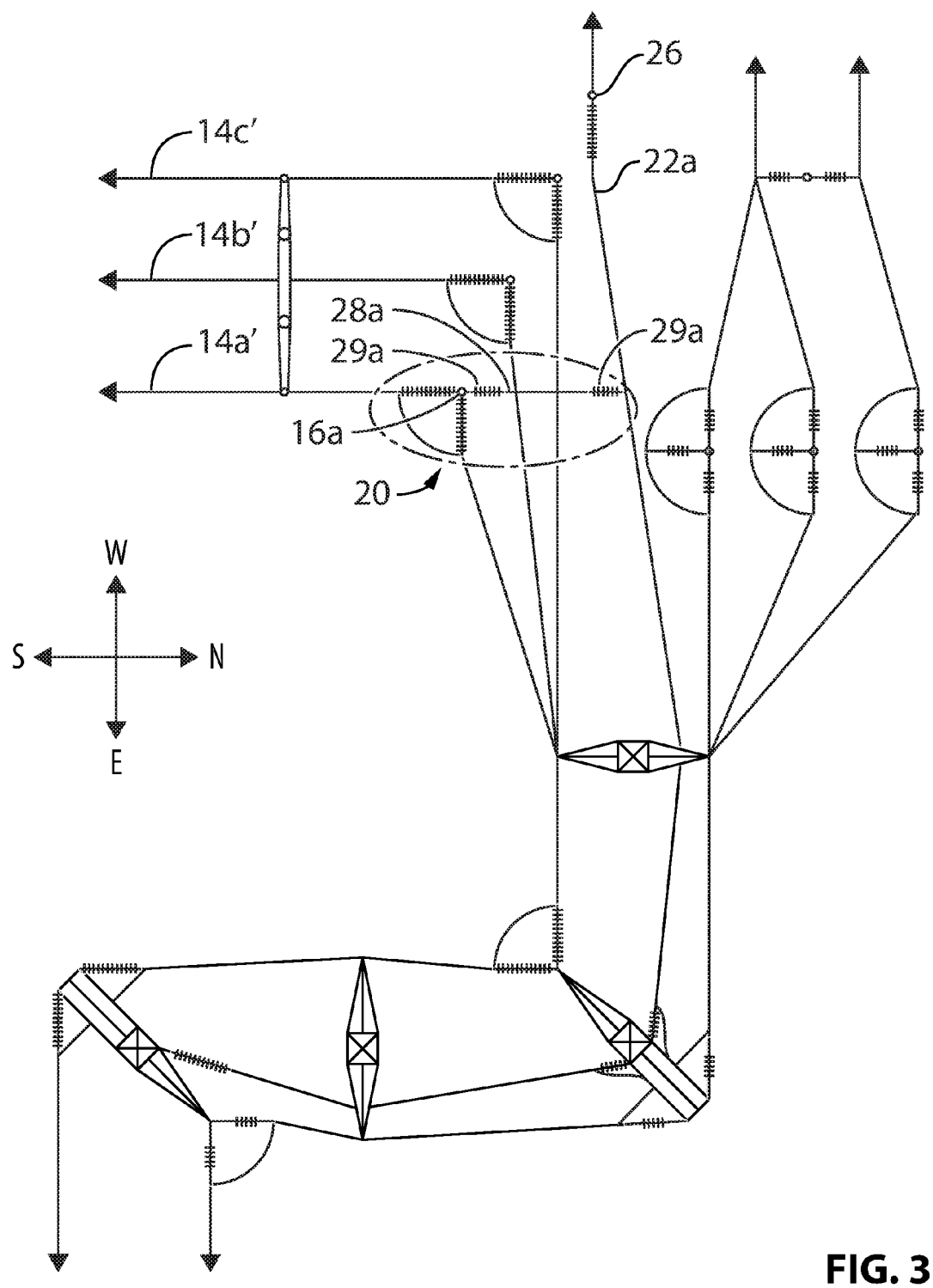
FIG. 3 is the view of FIG. 2 showing an installed jumper.
Figure 3A:
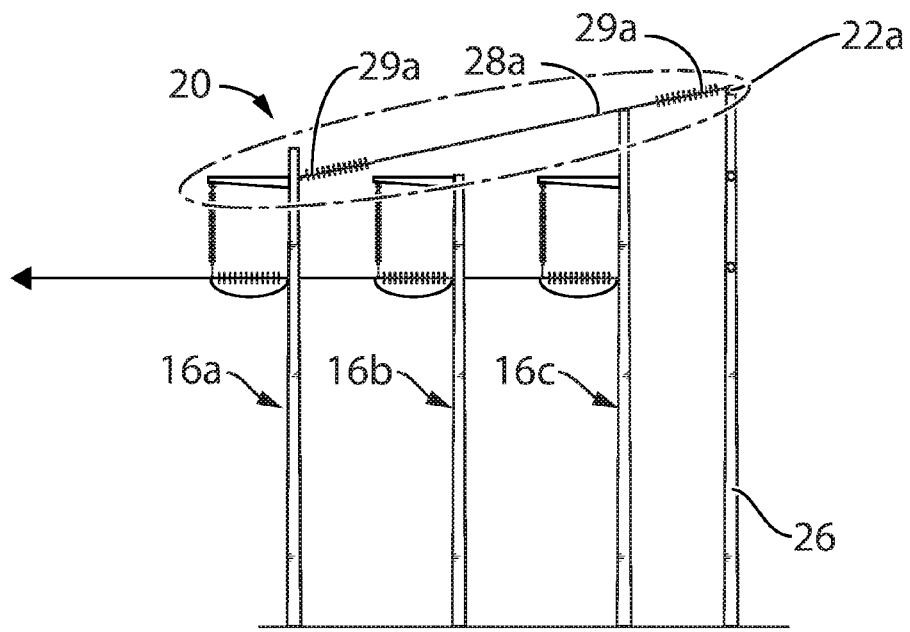
FIG. 3A is a sectional view of FIG. 3 in the position of sectional view of FIG. 2A in FIG. 2.
Figure 3B:
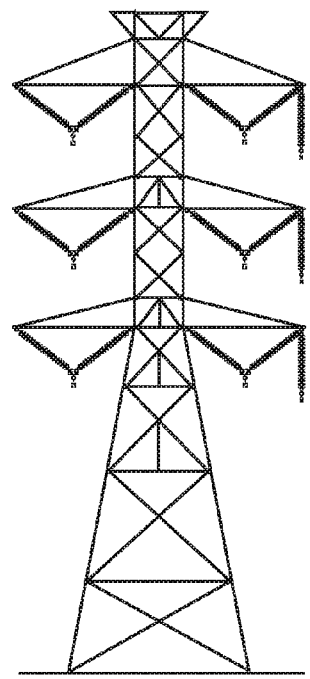
FIG. 3B is a sectional view in FIG. 3 at the position of sectional view of FIG. 2B in FIG. 2.

As seen in FIGS. 3 and 3A, a jumper 28a is installed between the top of the pole of vertical support 16a, that is, the East phase pole top, to the top temporary phase 22a. Jumper 28a is mounted between corresponding insulators or polymers 29a at the opposite ends of jumper 28a.

Figure 4:
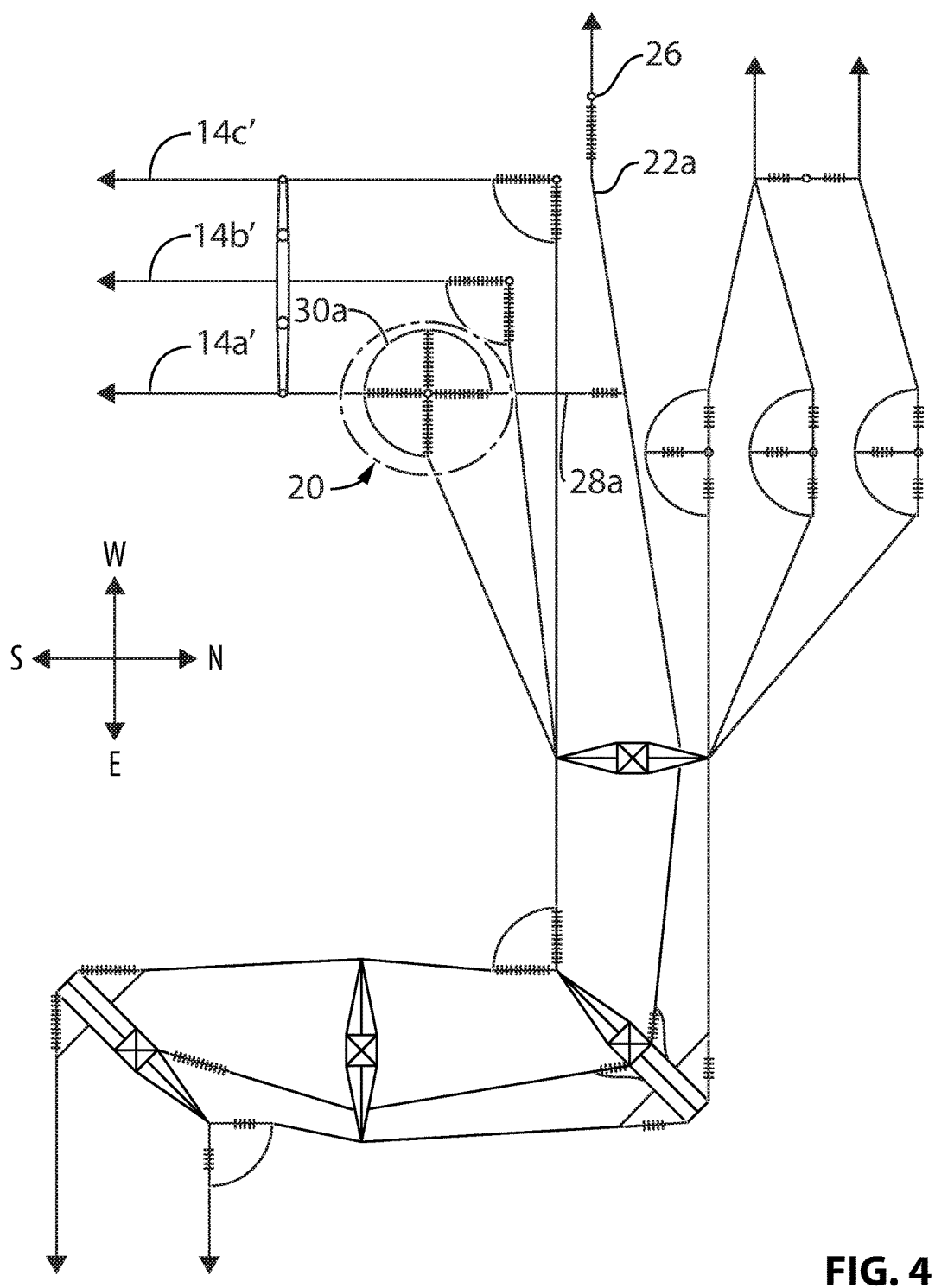
FIG. 4 is the view of FIG. 3 showing the installation of a further jumper.
Figure 4A:
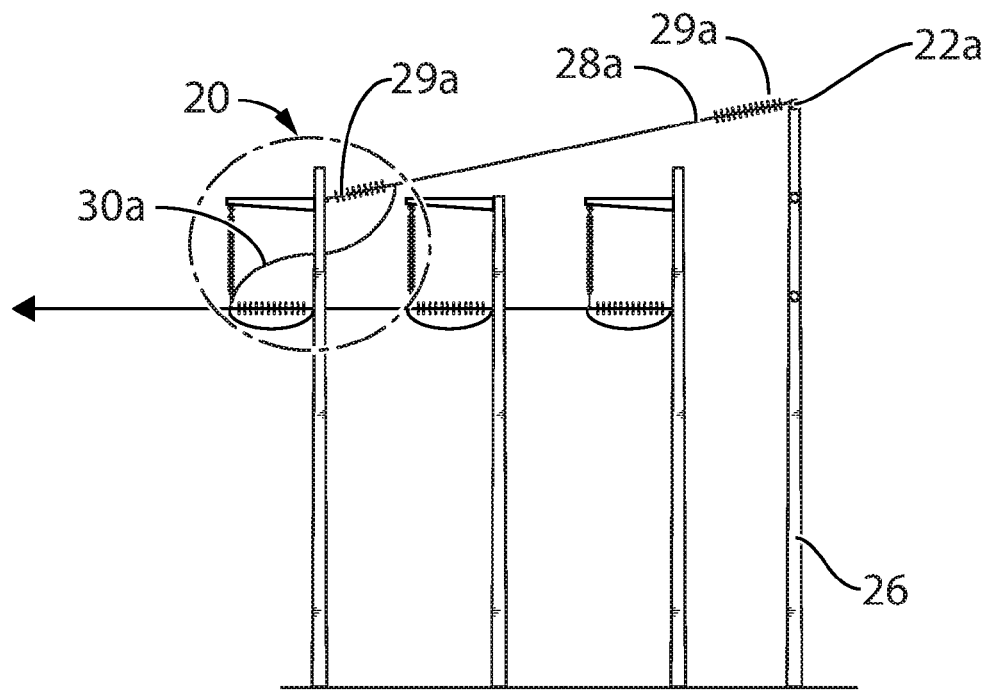
FIG. 4A is a sectional view at the position of sectional view of FIG. 3A.
Figure 4B:
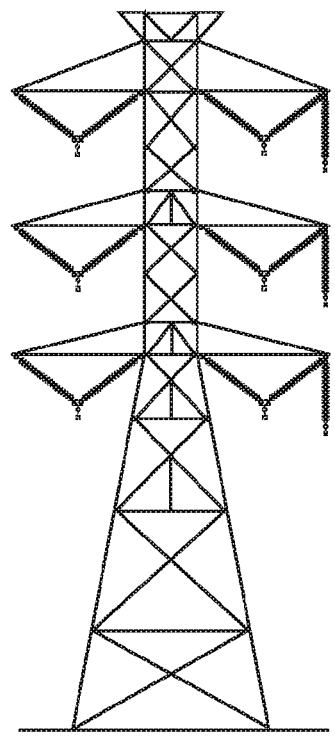
FIG. 4B is a sectional view at the position of sectional view of FIG. 3B.

As seen in FIGS. 4 and 4A, a jumper 30a installed between the horizontal phase 14a, that is, the East phase, and the temporary jumper 28a thereby energizing temporary jumper 28a.

Figure 5:
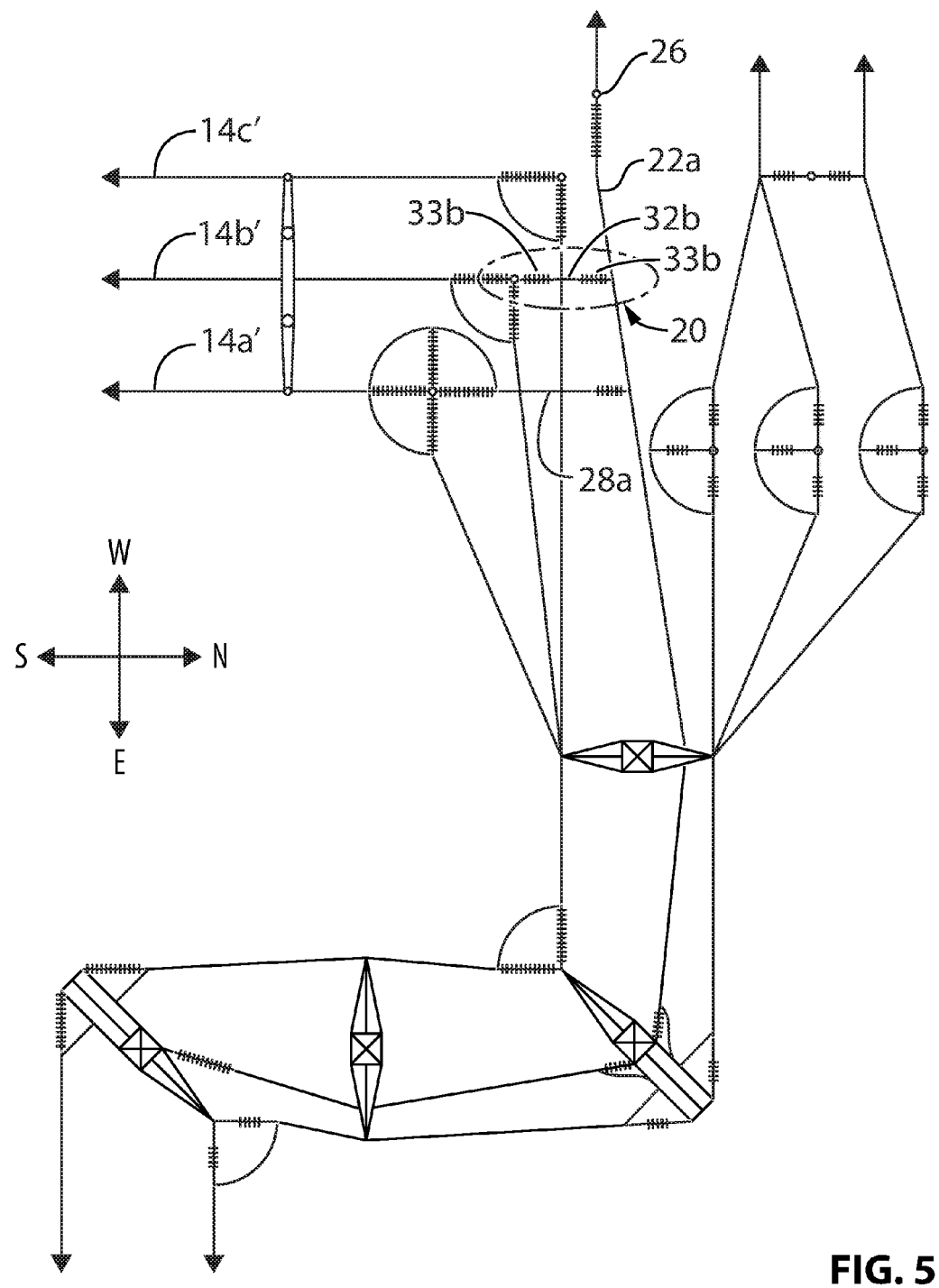
FIG. 5 is the view of FIG. 4 showing the installation of a further jumper.
Figure 5A:
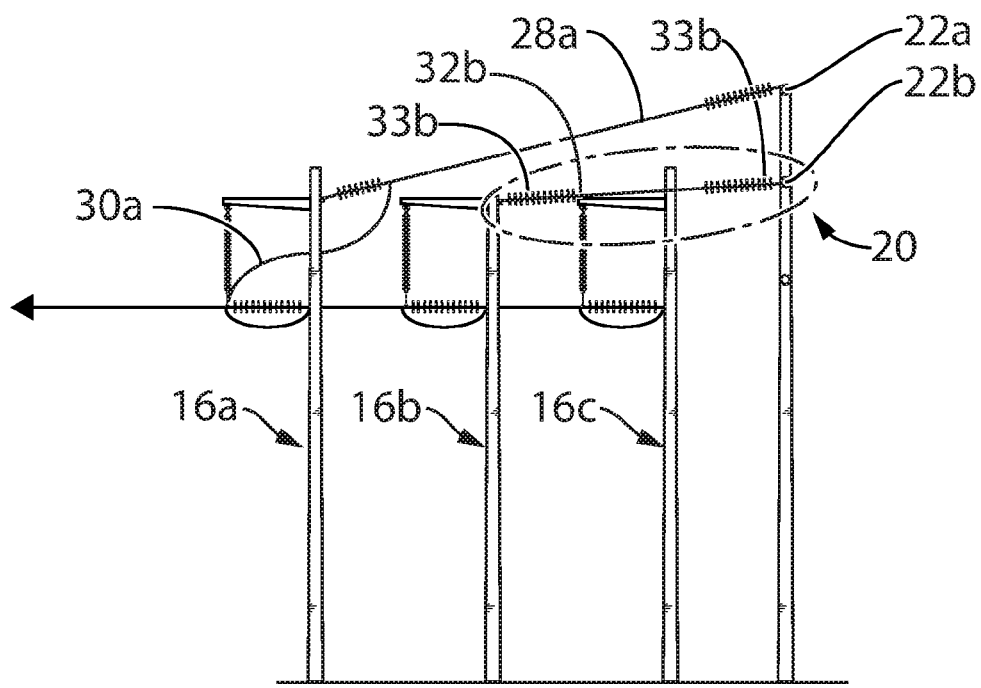
FIG. 5A is a sectional view at FIG. 5 at the position of the sectional view of FIG. 4A in FIG. 4.
Figure 5B:
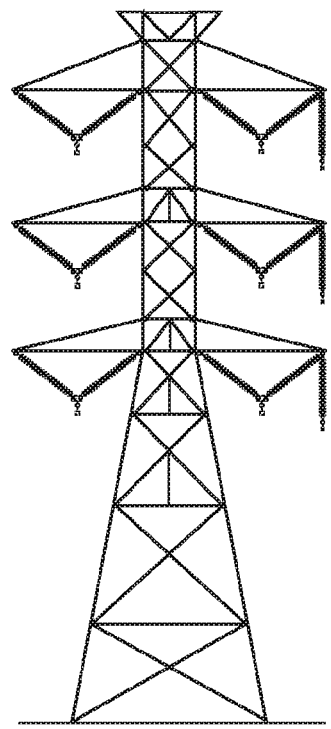
FIG. 5B is a sectional view at FIG. 5 at the position of the sectional view of FIG. 4B in FIG. 4.

As seen in FIGS. 5 and 5A, a temporary jumper 32b is installed from the top of the pole of vertical support 16b, that is, from the center phase pole top, to the temporary center phase 22b. A pair of insulators or polymers 33b is mounted at opposite ends of temporary jumper 32b, between temporary jumper 32b and the top of vertical support 16b and center temporary phase 22b.

Figure 6:
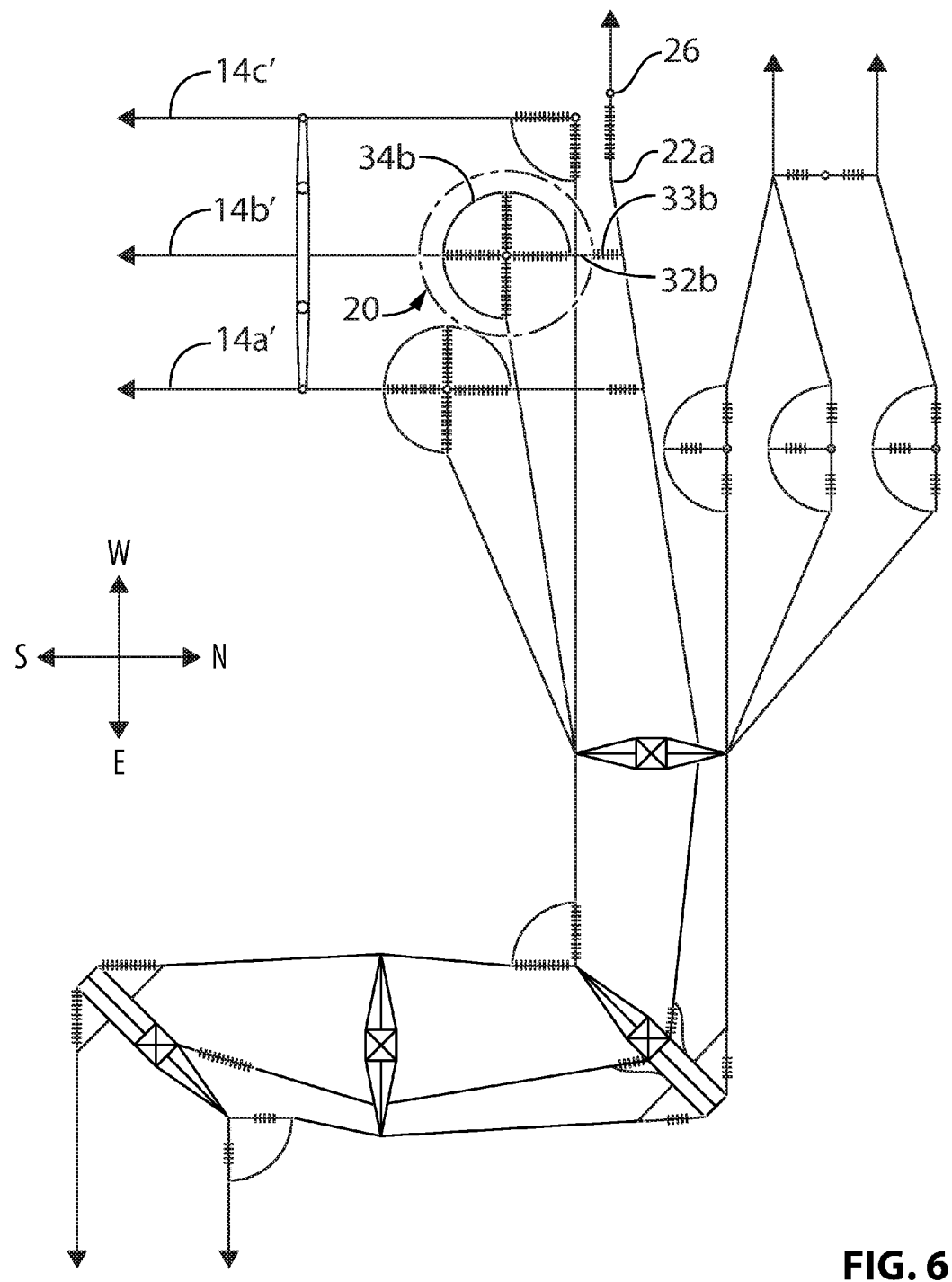
FIG. 6 is the view of FIG. 5, showing the installation of a further jumper.
Figure 6A:
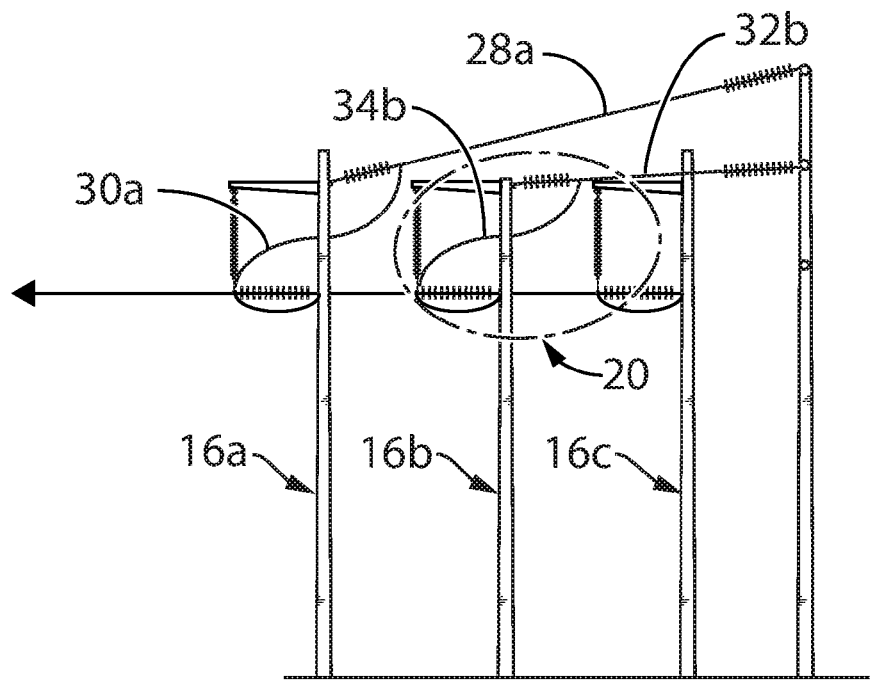
FIG. 6A is a sectional view of FIG. 6 in the position of FIG. 5A in FIG. 5.
Figure 6B:
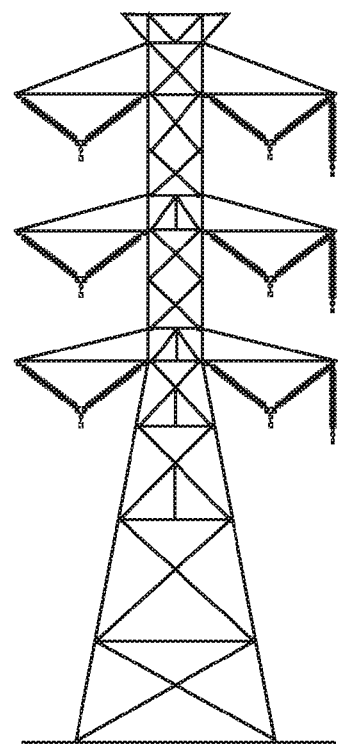
FIG. 6B is a sectional view at FIG. 6 at the position of the sectional view of FIG. 5B in FIG. 5.

As seen in FIGS. 6 and 6A, a jumper 34b is installed from the horizontal center phase 14b to temporary jumper 32b thereby energizing temporary jumper 32b.

Figure 7:
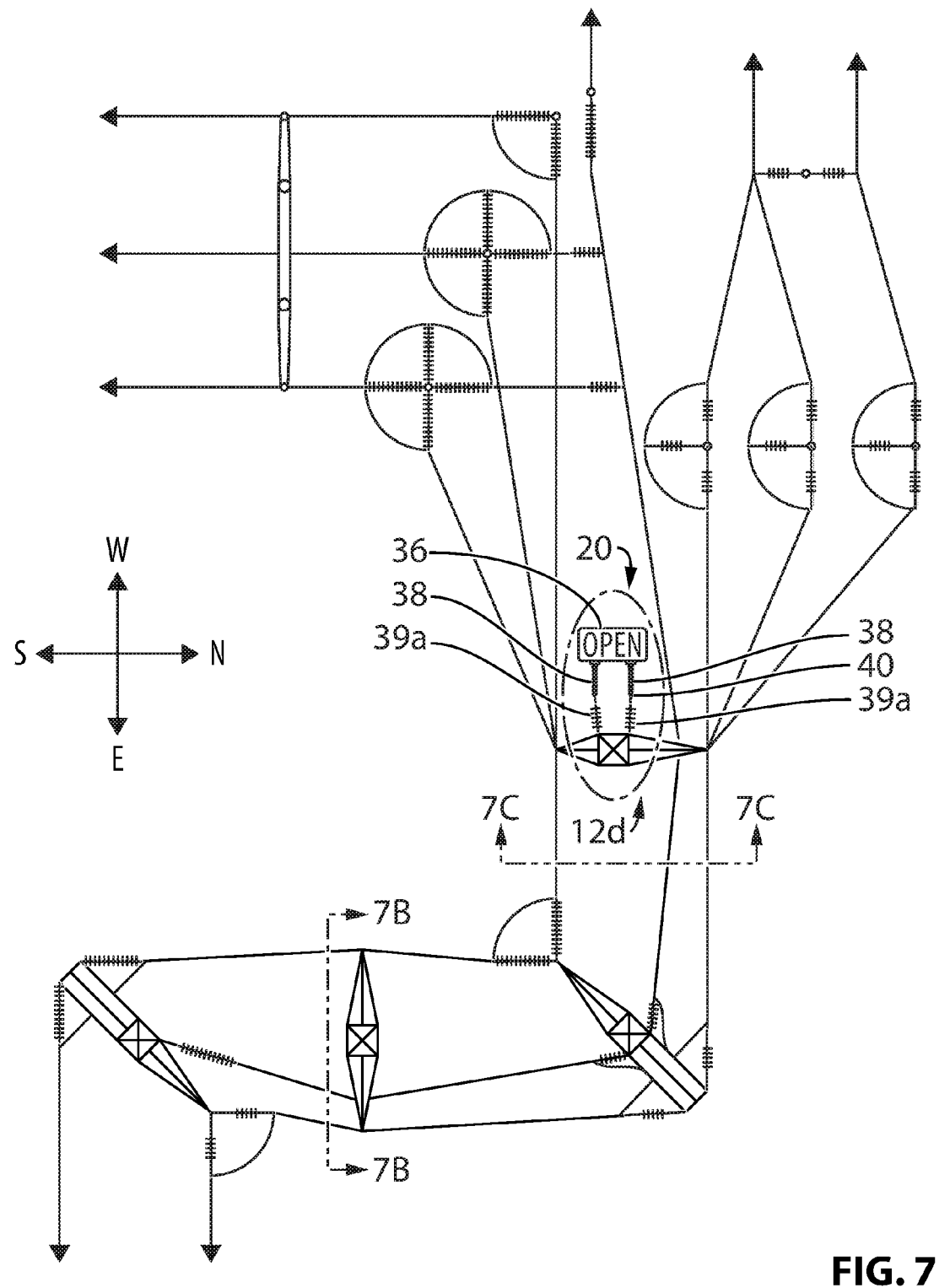
FIG. 7 is the view of FIG. 6 showing the addition of a first temporary polymer post and transfer bus breaker.
Figure 7A:
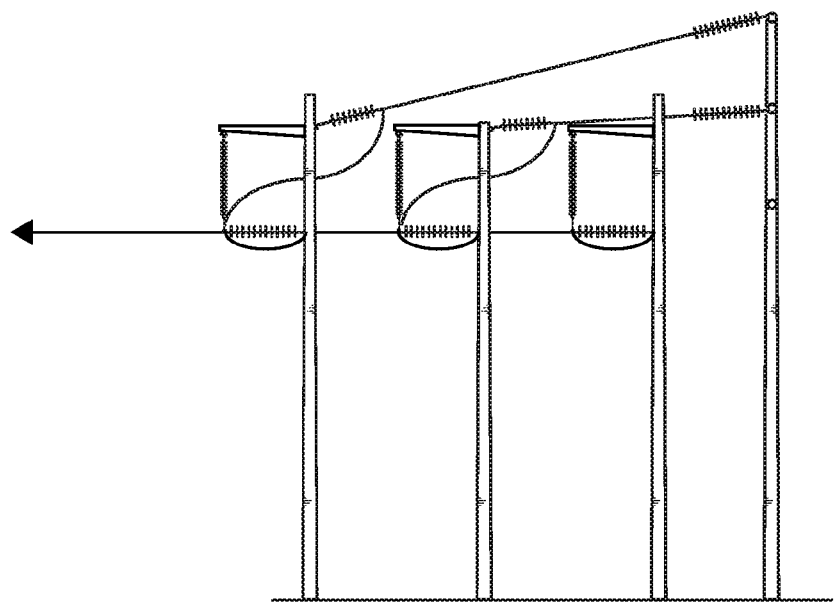
FIG. 7A is a sectional view in FIG. 7 at the position of the sectional view of FIG. 6A in FIG. 6.
Figure 7B:
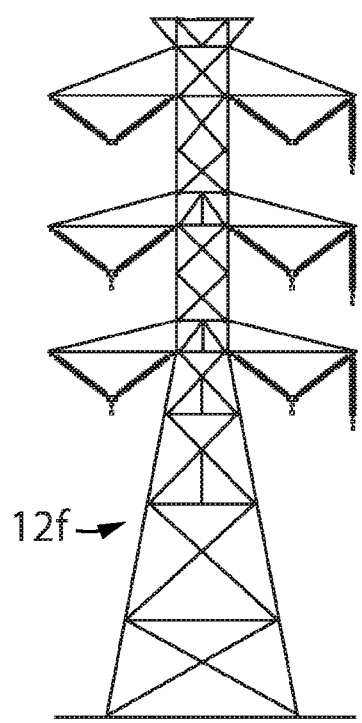
FIG. 7B is a sectional view along line 7B-7B in FIG. 7.
Figure 7C:
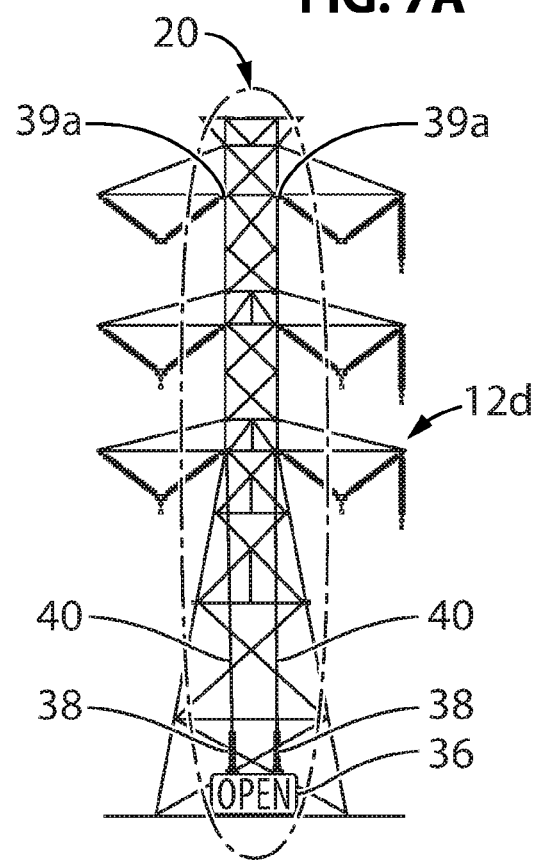
FIG. 7C is a sectional view along line 7C-7C in FIG. 7.

As seen in FIGS. 7, 7C and 43, polymer posts 39a, 39a are installed on the legs of tower 12d on each side and positioned above the bushings 38, 38 of the first temporary circuit breaker 36. A transfer bus 40 is run down each side of tower 12d between polymer posts 39a, 39a and the bushings 38, 38 of the first temporary circuit breaker 36.

Figure 8:
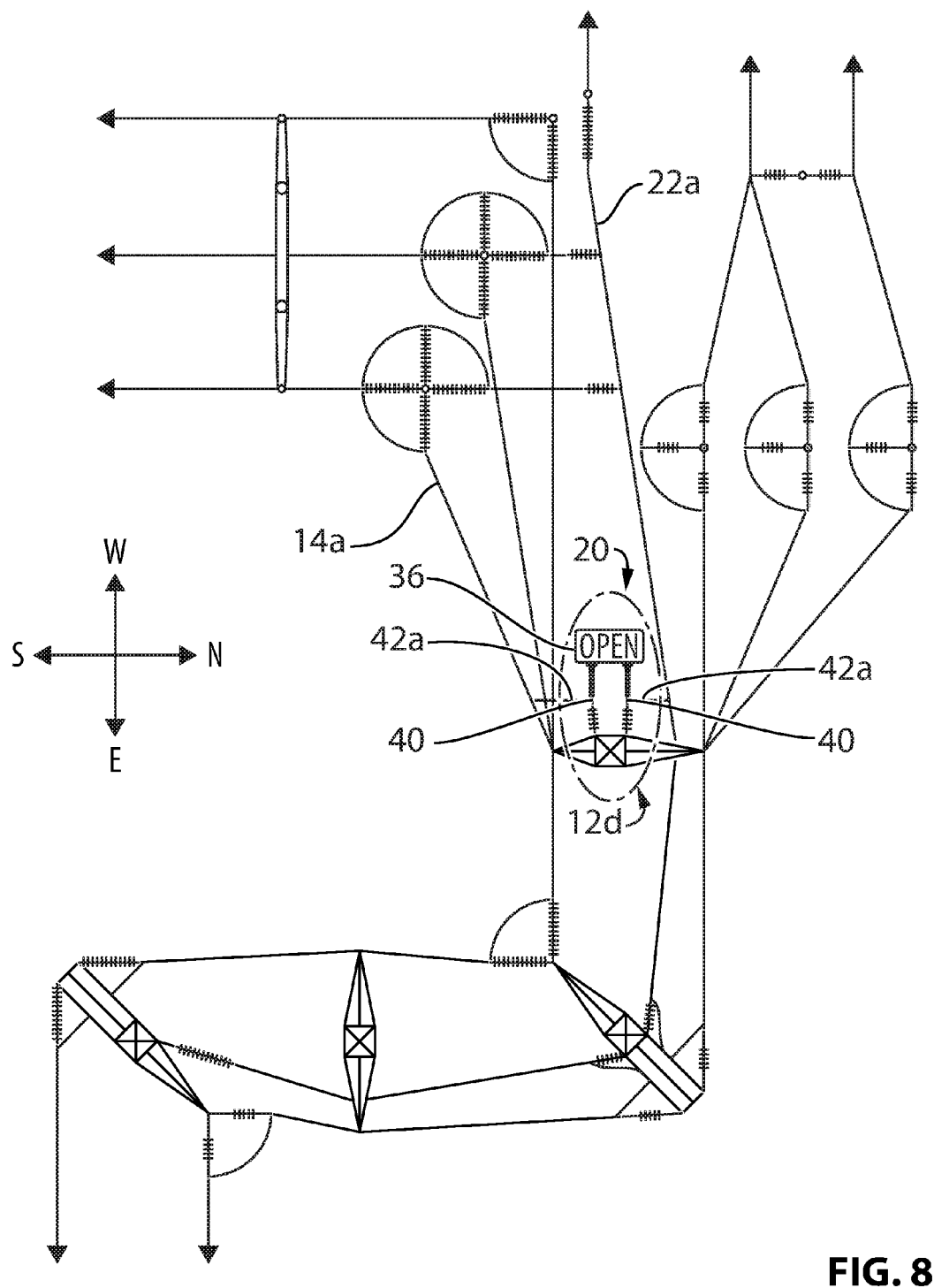
FIG. 8 is the view of FIG. 7 showing the installation of two further jumpers.

As seen in FIGS. 8 and 8C, a jumper 42a is installed from the top phase 14a to the adjacent transfer bus 40. With the first temporary circuit breaker 36 verified to be in its open condition, a second jumper 42a is installed from the top temporary phase 22a to the other side of transfer bus 40, that is the side of transfer bus 40 adjacent top temporary phase 22a. This energizes one side of the first temporary circuit breaker 36.

Figure 9:
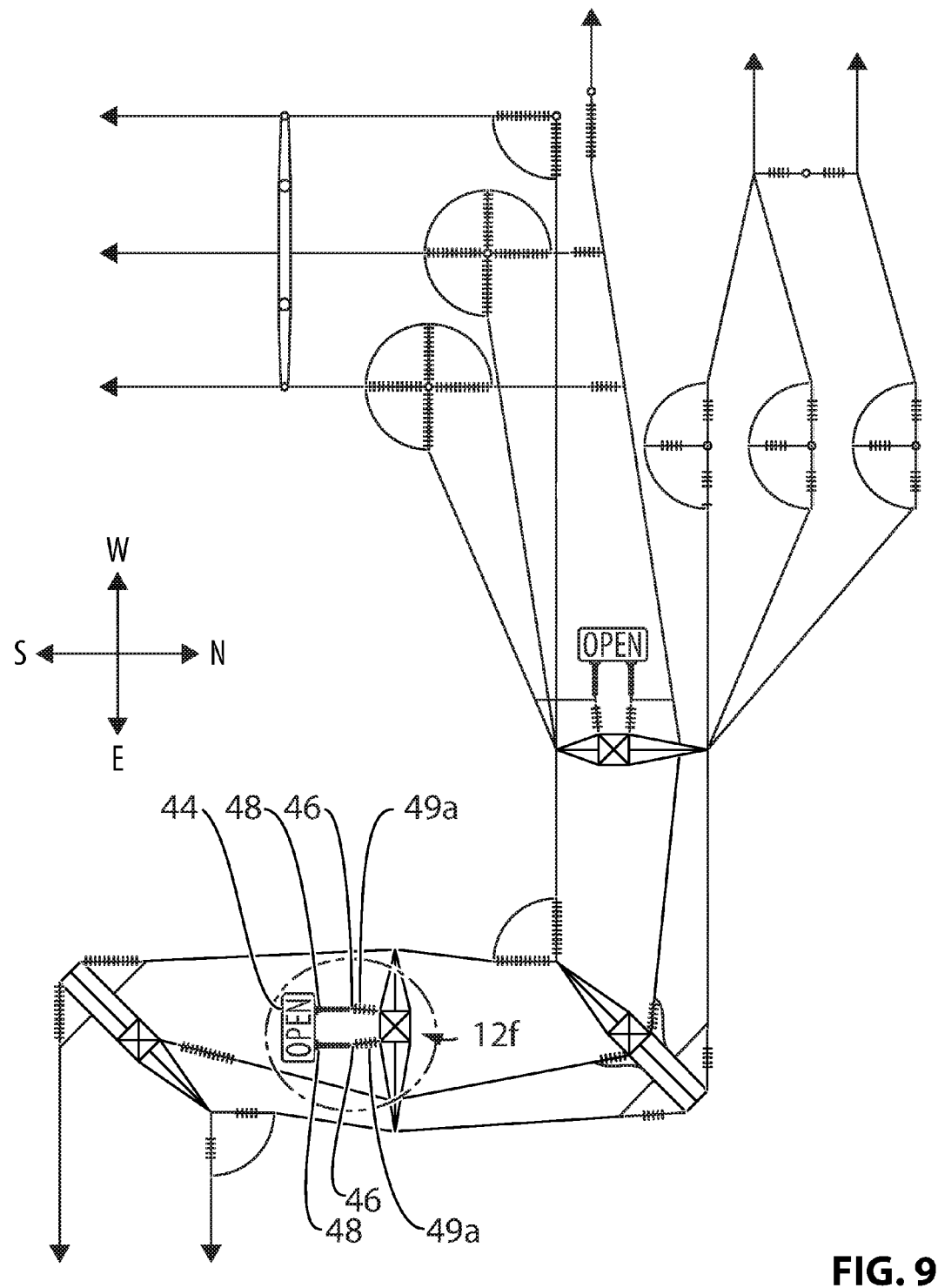
FIG. 9 is the view of FIG. 8 showing the installation of a second or further temporary breaker, polymer posts, and a transfer buses one on each side.
Figure 10:
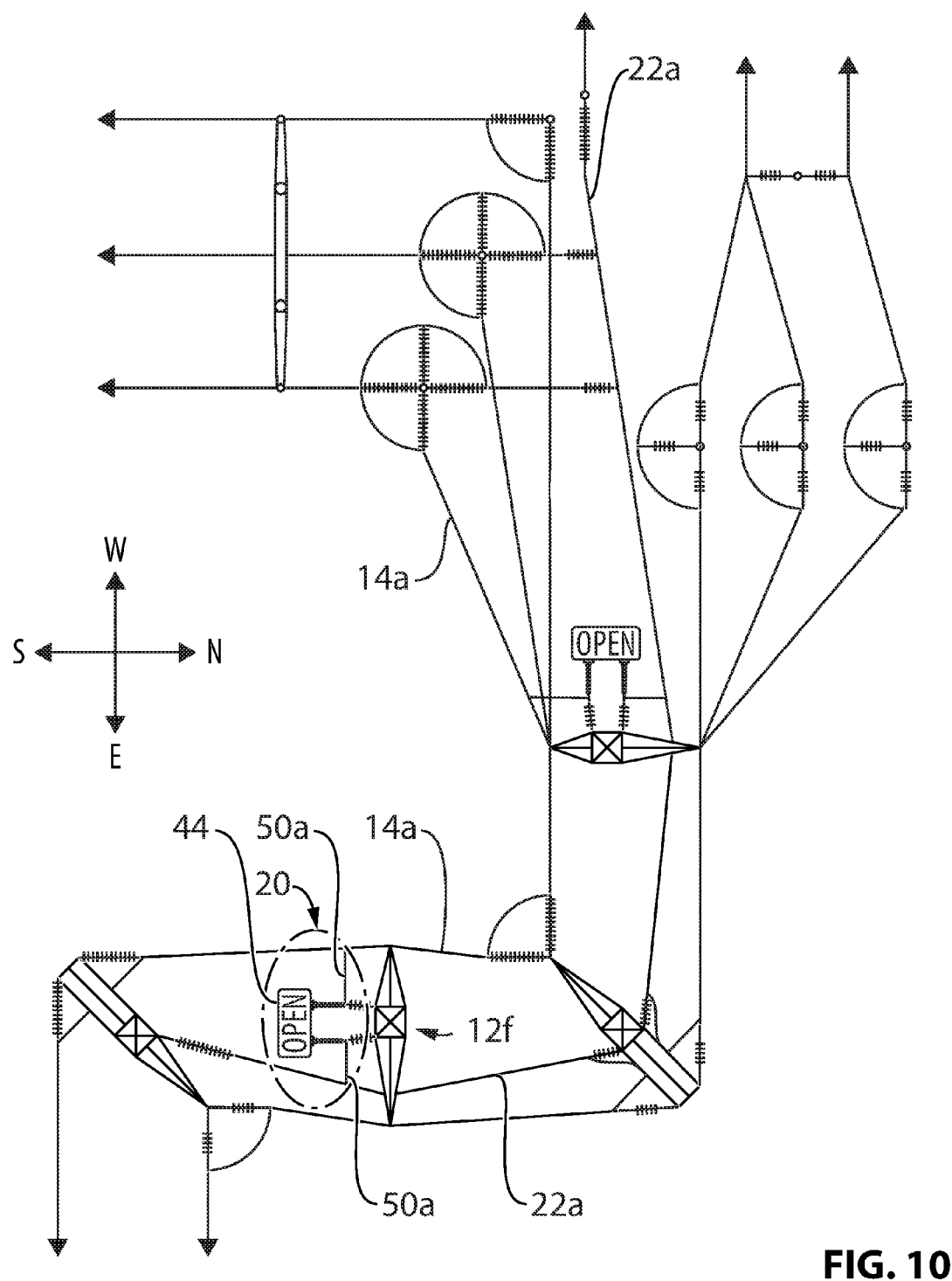
FIG. 10 is the view of FIG. 9 showing the installation of a further two jumpers.

As seen in FIGS. 9 and 9B, similar to the installation of the first temporary circuit breaker 36 and transfer bus 40 on tower 12d, discussed above in relation to FIG. 7, a further second temporary circuit breaker 44 and corresponding transfer bus 46 is set up adjacent to tower 12f. Transfer bus 46 is installed between the bushings 48, 48 on the second temporary circuit breaker 44 and polymer posts 49a, 49a on the legs of tower 12f, is set up adjacent to tower 12f.

As seen in FIGS. 10 and 10B, again with the second temporary circuit breaker 44 confirmed open, jumpers 50a are installed from top phase 14a and transfer bus 46, and between transfer bus 46 and top temporary phase 22a respectively. This energizes one side of the second temporary circuit breaker 44.

Figure 11:
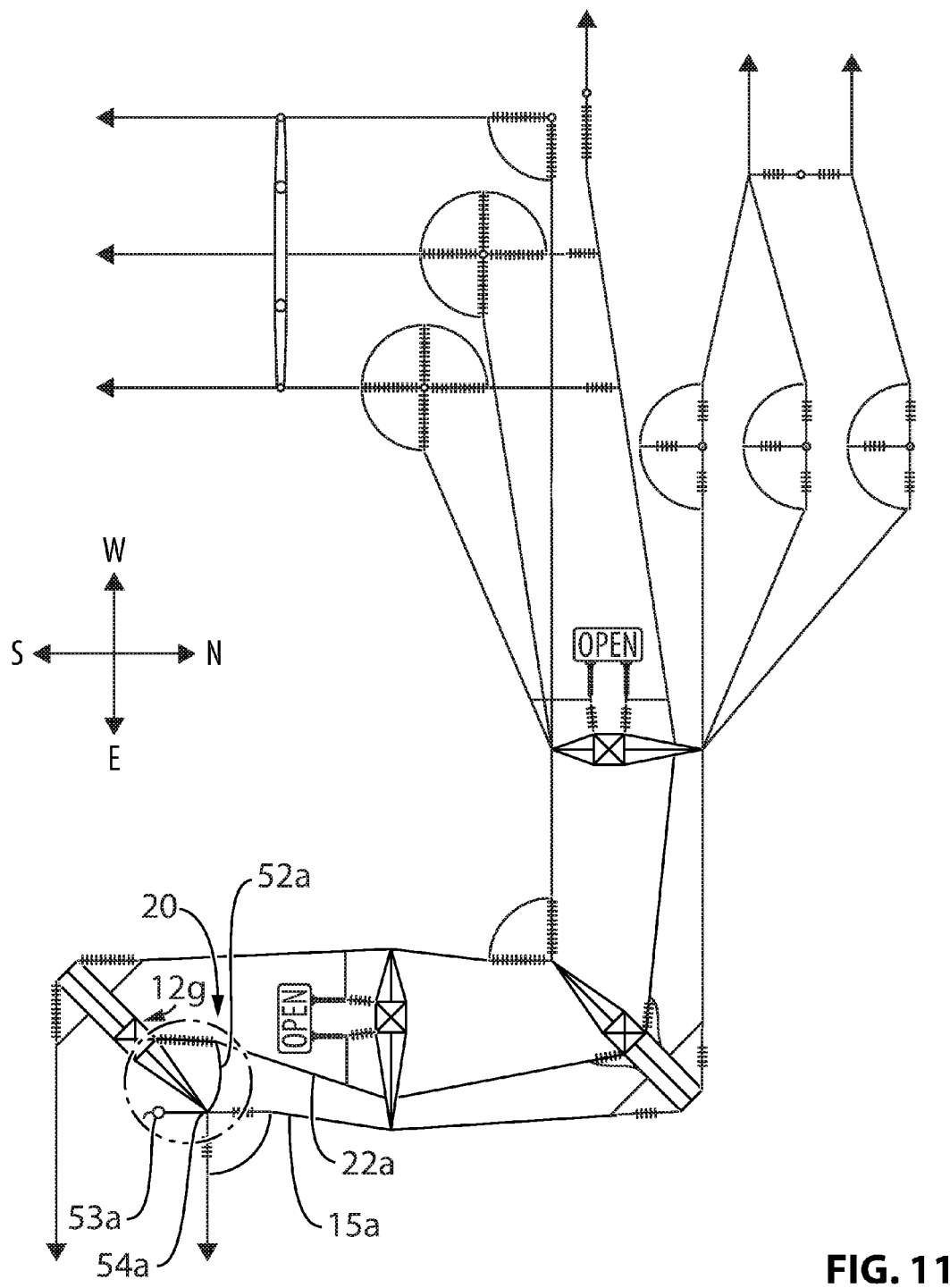
FIG. 11 is the view of FIG. 10 showing the installation of a temporary jumper to a suspension insulator.

As seen in FIG. 11, a temporary jumper 52a is installed on adjacent tower 12g, from the top temporary phase 22a to a suspension insulator 54a on the end of the corresponding arm of tower 12g, so as to leave an extra length 53a of jumper 52a coiled for use later as described below.

Figure 12:
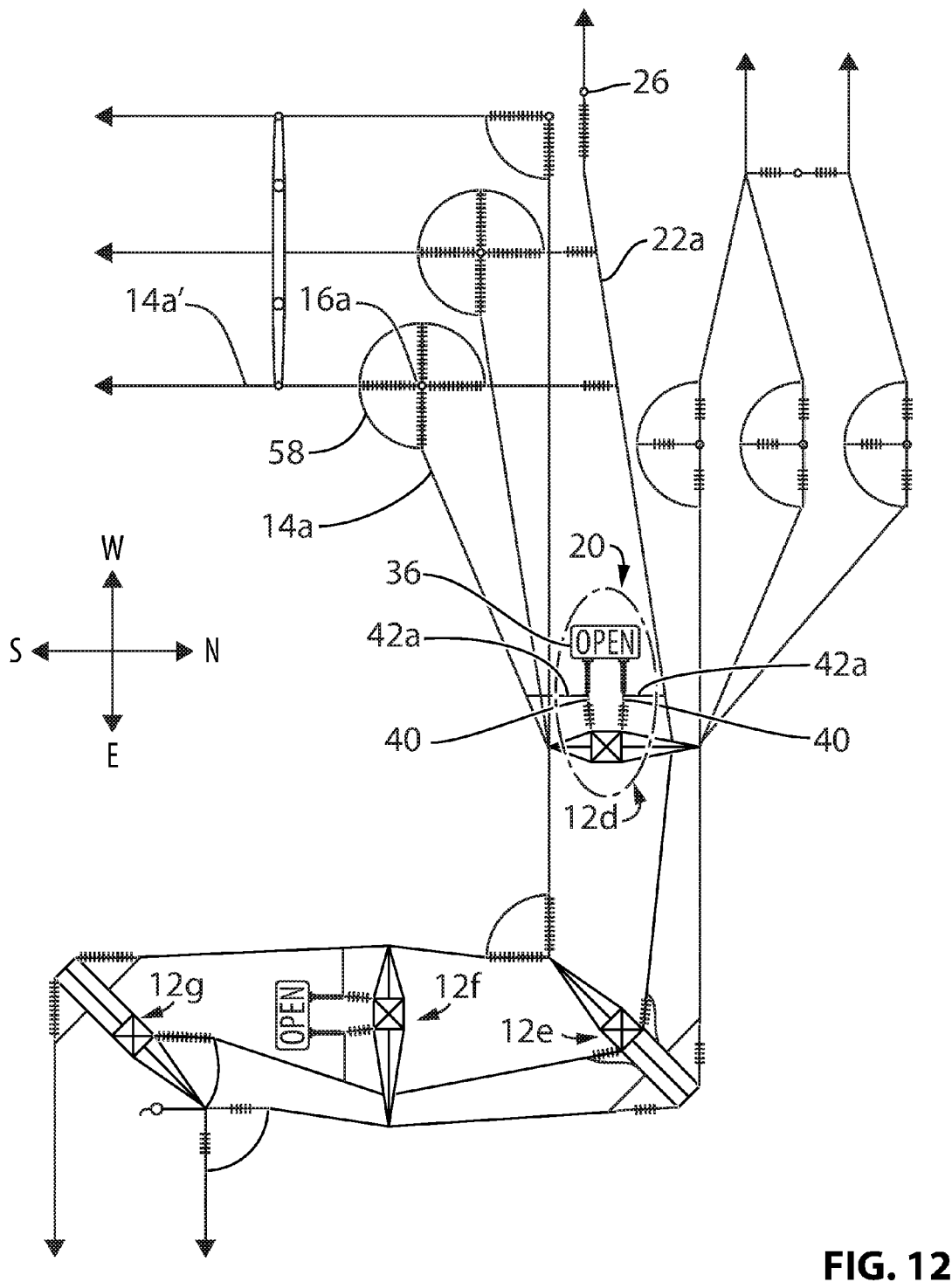
FIG. 12 the view of FIG. 11 showing the first temporary breaker closed.
Figure 12A:
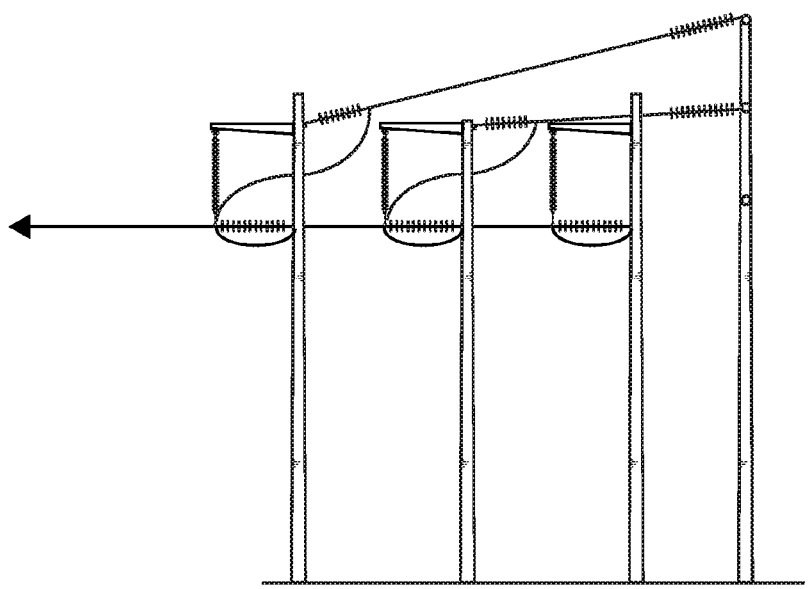
FIG. 12A is a sectional view in FIG. 12 at the position of the sectional view of FIG. 11A in FIG. 11.
Figure 12B:
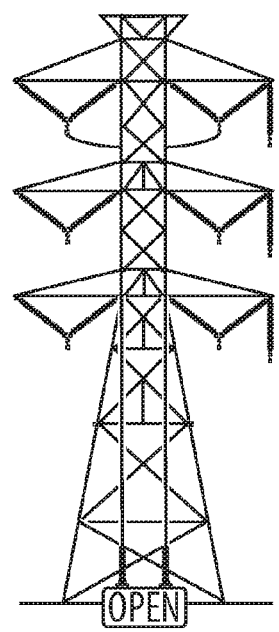
FIG. 12B is a sectional view in FIG. 12 at the position of the sectional view of FIG. 11B in FIG. 11.
Figure 12C:
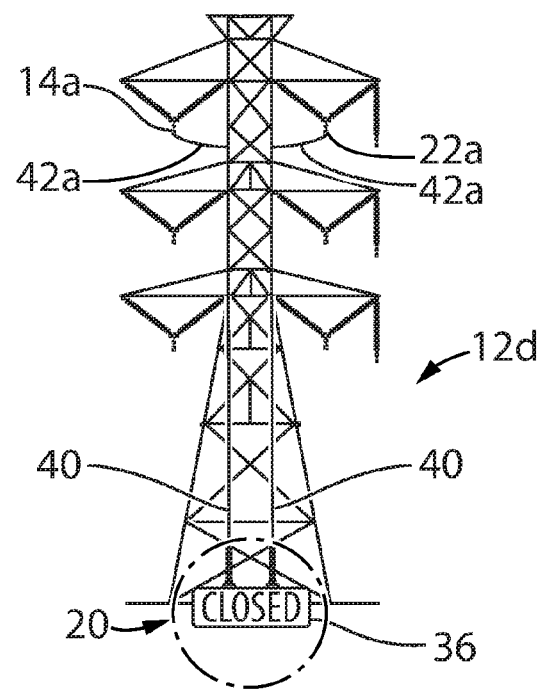
FIG. 12C is a sectional view in FIG. 12 at the position of the sectional view of FIG. 10C at FIG. 10.

As seen in FIGS. 12 and 12C, first temporary circuit breaker 36 on tower 12d is closed thereby energizing the top temporary phase 22a via bus 40 and jumpers 42a between vertical support 16a and tower 12g at the potential of top phase 14a', that is, the East phase potential.

Figure 13:
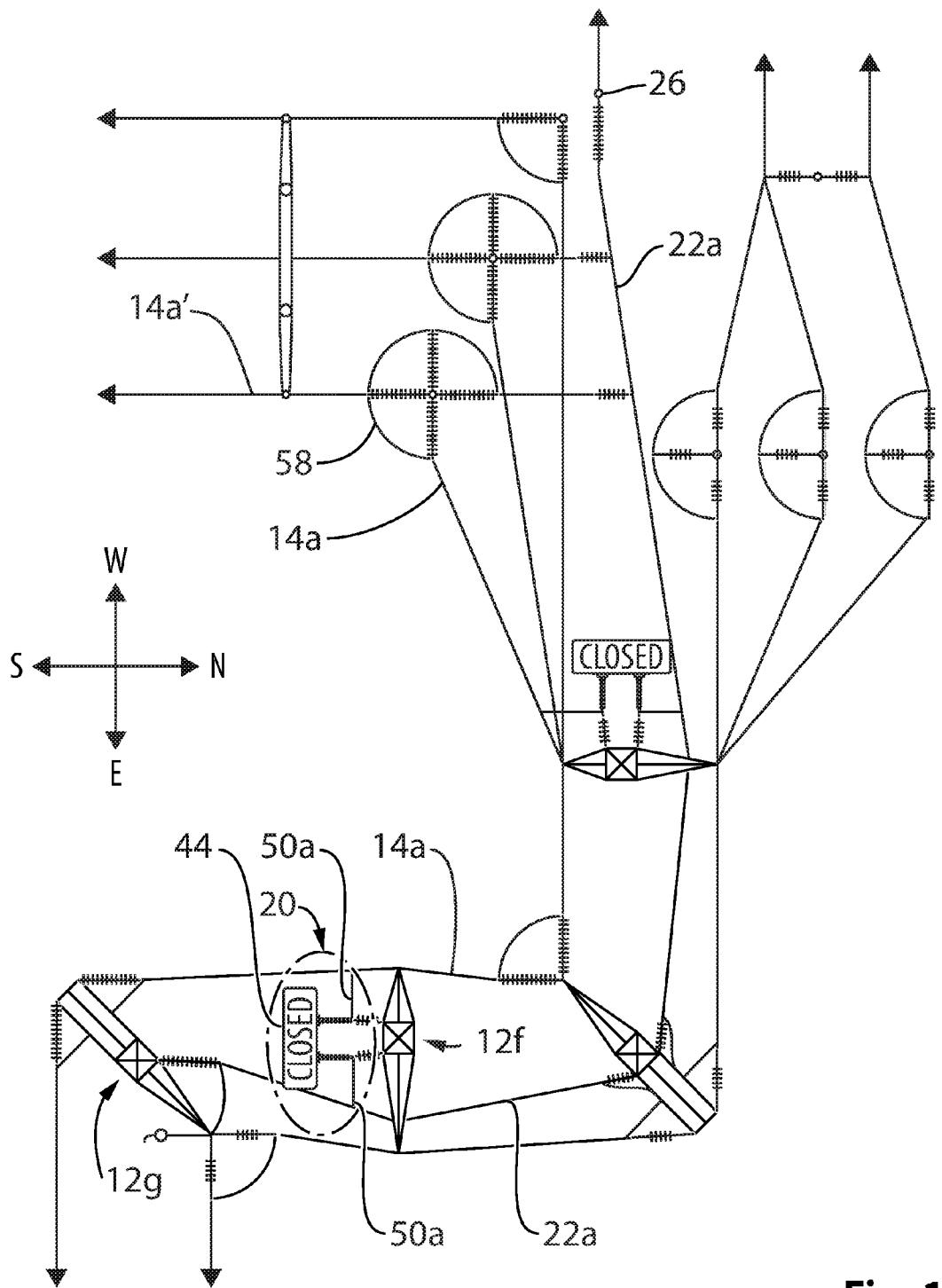
FIG. 13 is the view of FIG. 12 showing the closing of the second or further temporary breaker.

As seen in FIGS. 13 and 13B, the second temporary circuit breaker 44 is then closed thereby paralleling the top temporary phase of 22a between tower 12g and temporary vertical dead-end 26 and top phase 14a, that is, the East phase 14a'.

Figure 14:
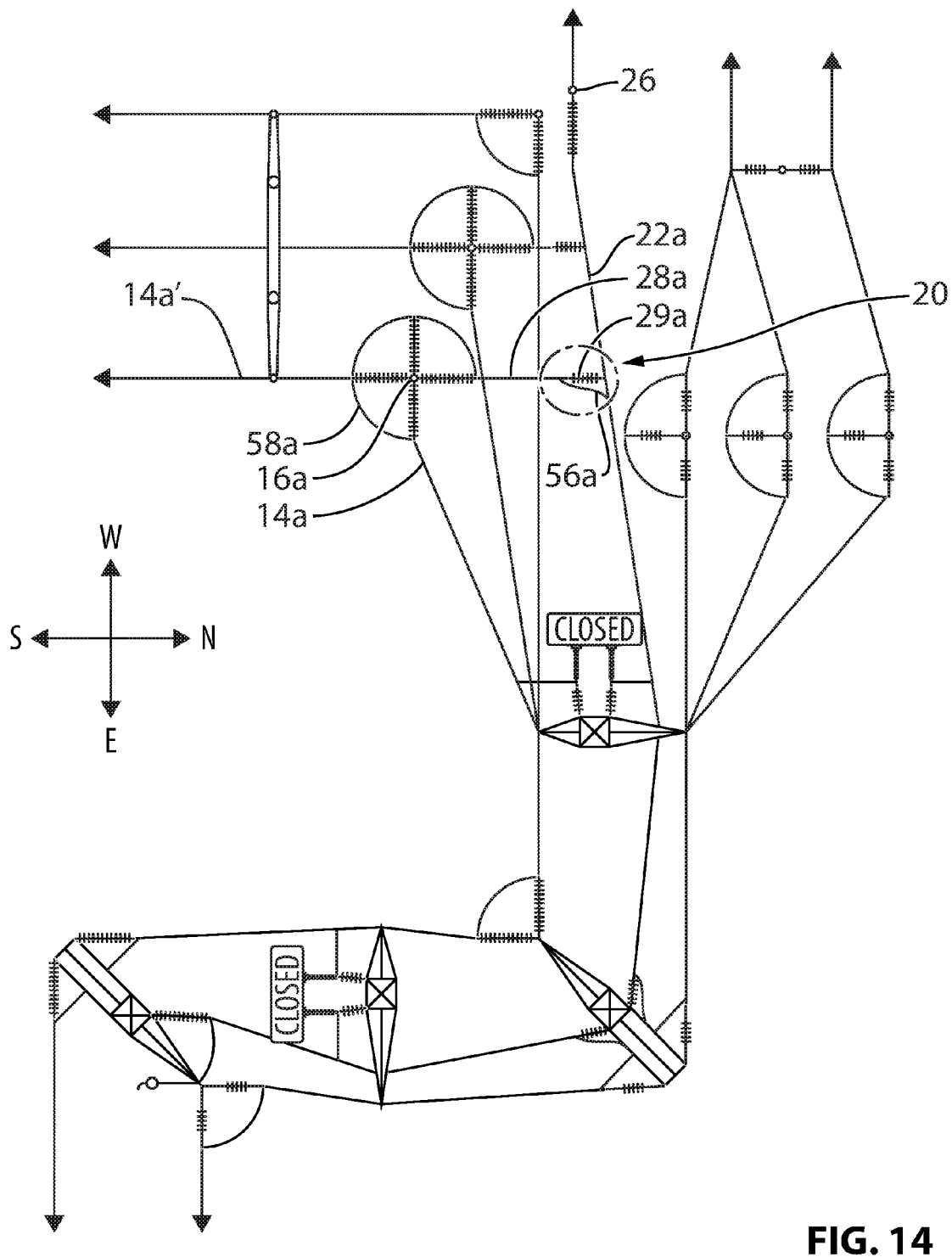
FIG. 14 is the view of FIG. 13 showing the installation of a further jumper.
Figure 14A:
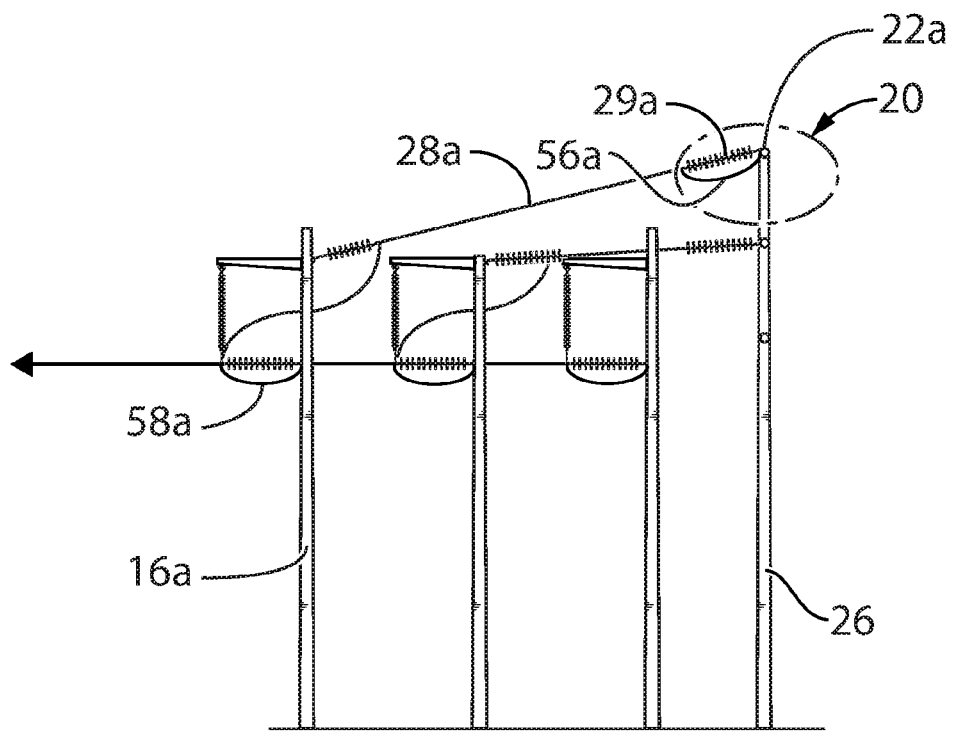
FIG. 14A is a sectional view in FIG. 14 at the location of the sectional view of FIG. 13A in FIG. 13.
Figure 14B:
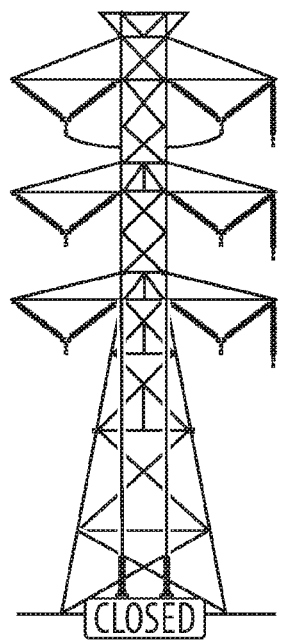
FIG. 14B is a sectional view in FIG. 14 at the position of the sectional view of FIG. 13B in FIG. 13.
Figure 14C:
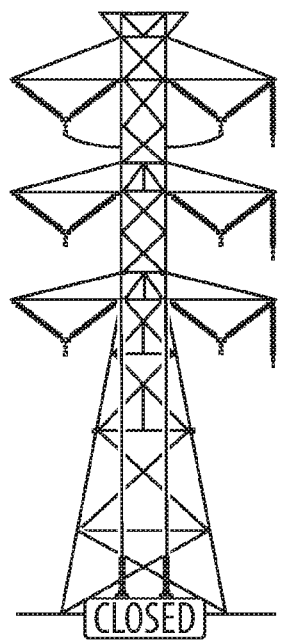
FIG. 14C is a sectional view in FIG. 14 at the position of the sectional view of FIG. 13C in FIG. 13.

As seen in FIGS. 14 and 14A, a jumper 56a is next installed across insulator 29a on temporary jumper 28a to thereby parallel the top phase 14a (East phase 14a') and top temporary phase 22a around vertical support 16a.

Figure 15:
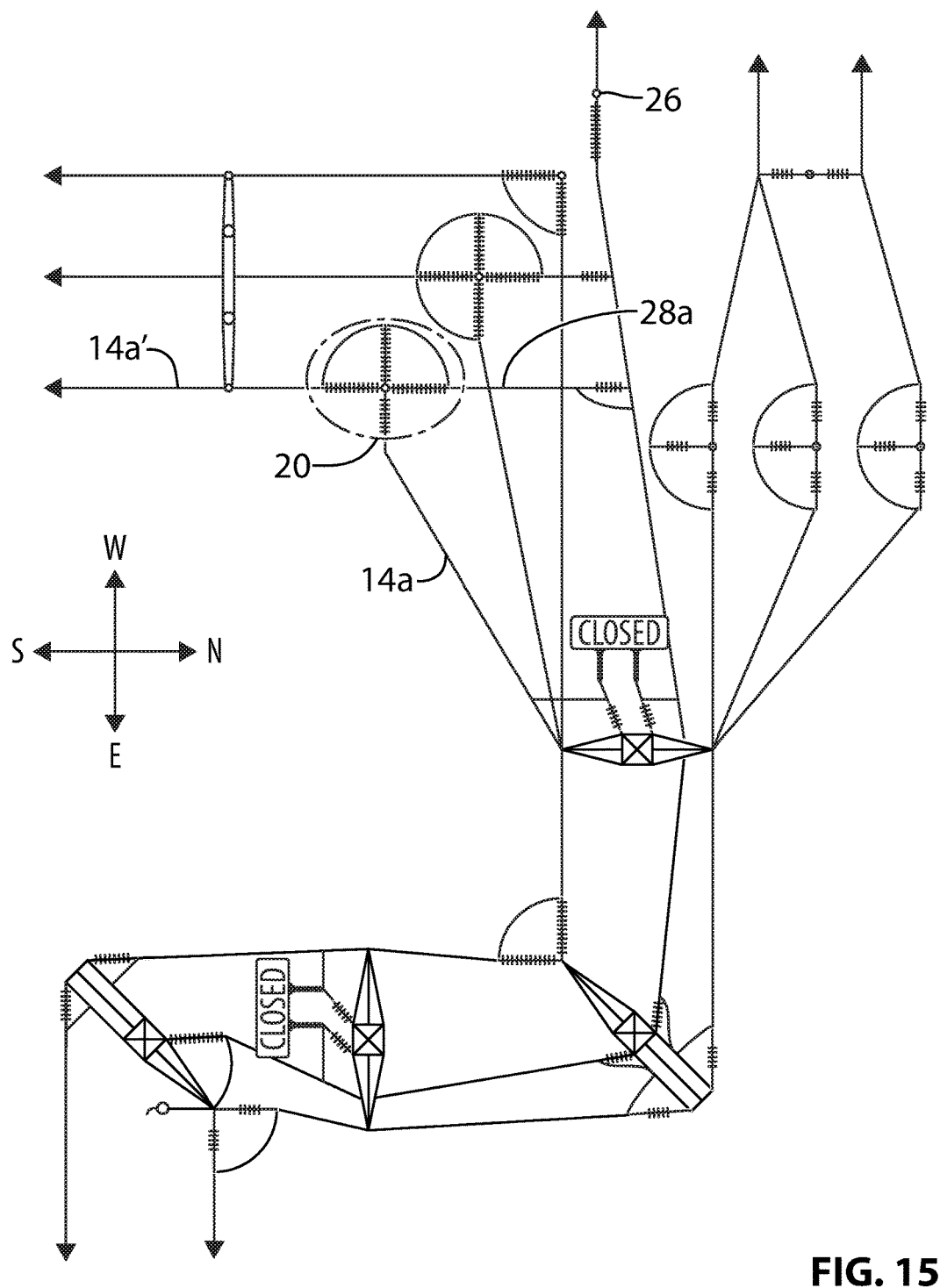
FIG. 15 is the view of FIG. 14 showing the removal of a permanent jumper.

As seen in FIGS. 15 and 15A, the parallel around vertical support 16a is broken by the removal of permanent jumper 58a, seen for example installed in FIG. 14 and FIG. 14A, from between East phase 14a' and top phase 14a.

Figure 16:
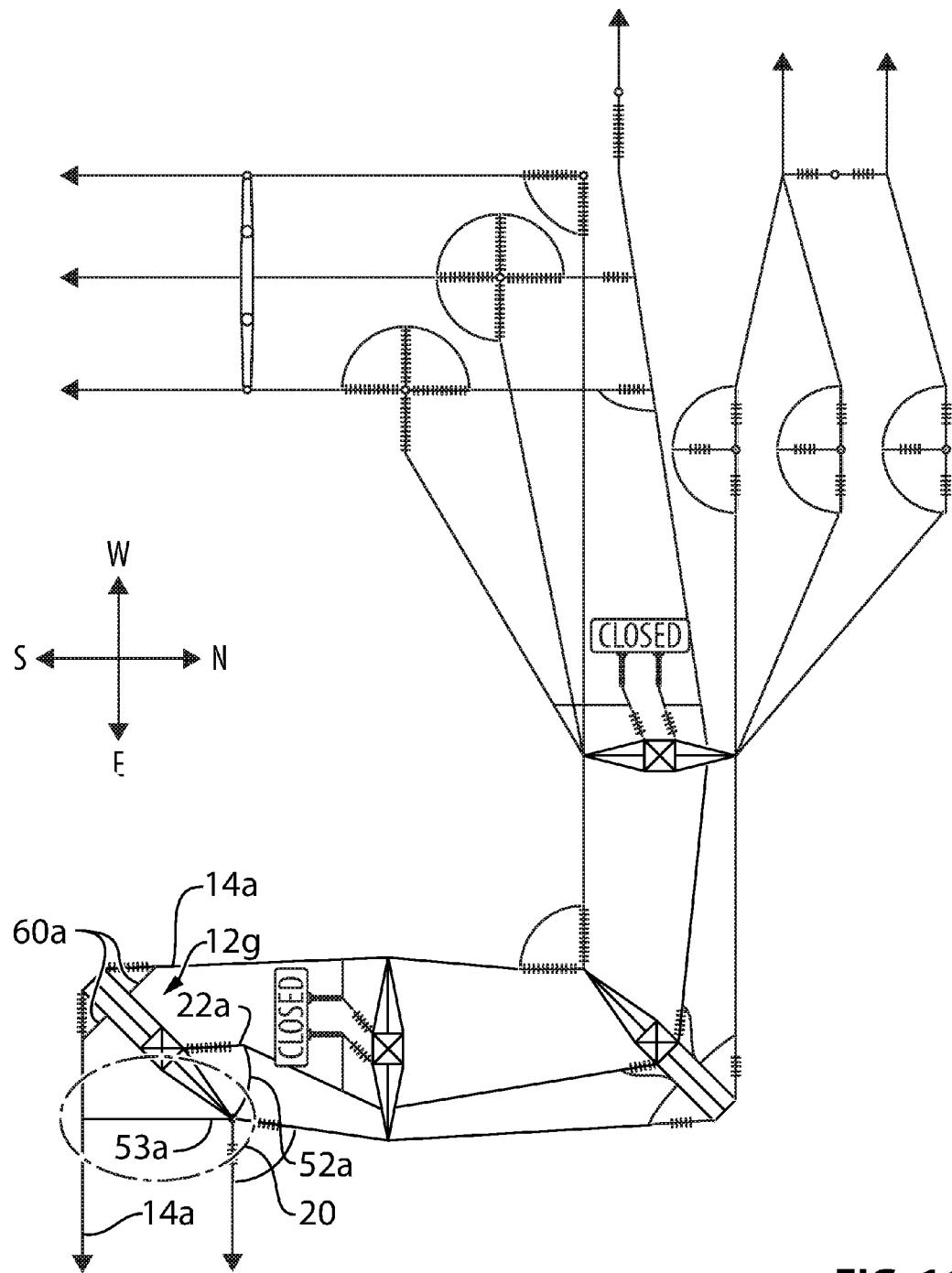
FIG. 16 is the view of FIG. 15 showing the installation of a further jumper.

As seen in FIG. 16, temporary jumper 52a, which was installed in the step illustrated in FIG. 11, is extended so that the extra length 53a of jumper 52a is extended to the section of top phase 14a heading east from tower 12g. This completes a paralleling of top phase 14a around the dead-end at tower 12g.

Figure 17:
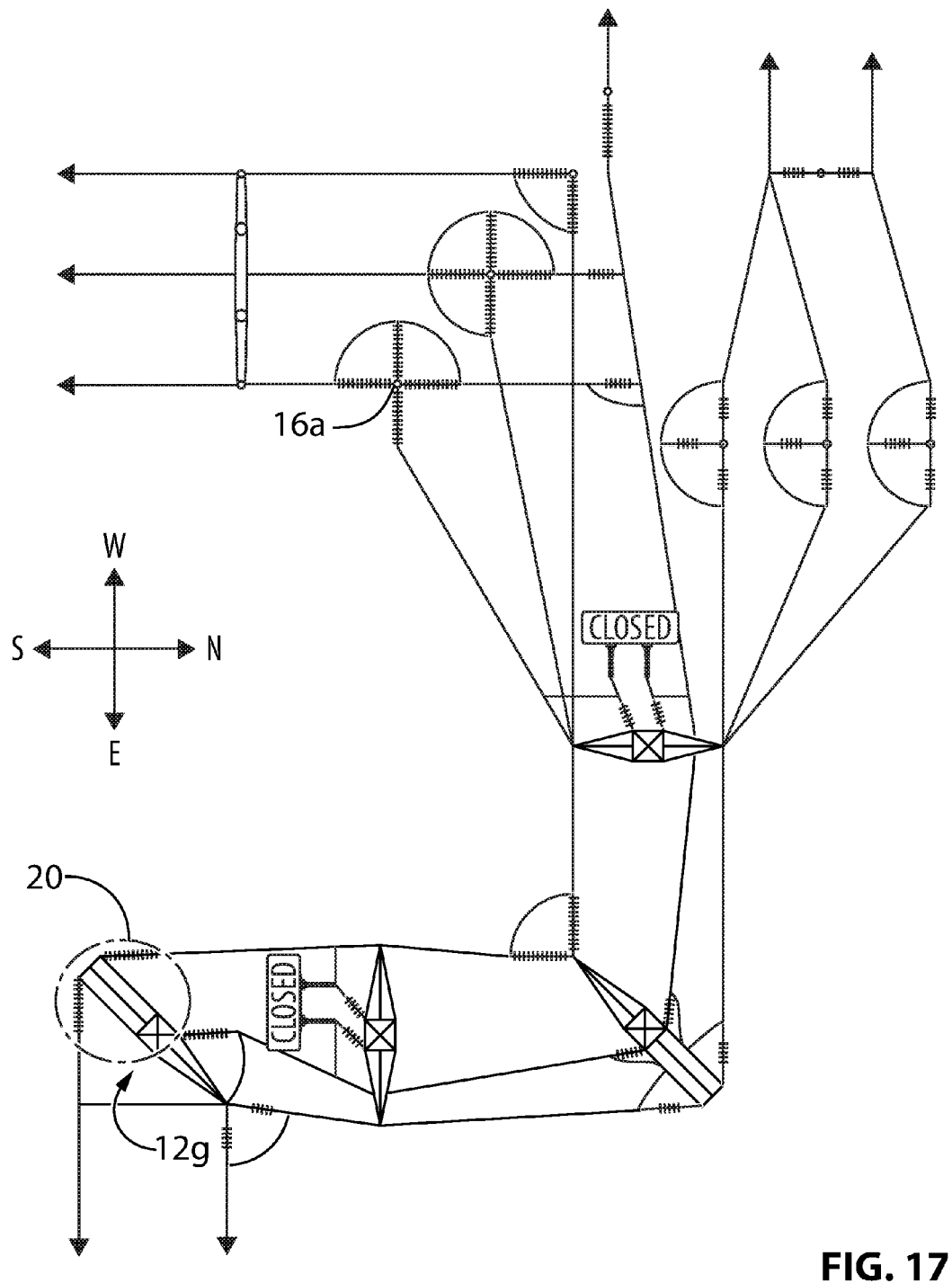
FIG. 17 is the view of FIG. 16 showing the removal of a permanent jumper.

As seen in FIGS. 17 and 17A, the permanent jumper 60a as seen for example in FIG. 16, is removed from between the sections of top phase 14a which are oriented substantially North and East on either side of tower 12g thereby breaking the parallel around the dead-end at tower 60a.

Figure 18:
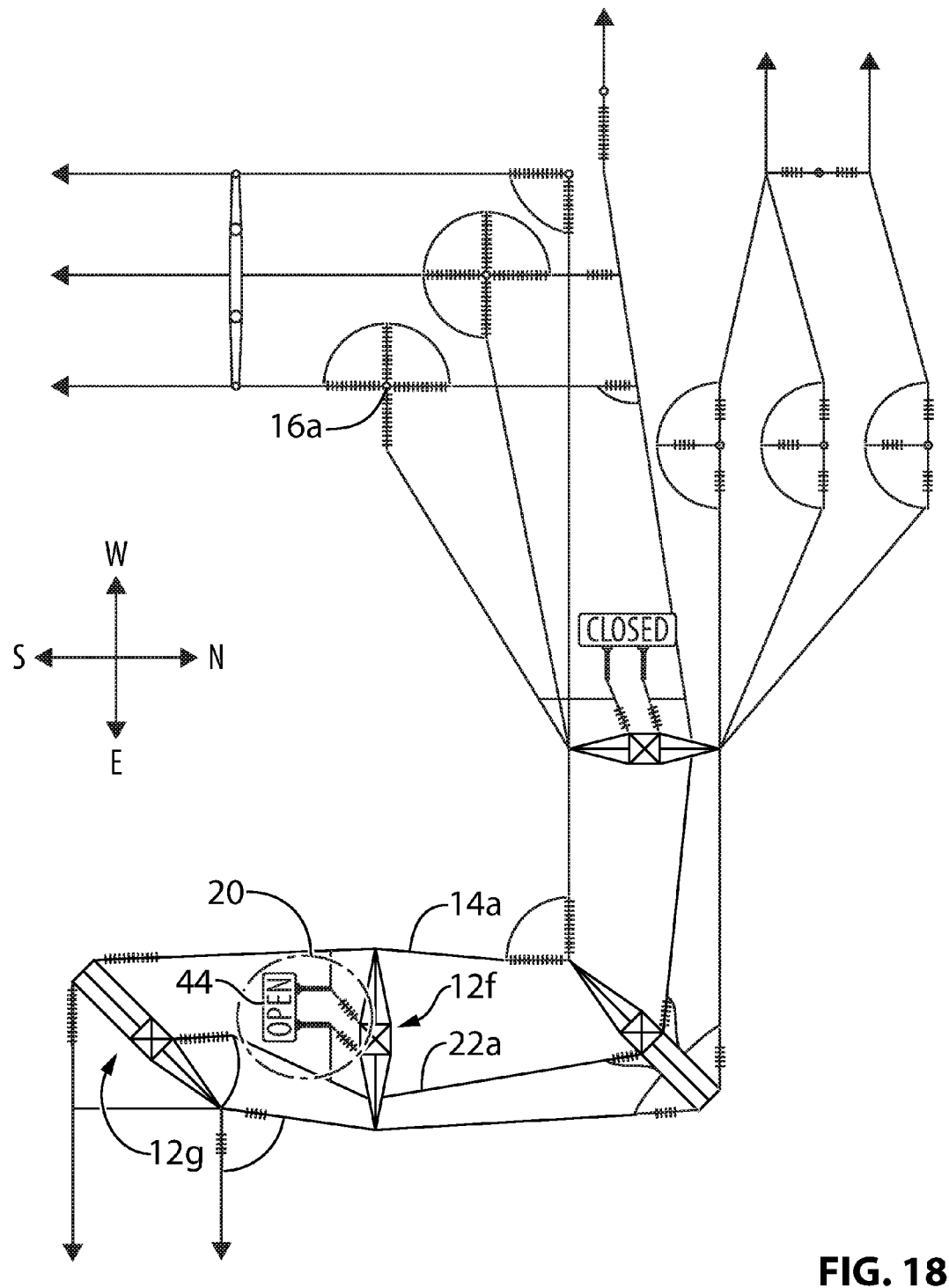
FIG. 18 is the view of FIG. 17 showing the opening of the second breaker.

As seen in FIGS. 18 and 18B, the second temporary breaker 44 is then opened so as to break parallel of top phase 14a and temporary phase 22a, between tower 12g and vertical support 16a.

Figure 19:
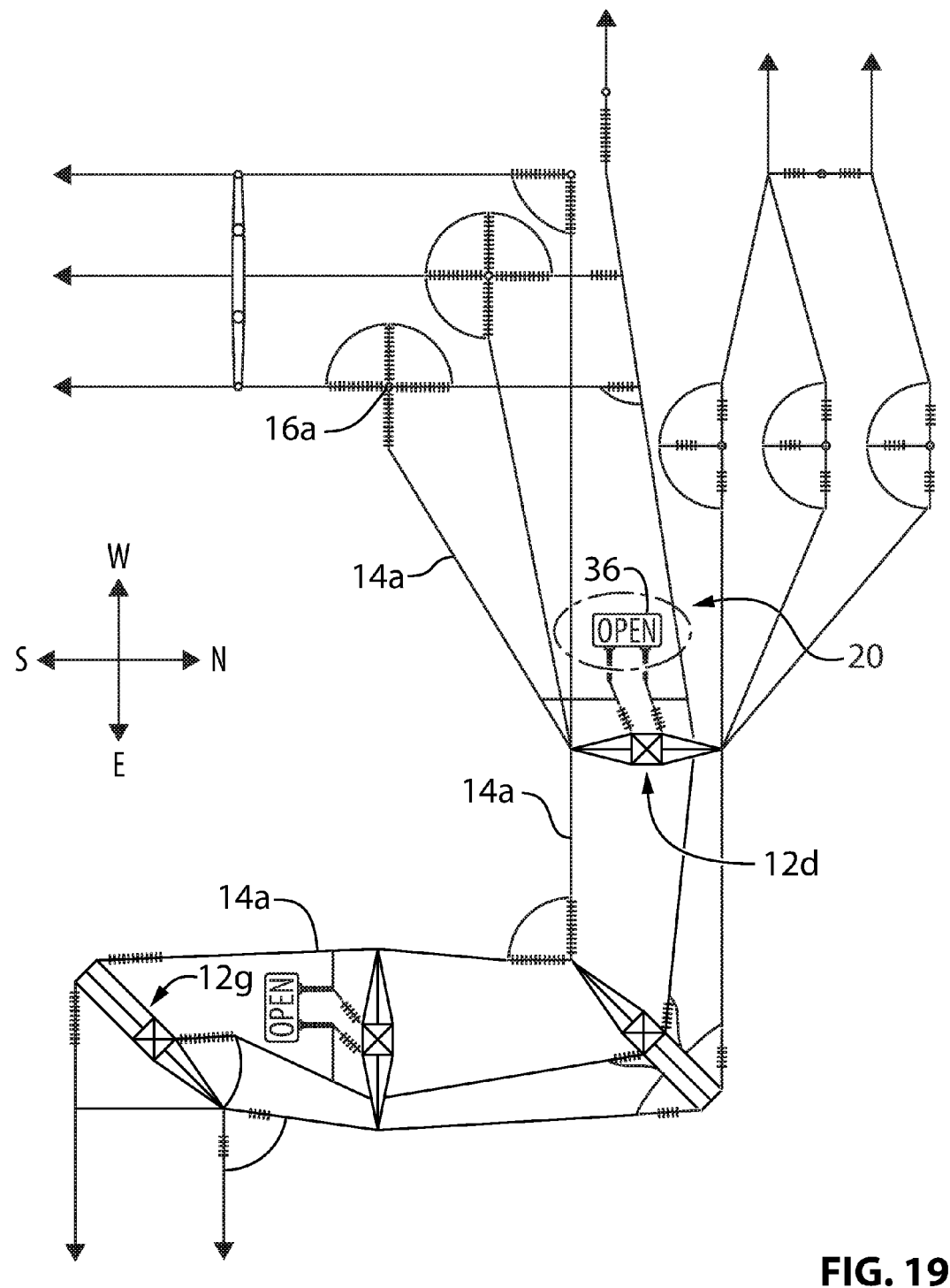
FIG. 19 is the view of FIG. 18 showing the opening of the first breaker.

As seen FIGS. 19 and 19B, the first temporary breaker 36 is next opened thereby de-energizing top phase 14a between tower 12g and vertical support 16a.

Figure 20:
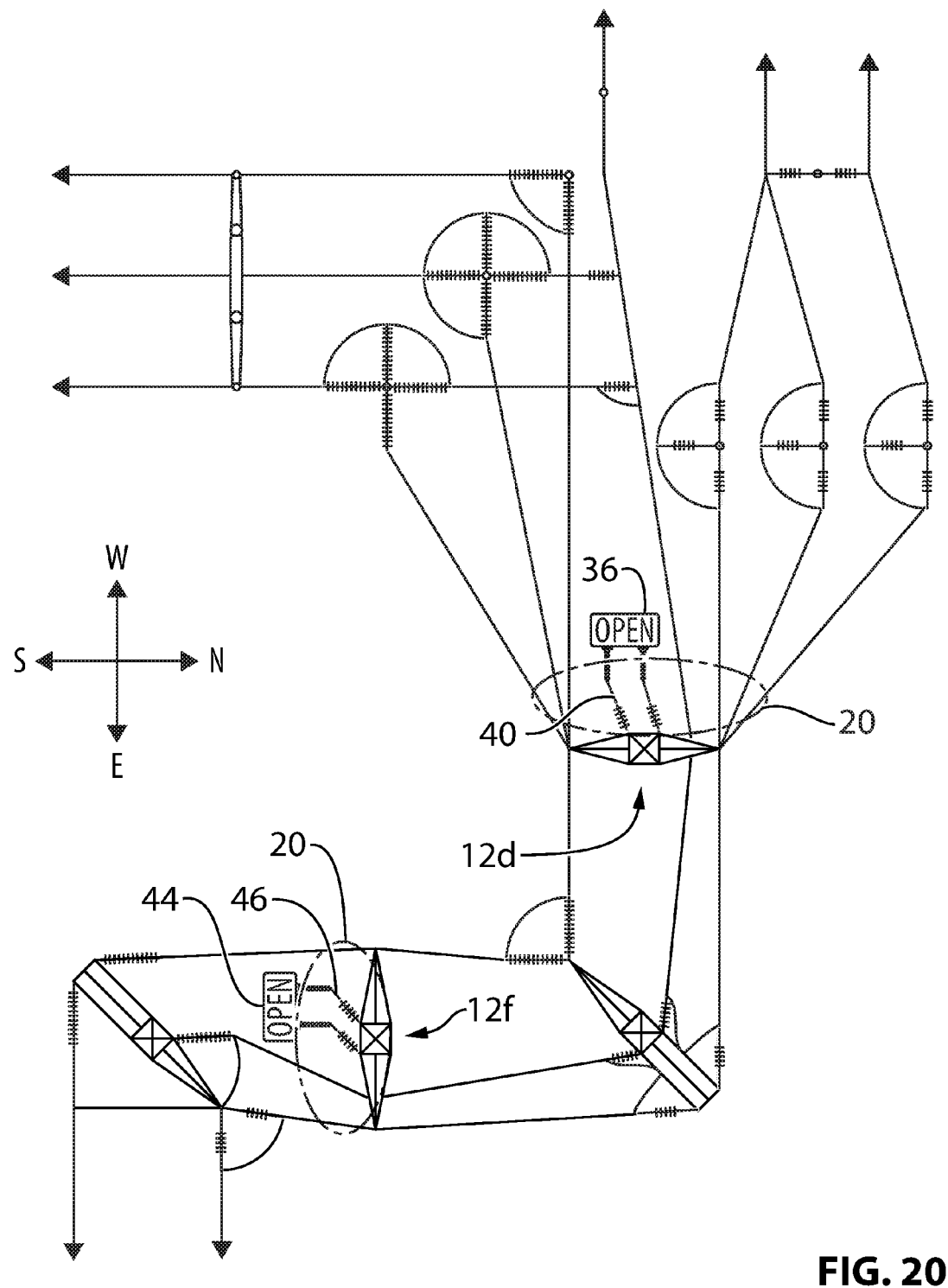
FIG. 20 is the view of FIG. 19 showing the removal of jumpers.
Figure 21:
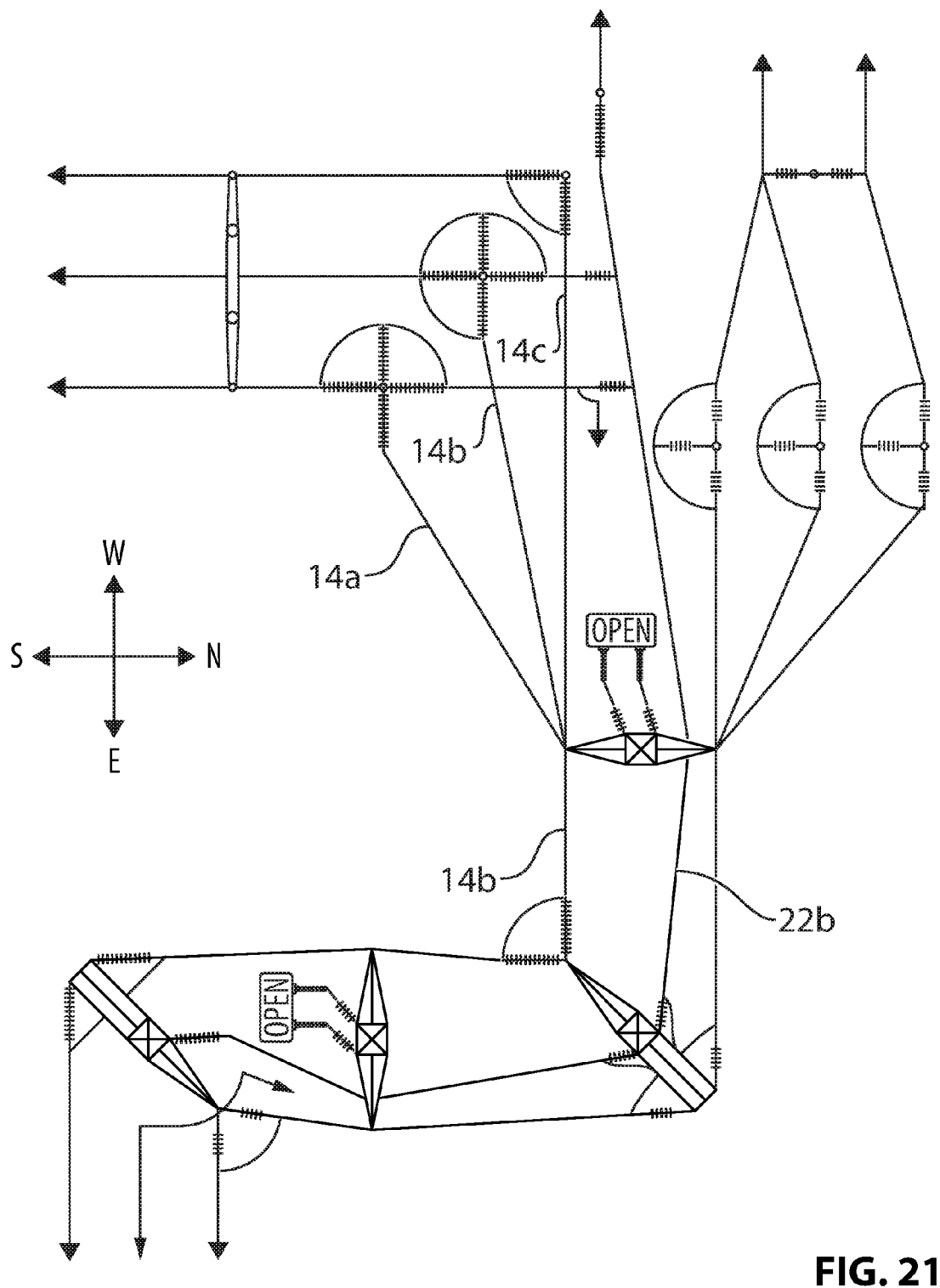
FIG. 21 is the view of FIG. 20 showing the layout of the center phase and center temporary phase.
Figure 22:
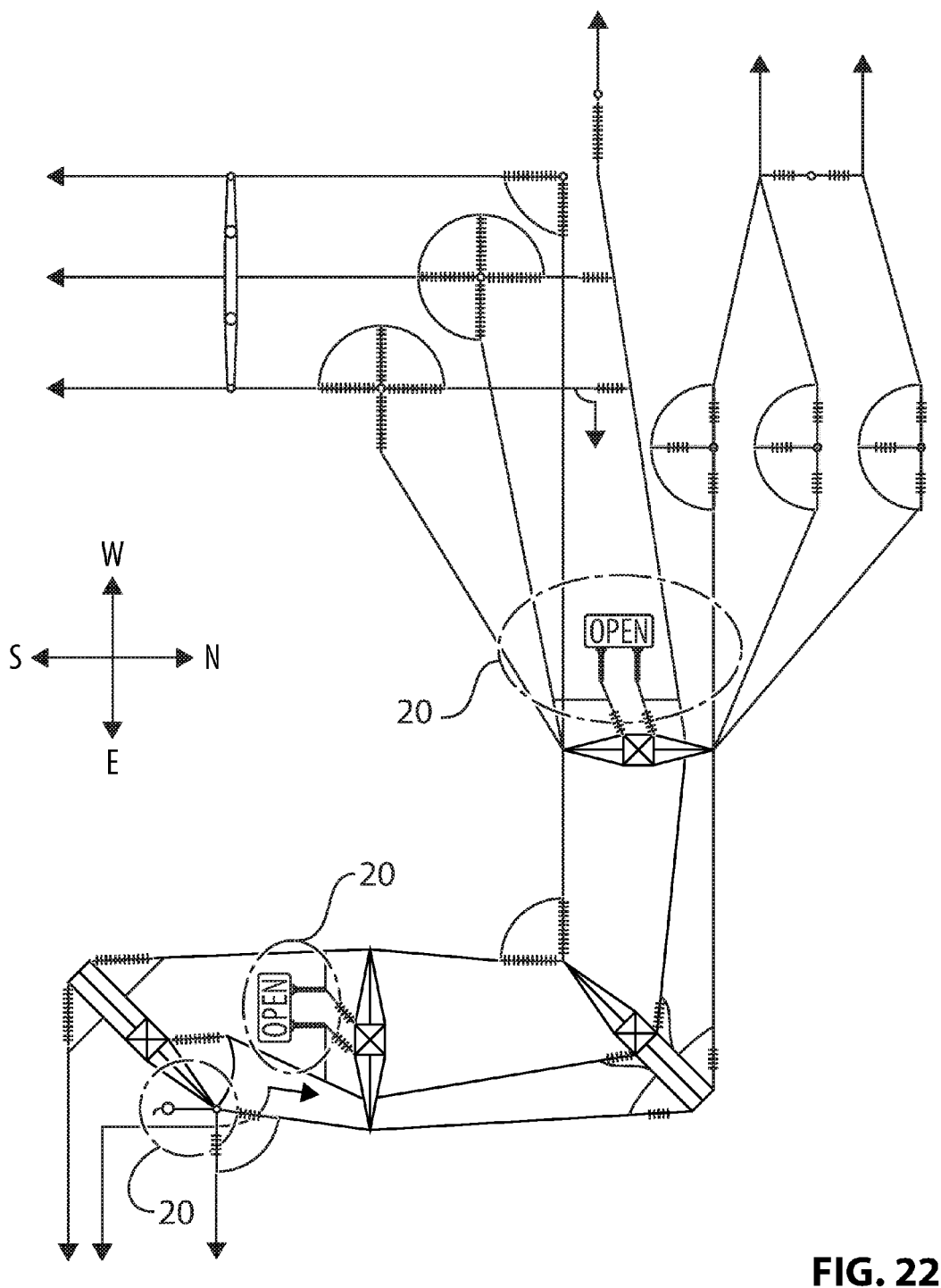
FIG. 22 is the view of FIG. 21 showing the installation of four jumpers and the installation of a temporary jumper to a suspension insulator.
Figure 23:
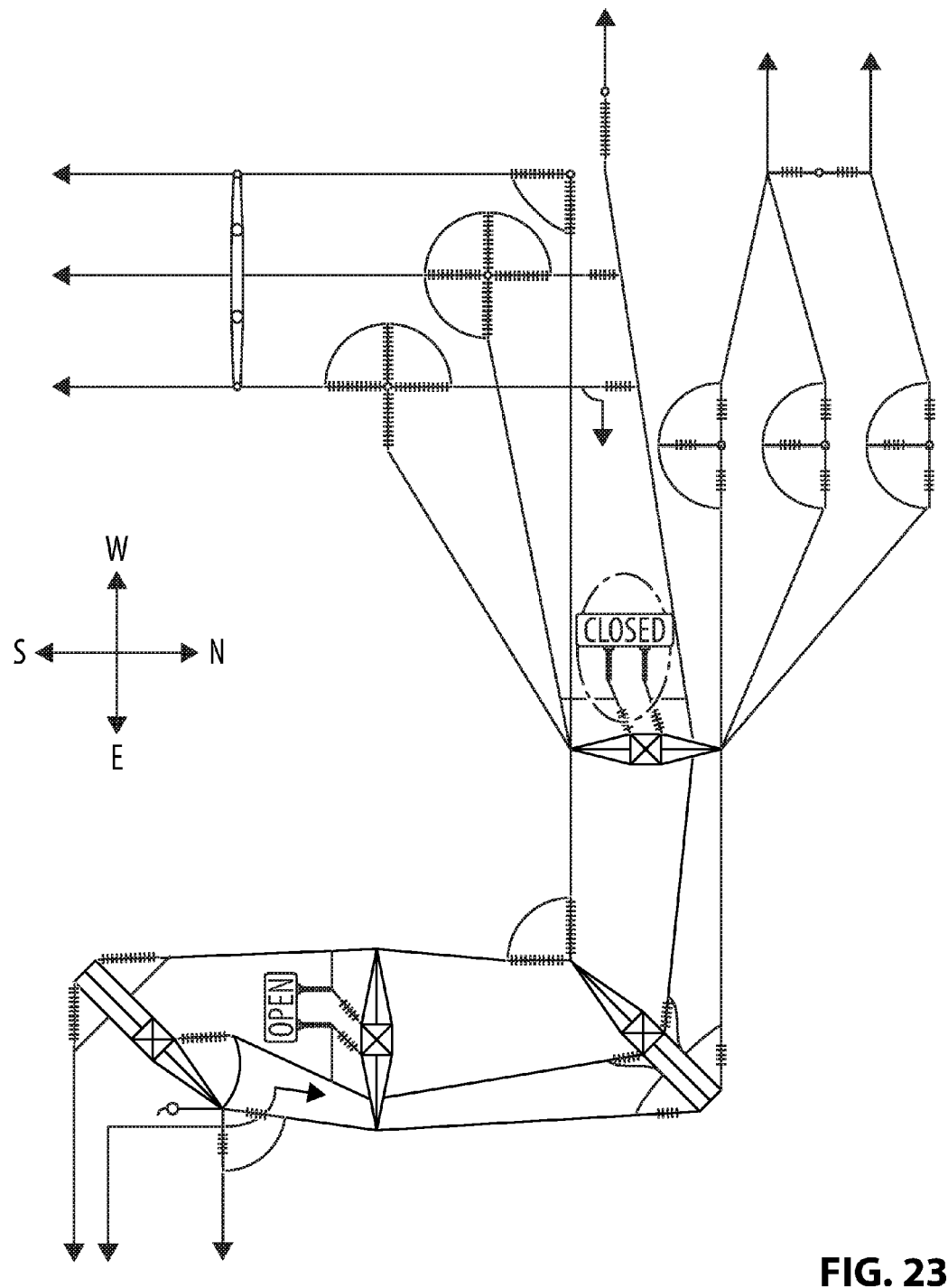
FIG. 23 is the view of FIG. 22 showing the first temporary breaker closed.
Figure 24:
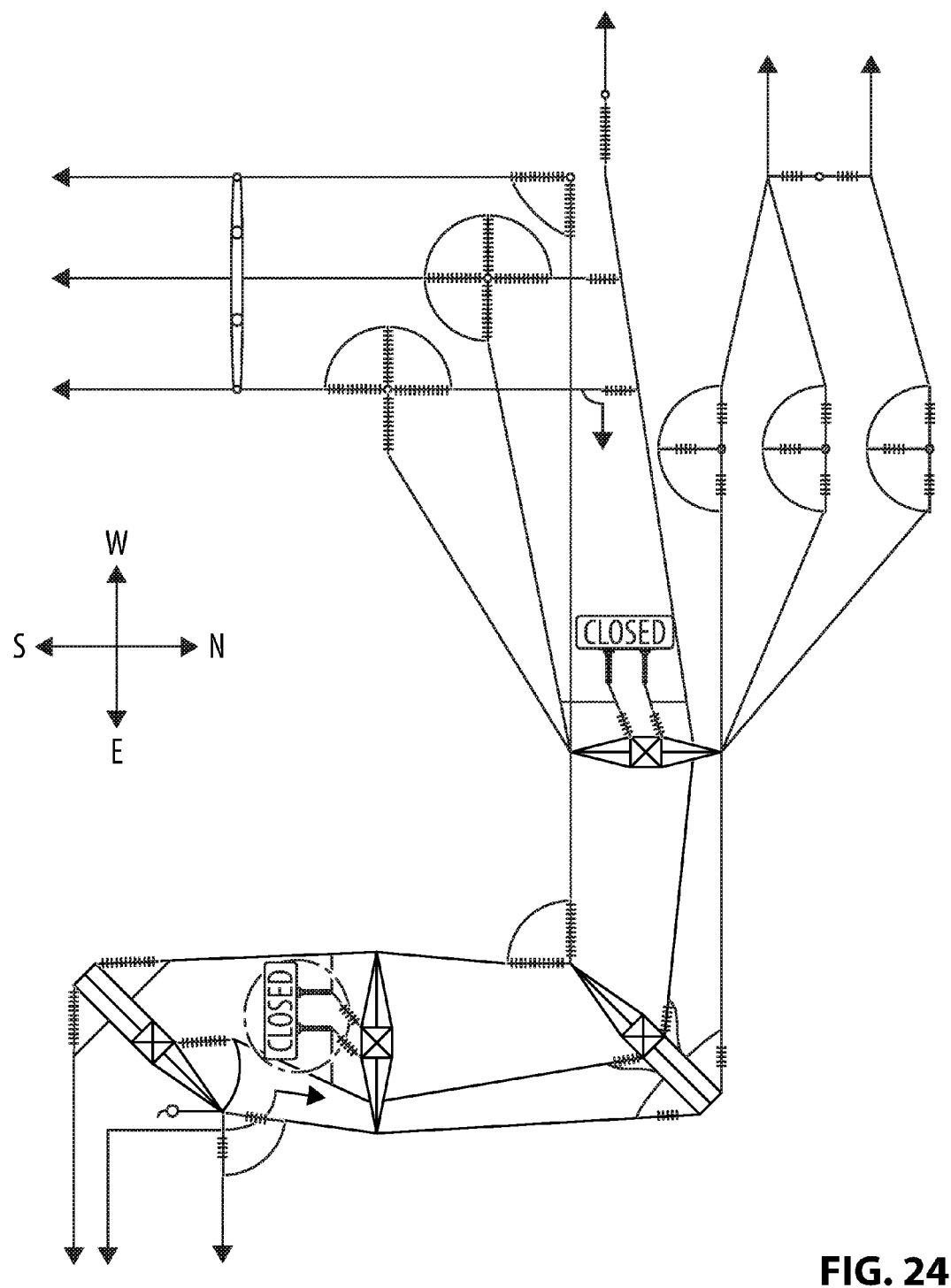
FIG. 24 is the view of FIG. 23 showing the second or further temporary breaker closed.
Figure 25:
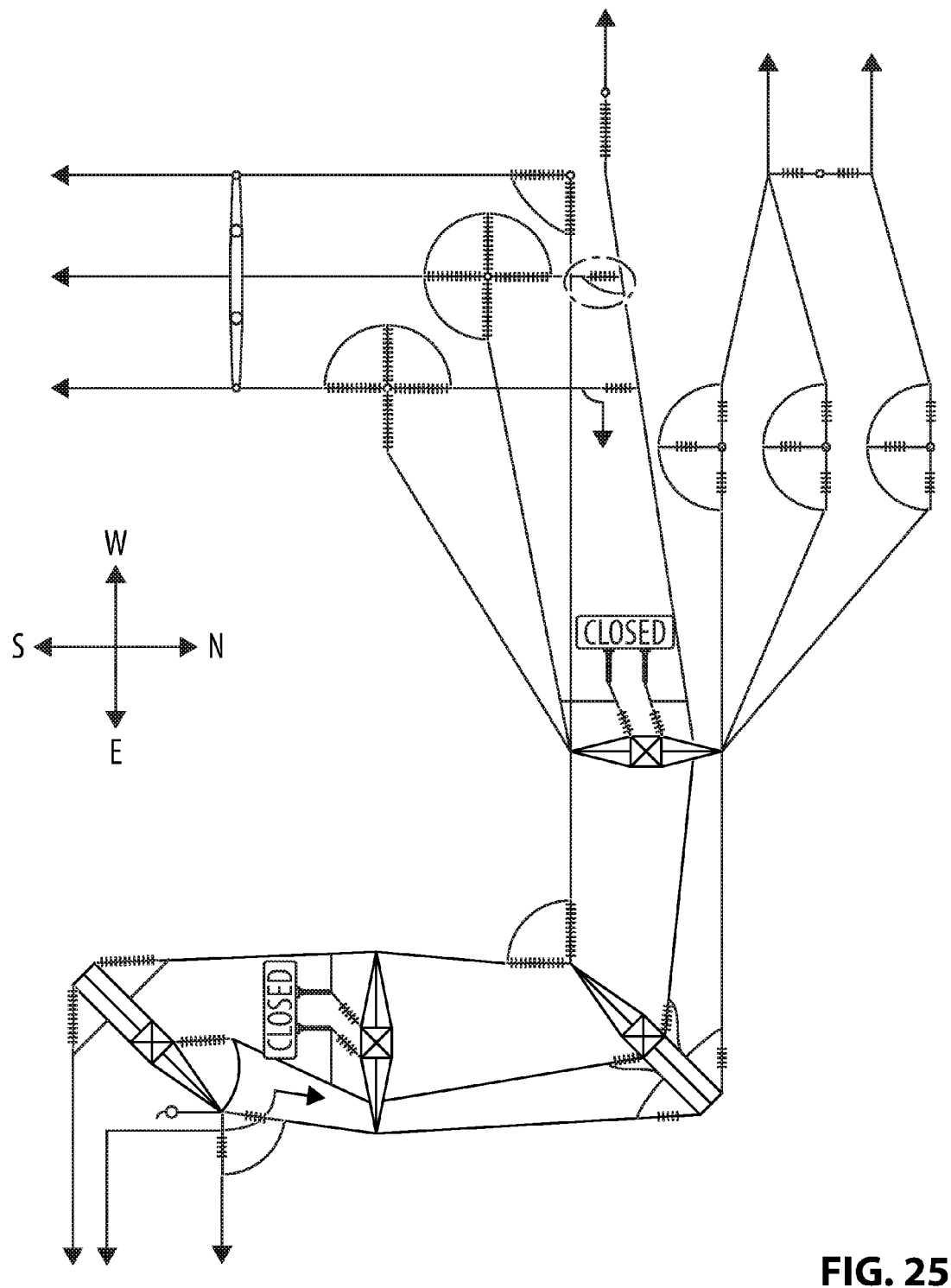
FIG. 25 is the view of FIG. 24 showing the installation of a further jumper.
Figure 26:
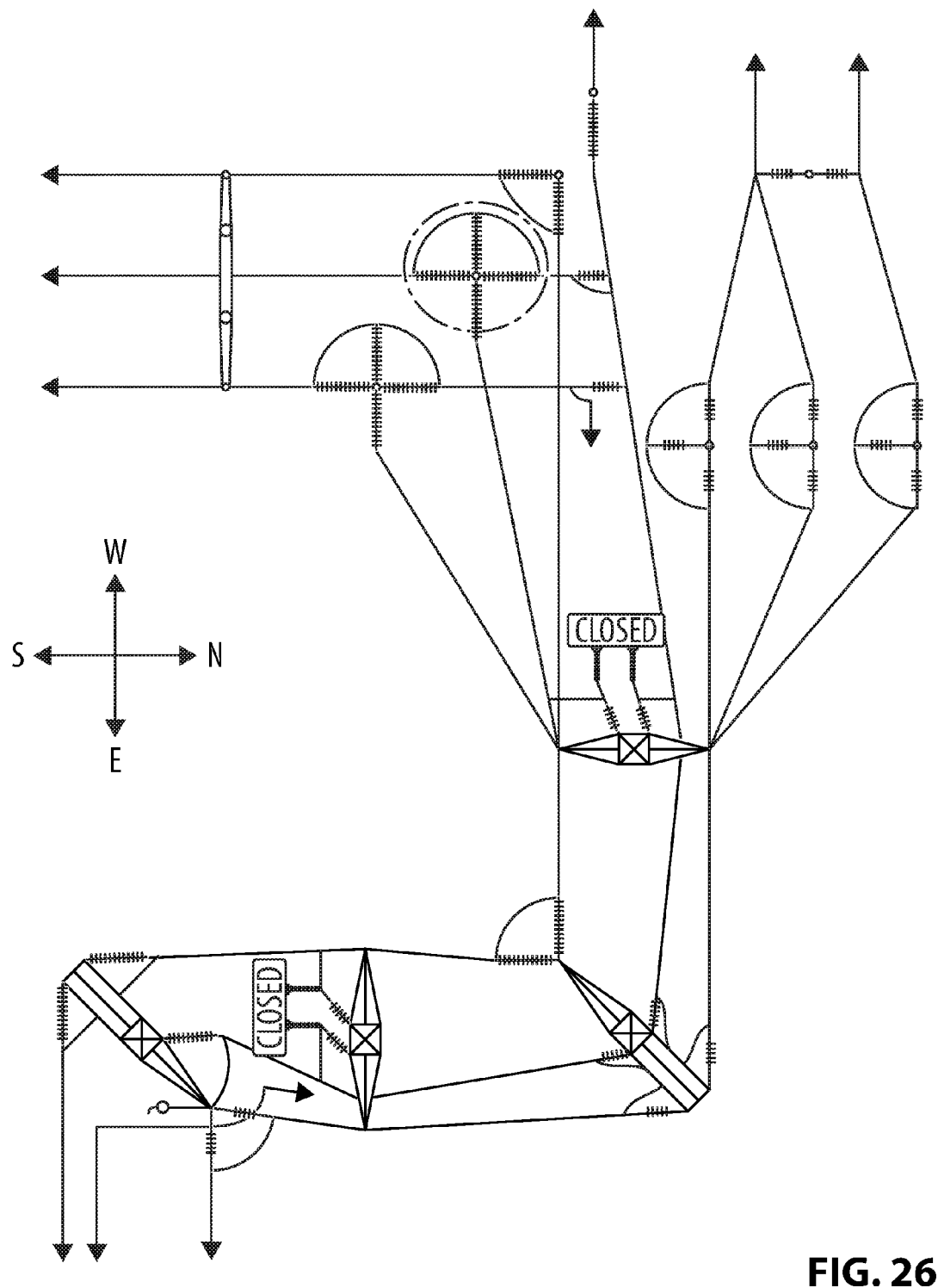
FIG. 26 is the view of FIG. 25 showing the removal of a permanent jumper.
Figure 27:
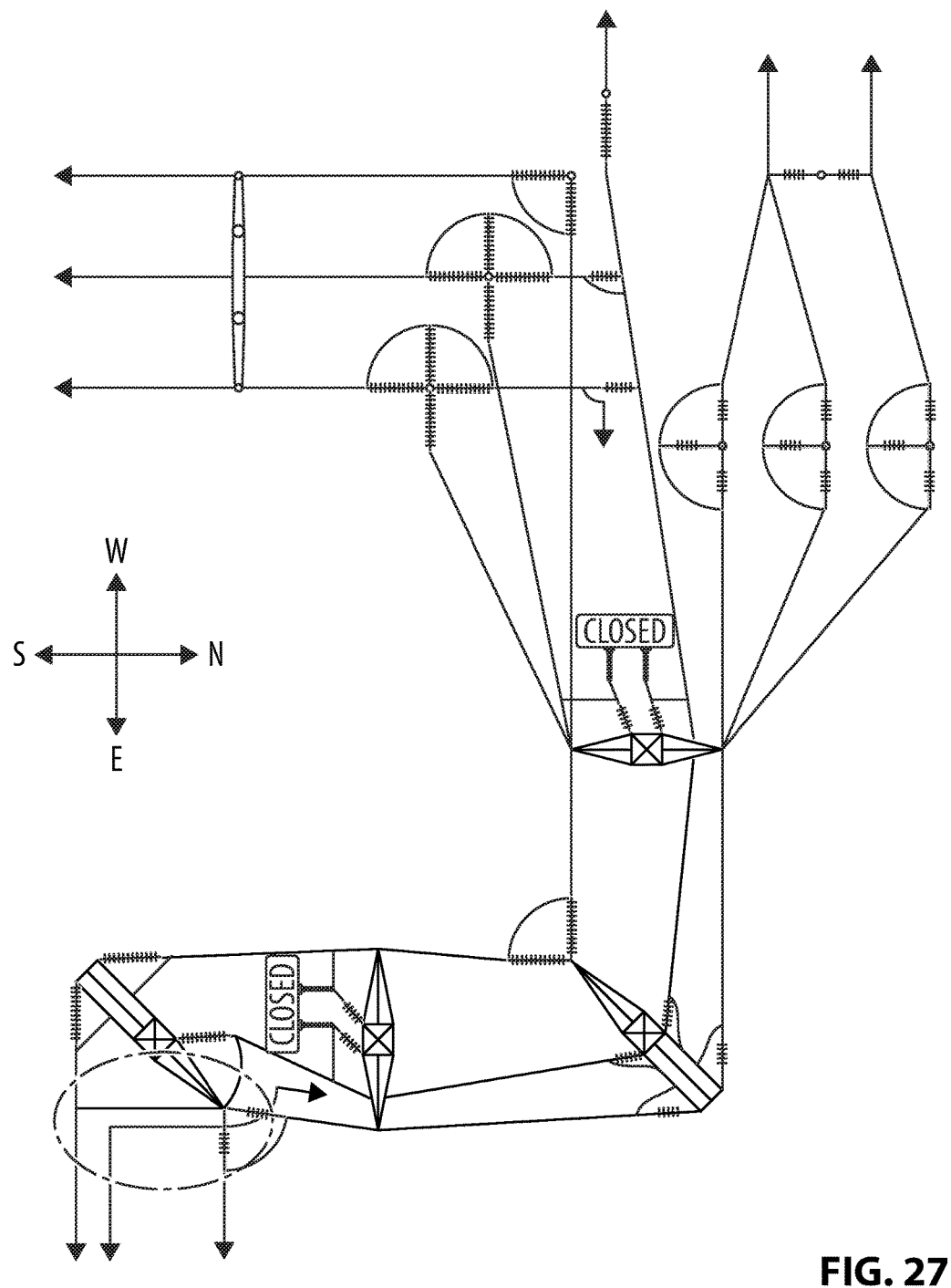
FIG. 27 is the view of FIG. 26 showing the installation of a further jumper.
Figure 28:
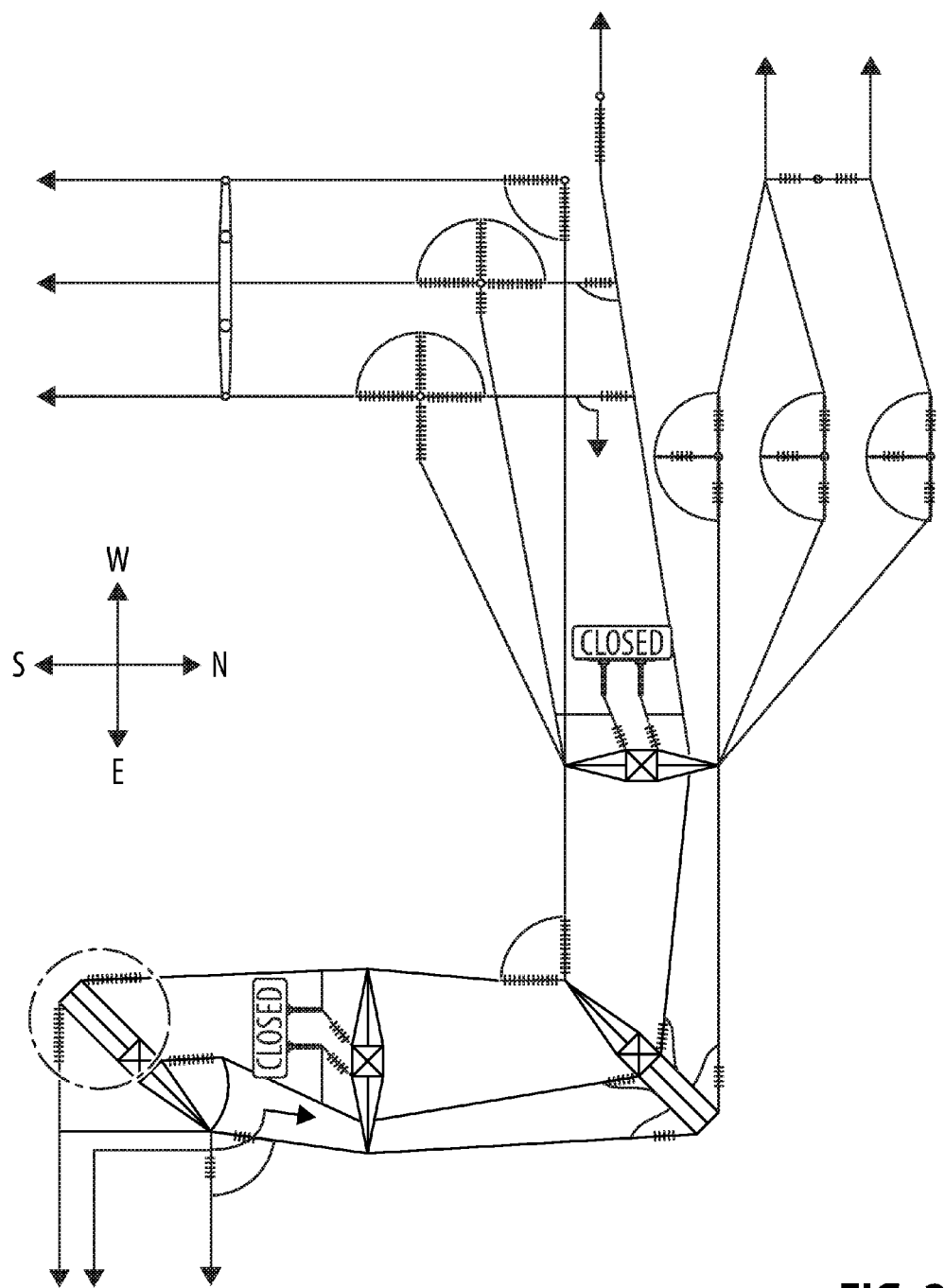
FIG. 28 is the view of FIG. 27 showing the removal of a permanent jumper.
Figure 29:
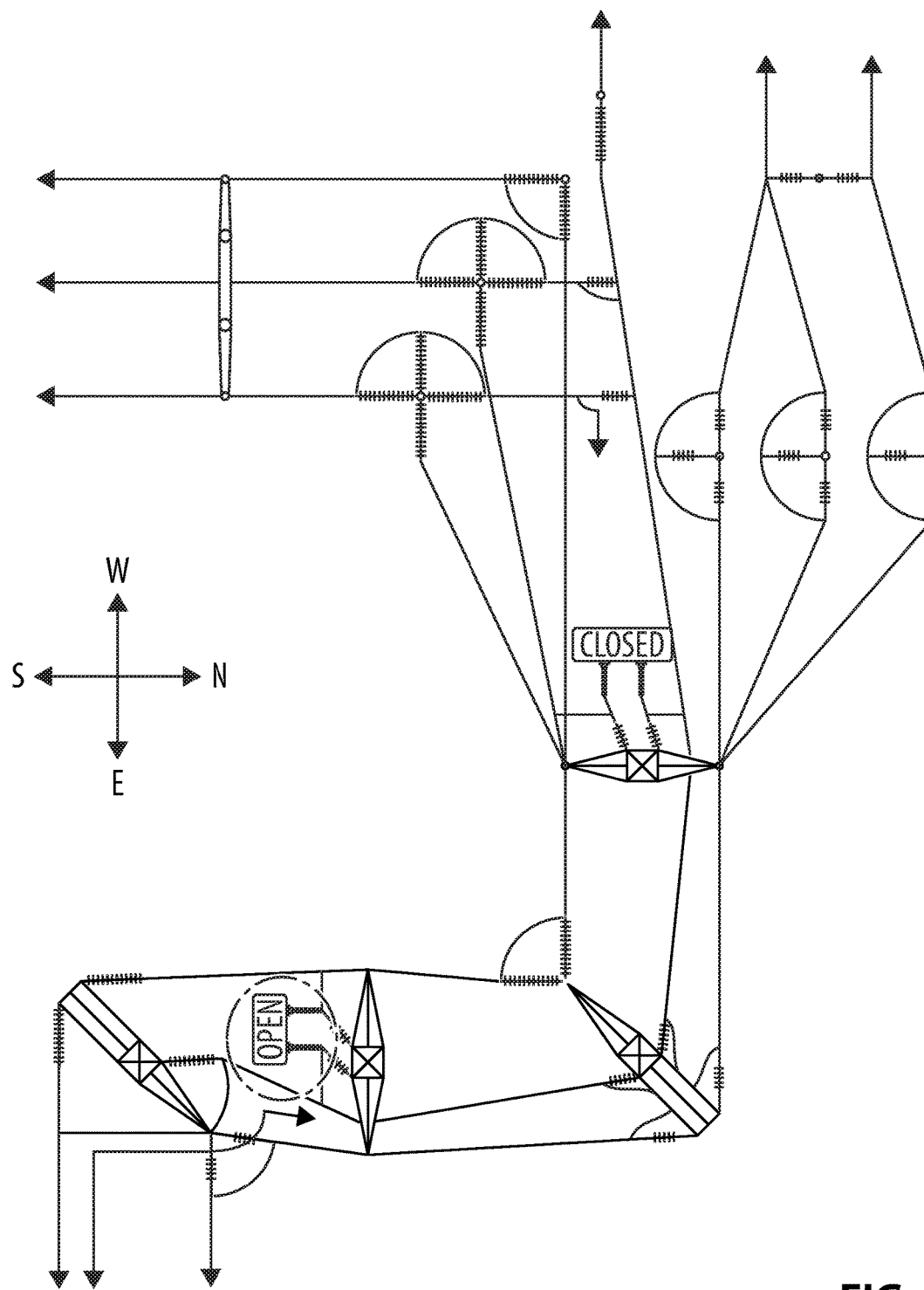
FIG. 29 is the view of FIG. 28 showing the opening of the second breaker.
Figure 30:
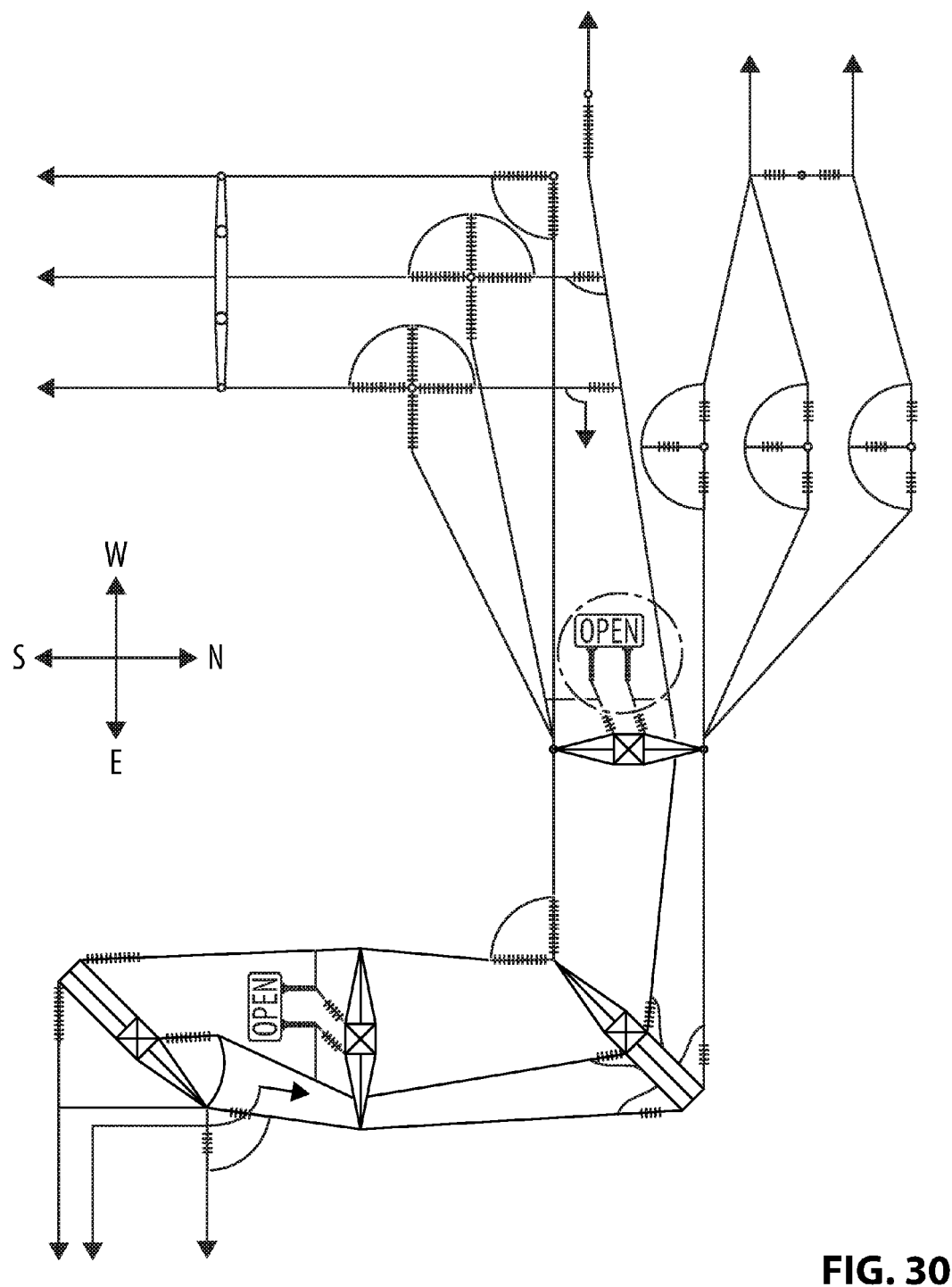
FIG. 30 is the view of FIG. 29 showing the opening of the first breaker.
Figure 30A:
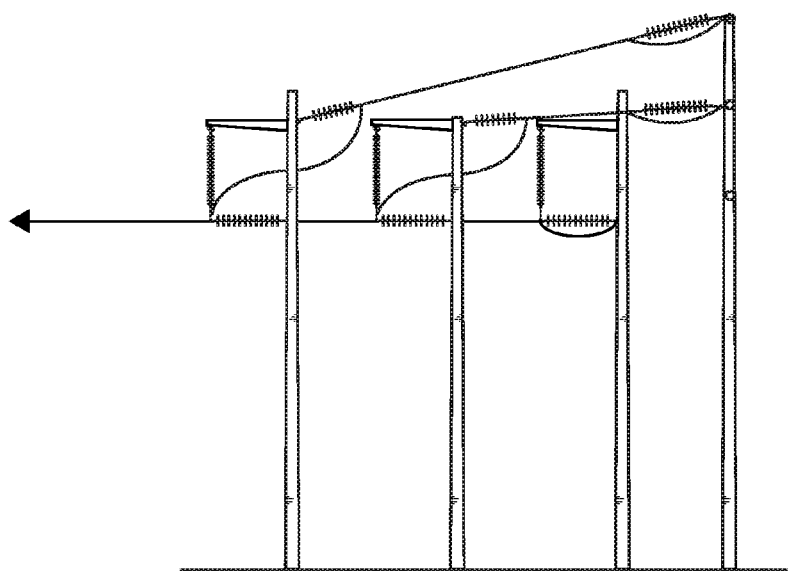
FIG. 30A is a sectional view in FIG. 30 at the position of the sectional view of FIG. 29A in FIG. 29.
Figure 30B:
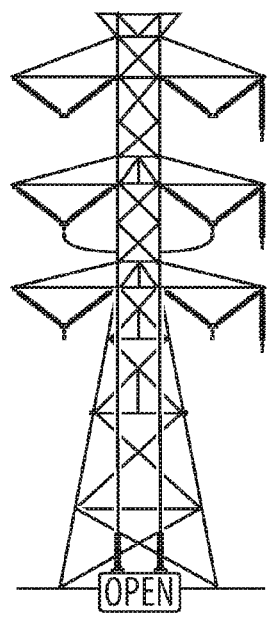
FIG. 30B is a sectional view in FIG. 30 at the position of the sectional view of FIG. 29B in FIG. 29.
Figure 30C:
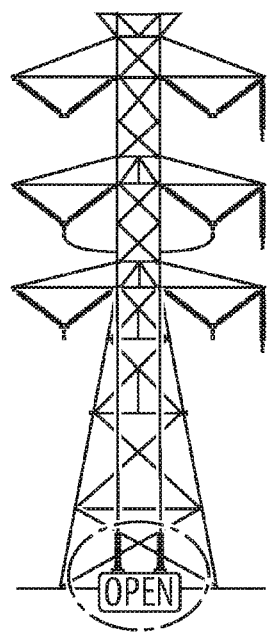
FIG. 30C is a sectional view in FIG. 30 at the position of the sectional view of FIG. 29C in FIG. 29.
Figure 31:
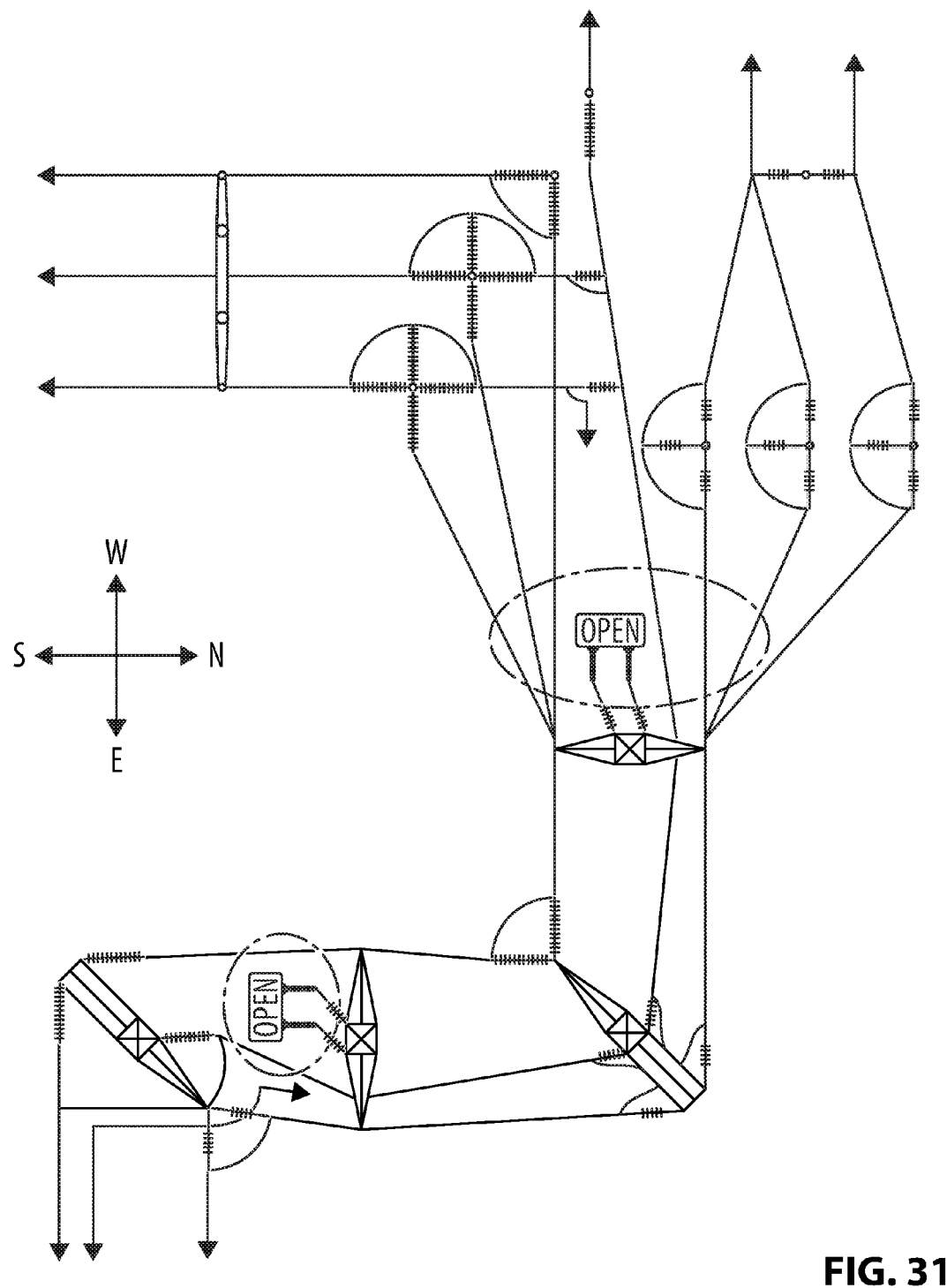
FIG. 31 is the view of FIG. 30 showing the removal of jumpers.
Figure 32:
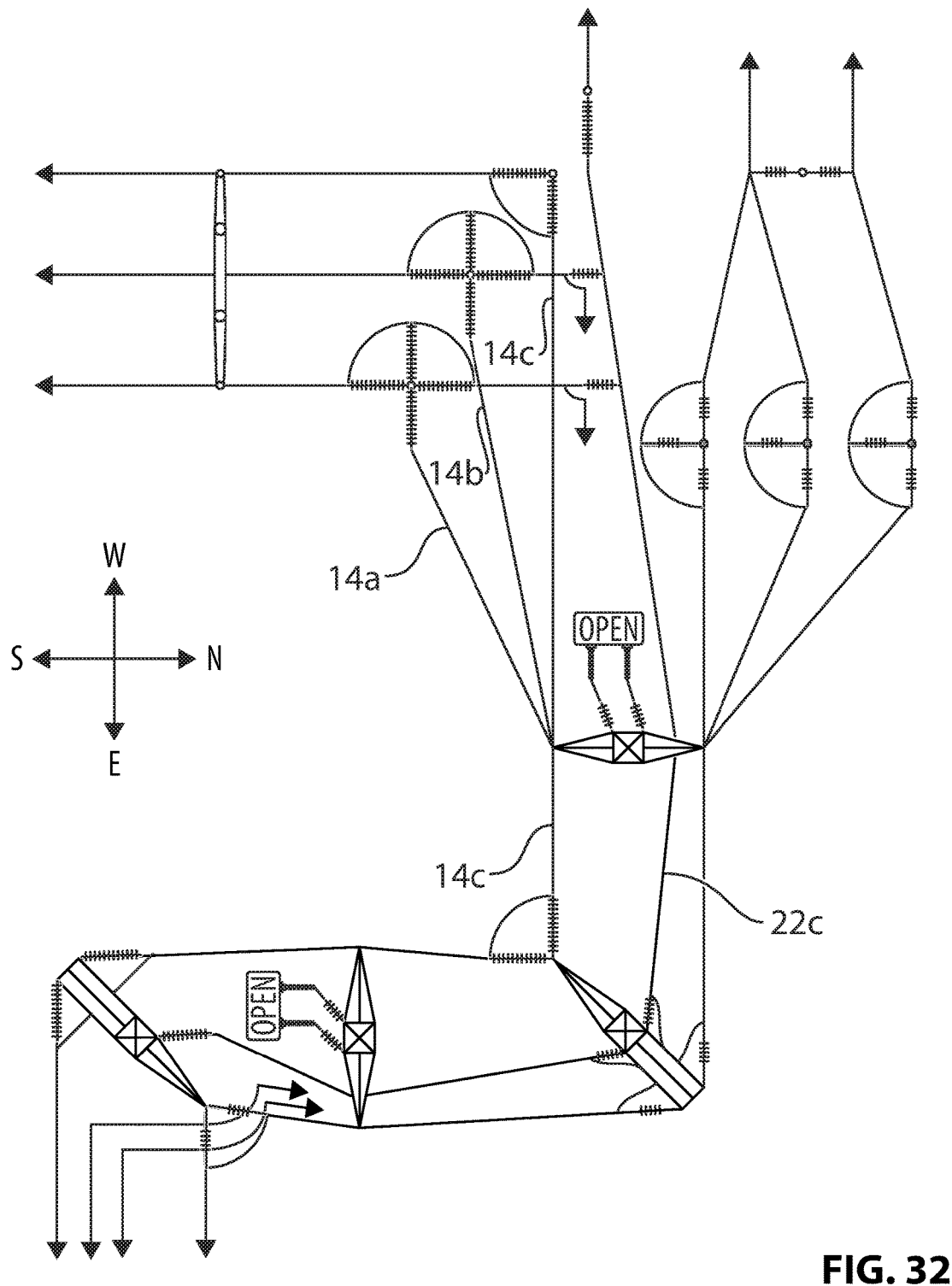
Figure 33:
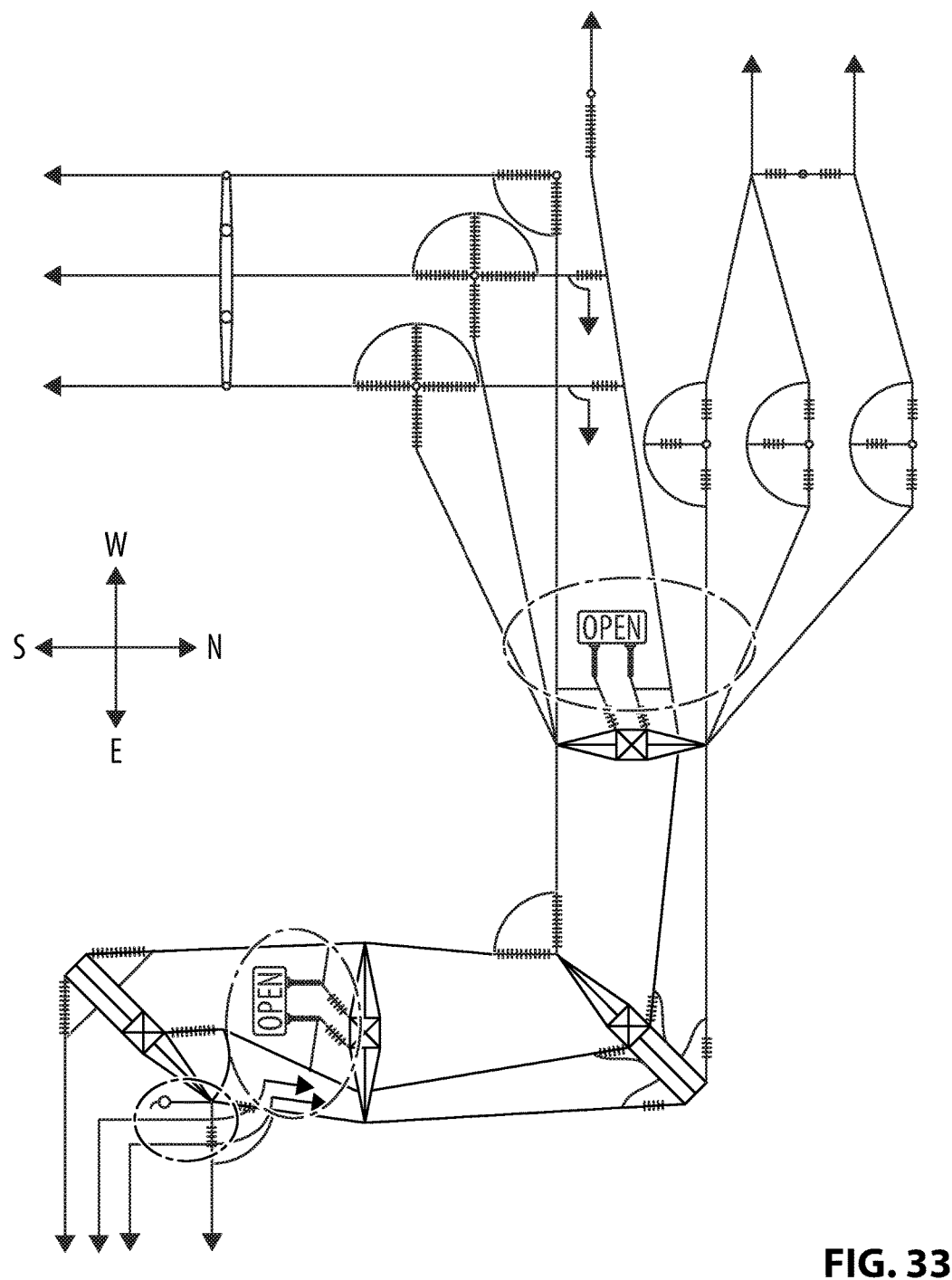

As seen in FIGS. 20, 20B and 20C, the temporary jumpers 50a, 42a are removed from their corresponding transfer buses 46 and 40 respectively, thereby respectively de-energizing and clearing temporary circuit breakers 44 and 36.

Top phase 14a may now be worked on or replaced as its energized load has been transferred to, so as to be carried by, top temporary phase 22a between tower 12g and vertical support 16a, or the work or replacement may be delayed until one or more of the other energized phases have been de-energized and the work then done on all of the de-energized phases.

The steps in the de-energizing of the center and bottom phases, 14b and 14c respectively, and the transferring of the load to the corresponding re-usable temporary conductor phases, is set out in FIGS. 21 through 42. The steps in relation to the center energized phases are set-out in FIGS. 21-31. The steps in relation to the bottom energized phase are set out in FIGS. 32-42. In the lower portion of FIGS. 21-31, because the phases 14a through 14c are stacked vertically one above the other (as seen in FIG. 1B), only the center phase 14b is shown, as it is the center phase 14b that is being worked upon.

Similarly, in the lower portion of FIGS. 32-42, because the phases 14a through 14c are stacked vertically one above the other (as seen in FIG. 1B), only bottom phase 14c is shown. Similarly, as seen for example in FIG. 2A, because the temporary phases 22a, 22b and 22c are stacked vertically one above the other, only the center temporary phase 22b is shown in FIGS. 21-31 (see FIG. 21); and only the bottom temporary phase 22c is shown in FIGS. 32-42 (see FIG. 32).

It will be understood that, although not shown in the Figures, the de-energized phases 14a, 14b, 14c may be repaired or replaced, following which the process set out above for each phase is reversed so as to re-transfer the load back from the temporary phases to the now-repaired/replaced phases. Once the temporary phases are de-energized they are removed for re-use in the next section of energized line needing repair or replacement.

An example is provided of a procedure using a temporary conductor as a removable tool in the repair or re-conductoring (collectively referred to as "re-conductoring") of three phases in a horizontal configuration. Thus as seen by way of example in FIG. 44A, a typical H-frame structure having vertical pole 102 and cross-arm 101, is illustrated. Post suspensions 112 are suspended from cross-arm 101 so as to support conductors 114a, 114b and 114c. Conductors 114a, 114b and 114c typically carry A phase, B phase and C phase loads respectively.

As seen in FIG. 44B, in the example illustrated, a temporary insulator 120 is mounted to the vertical pole 102 closest to conductor 114a; that is, the conductor carrying the A phase at the outset of the re-conductoring procedure. As would be known to a person skilled in the art, the arrangement and position of temporary post insulator 120 is merely one example of how the temporary conductor 122, seen in FIG. 45, may be suspended on or from H-frame structure 100. A further example is provided in FIG. 57 where temporary insulators 124 are suspended in a "V" arrangement on structure 100 so as to thereby support temporary conductor 122 therebetween.

Thus, with temporary post insulator 120 mounted to vertical pole 102, as seen in FIG. 45, temporary conductor 122, which initially is not energized and thus labelled as the "D" phase, is mounted to, so as to be suspended from, the free or distal end of temporary post insulator 120. In the re-conductoring procedure which follows for the horizontal configuration of conductors seen commencing in FIG. 44A, the labels "A phase", "B phase", "C phase", and "D phase", refer, respectively, to an A phase load carried in the corresponding conductor, a B phase load carried in the corresponding conductor, a C phase load carried in the corresponding conductor and a de-energized conductor (the D phase).

As seen in FIG. 46, the A phase load in conductor 114a is transferred to temporary conductor 122 as indicated by arrow AA, resulting in temporary conductor 122 carrying the A phase load and conductor 114a becoming the D phase upon it be de-energized. That is, the A phase load is transferred to what was the D phase conductor 122 in FIG. 45, and the conductor 114a which was the A phase in FIG. 45 is de-energized to become the new D phase.

As seen in FIG. 47 once the A phase load has been transferred to temporary conductor 122, conductor 114a may be re-conductored.

As seen in FIG. 48 the next step in this embodiment of the procedure is to transfer the B phase load, as indicated by arrow BB, from conductor 114b to D phase conductor 114a and de-energize conductor 114b. Thus the B phase is now carried in conductor 114a and, with conductor 114b de-energized, conductor 114b may be re-conductored as it is now the de-energized D phase as seen in FIG. 49.

As seen in FIG. 50, the next step in this embodiment of the procedure is to transfer the C phase load, as indicated by arrow CC, from conductor 114c to the now re-conductored conductor 114b and to de-energize conductor 114c. Thus the C phase load is now carried by conductor 114b, and conductor 114c becomes the de-energized D phase. With conductor 114c now the de-energized D phase as seen in FIG. 51, conductor 114c may be re-conductored.

With conductors 114a, 114b and 114c now re-conductored, the process is reversed so that, as seen in FIG. 52, the C phase load is transferred back to conductor 114c as indicated by arrow CC', and conductor 114b de-energized. Thus the C phase load is returned to conductor 114c, and 114b becomes the de-energized D phase.

As seen in FIG. 53, in the next step of the process, the B phase load is transferred back from conductor 114a to conductor 114b, and conductor 114a is de-energized as indicated by arrow BB'. Thus conductor 114b is returned to the B phase and conductor 114a becomes the D phase.

As seen in FIG. 54, in the next step of the process, the A phase load is returned from temporary conductor 122 to conductor 114a, as indicated by arrow AA'. Thus conductor 114a again becomes the A phase and temporary conductor 122 is returned to the D phase.

As indicated in FIG. 55, temporary conductor 122, that is, the D phase in FIG. 54, is now removed so that it may be reused and installed on for example a next section of conductors 114a, 114b and 114c to be re-conductored. In FIG. 56 the temporary post insulator 120 has been removed thereby returning H-frame structure 100 to its original condition.

What is claimed is:

1. A method of using a temporary conductor as a re-usable tool in maintaining, repairing or re-conductoring at least one energized phase, wherein said at least one energized phase is energized at a voltage potential and strung in at least a first section, the method comprising:
    a) stringing said temporary conductor between support structures at either end of said first section, then energizing said temporary conductor by bringing said temporary conductor to said voltage potential and electrically paralleling said temporary conductor with said energized phase,
    b) de-energizing and then maintaining, repairing or reconductoring said de-energized energized phase,
    c) re-energizing and electrically paralleling said energized phase and electrically paralleling said energized phase with said temporary conductor,
    d) de-energizing and removing said temporary conductor for later re-use as said re-usable tool in a second section of said energized phase.

2. An apparatus for use in the method of claim 1 comprising the temporary conductor, or the set of temporary conductors, adapted for re-use in repeated installing and removing of the temporary conductor or set of temporary conductors respectively in and from the first section or at least one section of energized conductor.

3. A method of using a temporary conductor as a re-usable tool in maintaining at least one energized phase, wherein said at least one energized phase is energized at a voltage potential and strung in at least a first section between first and second support structures, the method comprising:
    a) providing a temporary conductor,
    b) stringing said temporary conductor so as to substantially aligned with and alongside, and spaced apart from, said energized phase,
    c) energizing by bringing said temporary conductor to said voltage potential of said energized phase, and electrically paralleling said temporary conductor with said energized phase
    d) de-energizing said phase,
    e) maintaining by way of repairing or re-conductoring said de-energized phase,
    f) re-energizing said energized phase and electrically paralleling said energized phase with said temporary conductor,
    g) de-energizing said temporary conductor,
    h) removing said temporary conductor for later re-use as said re-usable tool in a second section of said energized phase.

4. An apparatus for use in the method of claim 3 comprising the temporary conductor, or the set of temporary conductors, adapted for re-use in repeated installing and removing of the temporary conductor or set of temporary conductors respectively in and from the first section or at least one section of energized conductor.

5. A method of using temporary conductors as a re-usable tool in live re-conductoring of energized conductors, wherein the energized conductors are at a voltage potential and strung in at least a first section, between at least first and second support structures, and also in a contiguous second section, contiguous to the first section, between the second and third support,
    wherein in both said first and second sections of said energized conductors are contiguous between said first and second sections,
    and wherein said energized conductors comprise a spaced-apart energized array of energized conductors, and wherein the energized conductors in said array of energized conductors comprise separate phases,
    the method comprising in said first section:
    a) providing a re-usable set of temporary conductors,
    b) stringing the set of temporary conductors in a substantially aligned, spaced apart temporary array alongside, and spaced apart from, said array of energized conductors so that each said energized conductor of said array of energized conductors has a corresponding temporary conductor of said set of temporary conductors alongside it, c) commencing with a first energized phase of said array of energized conductors, energizing so as to bring a corresponding first temporary conductor of said set of temporary conductors to said voltage potential of said first energized phase, electrically paralleling said first temporary conductor with said first energized phase, and then de-energizing said first conductor, d) maintaining by way of repairing or re-conductoring, said de-energized first phase conductor, e) repeating in sequence steps (a) through (d) for each subsequent energized phase in said array of energized conductors and corresponding temporary conductor in said set of temporary conductors, f) for those energized phases not maintained in step (d), then maintaining those energized phases, then, g) re-energizing said energized phases and electrically paralleling said energized phases with said temporary conductors, h) de-energizing said temporary conductors, i) removing said temporary conductors for later re-use as said re-usable tool in said second section, the method further comprising in said second section:

j) providing said set of temporary conductors, k) repeating steps (a) through (i), whereby said maintenance on said first and second sections occurs without transposing relative positions of said energized phases in said array of energized phases, and whereby the temporary conductors are re-usable from said first section to said second section.

6. An apparatus for use in the method of claim 5 comprising the temporary conductor, or the set of temporary conductors, adapted for re-use in repeated installing and removing of the temporary conductor or set of temporary conductors respectively in and from the first section or at least one section of energized conductor.

* * * * *